US012741296B2

(12) United States Patent
Tuteja et al.

(10) Patent No.: US 12,741,296 B2
(45) Date of Patent: Sep. 22, 2026

(54) DURABLE LUBRICANT-REACTED NANOCOMPOSITE COATINGS FOR PREVENTING LIQUID- AND SOLID-FOULING AND METHODS FOR PREPARING THE SAME

(71) Applicant: THE REGENTS OF THE UNIVERSITY OF MICHIGAN, Ann Arbor, MI (US)

(72) Inventors: Anish Tuteja, Ann Arbor, MI (US); Jiayue Huang, Ann Arbor, MI (US); Fan-Wei Wang, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 371 days.

(21) Appl. No.: 18/598,450

(22) Filed: Mar. 7, 2024

(65) Prior Publication Data

US 2024/0299977 A1 Sep. 12, 2024

Related U.S. Application Data

(60) Provisional application No. 63/450,505, filed on Mar. 7, 2023.

(51) Int. Cl.
*B05D 5/08* (2006.01)
*C08K 3/36* (2006.01)

(52) U.S. Cl.
CPC .................. *B05D 5/08* (2013.01); *C08K 3/36* (2013.01); *B05D 2503/00* (2013.01); *B05D 2506/10* (2013.01); *B05D 2601/22* (2013.01); *C08K 2201/005* (2013.01); *C08K 2201/011* (2013.01)

(58) Field of Classification Search
CPC .. B05D 5/08; B05D 2503/00; B05D 2506/10; B05D 2601/22; C08K 3/36; C08K 2201/005; C08K 2201/011
See application file for complete search history.

(56) References Cited

U.S. PATENT DOCUMENTS

| | | | |
|---|---|---|---|
| 10,465,091 B2 | 11/2019 | Tuteja et al. | |
| 2021/0009883 A1 | 1/2021 | Tuteja et al. | |
| 2021/0213156 A1 | 7/2021 | Tuteja et al. | |
| 2025/0145852 A1* | 5/2025 | Tuteja ................ | C08G 18/0857 |

FOREIGN PATENT DOCUMENTS

WO WO-2023/172370 A2 9/2023

OTHER PUBLICATIONS

Wang, J., et al., “Durable Liquid-and Solid-Repellent Elastomeric Coatings Infused with Partially Crosslinked Lubricants,” ACS Applied Materials & Interfaces (2022).
Chen, L., et al. “One-Step Fabrication of Universal Slippery Lubricated Surfaces,” Advanced Materials Interfaces 2020, 7 (18), 200030.
Golovin, K., et al., “Low-interfacial toughness materials for effective large-scale deicing,” Science (2019), 364 (6438), pp. 371-375.

* cited by examiner

*Primary Examiner* — Anthony J Green
(74) *Attorney, Agent, or Firm* — Harness, Dickey & Pierce, P.L.C.

(57) ABSTRACT

A durable solid and liquid repellant nanocomposite material is provided that includes a polymeric matrix comprising polyurethane or fluoropolyurethane that has a plurality of lubricating domains distributed therein. The lubricating domains are formed by a partial crosslinking reaction between a reactive oil comprising a first reactive group selected from the group consisting of: hydroxyl, amine, carboxylic acid, and combinations and a second reactive functional group selected from the group consisting of: isocyanate, hydroxyl, and combinations thereof on a polymeric precursor of the polymeric matrix. The nanocomposite material further includes a plurality of nanoparticles comprising silicon dioxide ($SiO_2$) distributed in the polymeric matrix. At least a portion of the plurality of nanoparticles are bonded to the polymeric matrix. Methods for forming the durable solid and liquid repellant material are also provided.

20 Claims, 24 Drawing Sheets

Figures 1, 2A, 2B:
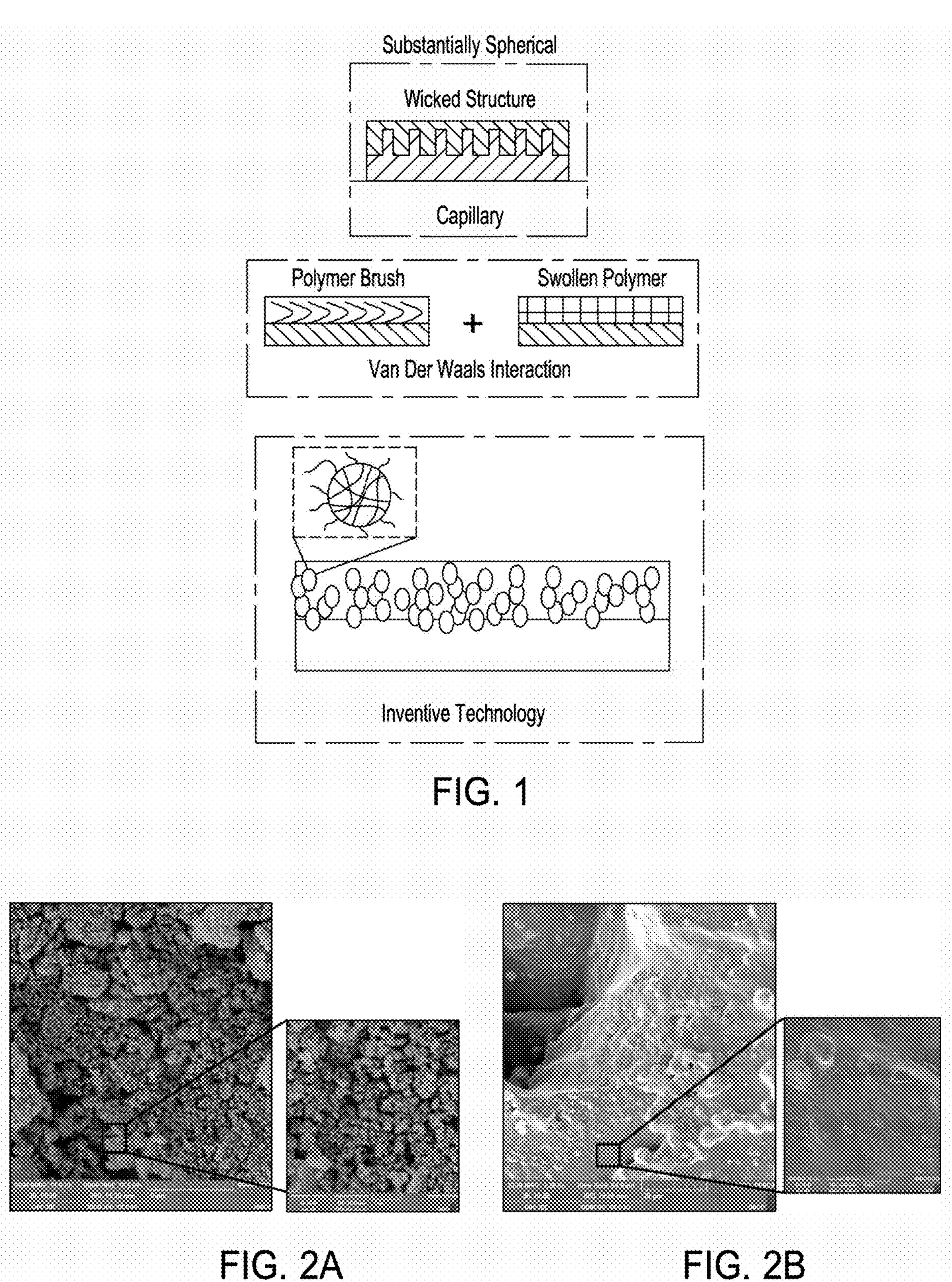

Water (72.80)
Glycerol (64.00)
Diiodomethane (50.80)
Ethylene Glycol (47.70)
Toluene (28.40)
Hexadecane (27.47)
Dodecane (25.35)
Octane (21.62)
CAH
CA_adv
0.0 20.0 40.0 60.0 80.0
Contact Angle (°)

Water (72.80)
Glycerol (64.00)
Diiodomethane (50.80)
Ethylene Glycol (47.70)
Toluene (28.40)
Hexadecane (27.47)
Dodecane (25.35)
Octane (21.62)
CAH
CA_adv
0.0 20.0 40.0 60.0 80.0
Contact Angle (°)

Advancing Contact Angle (°)
90 80 70 60 50 40 30 20 10 0
Contact Angle Hysteresis (°)
30 25 20 15 10 5 0
0 2000 4000 6000 8000 1000
Abrasion Cycle (–)
Water
Ethylene Glycol
Hexadecane
Toluene

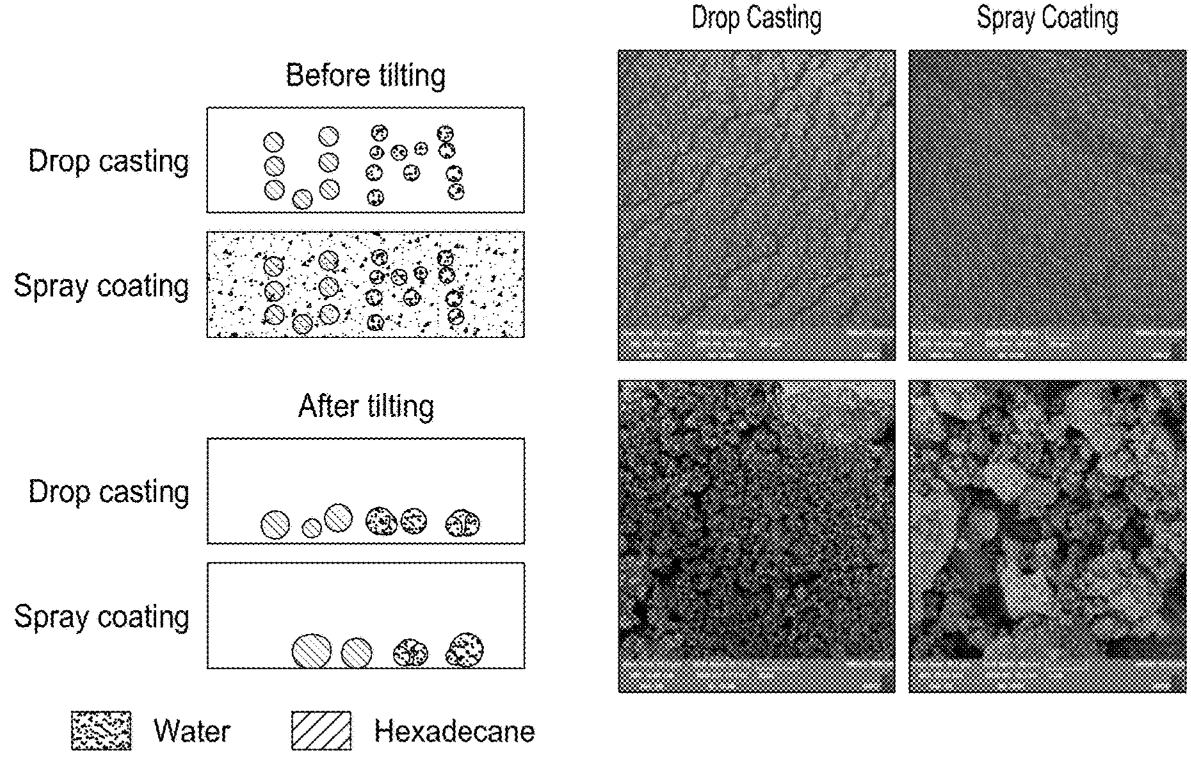
FIG. 15A
FIG. 15B
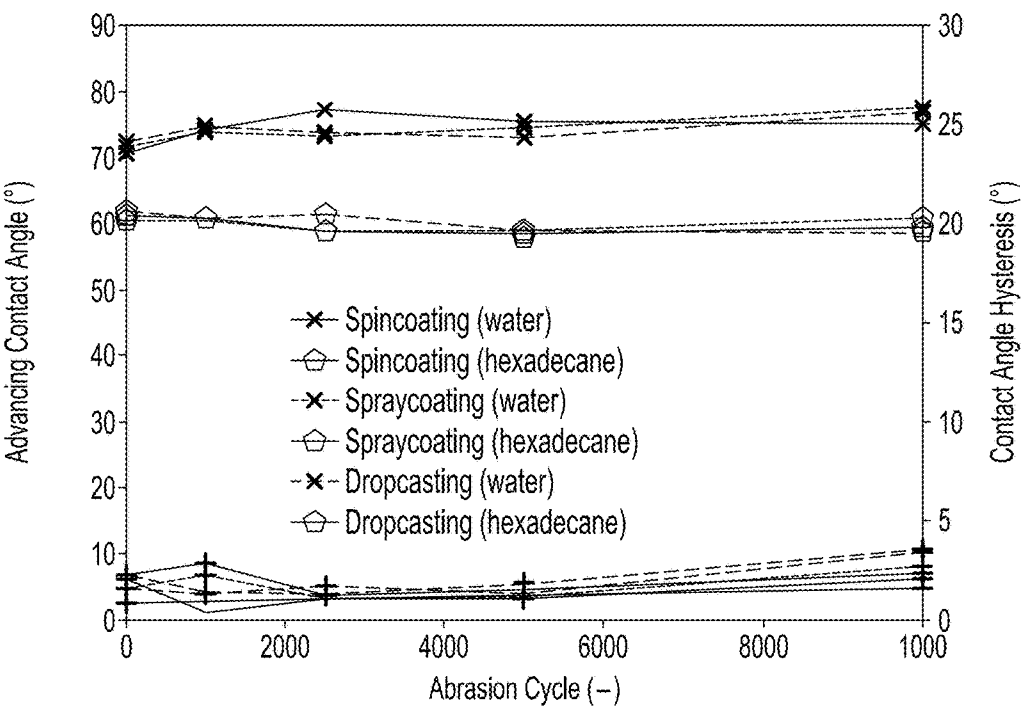
FIG. 15C

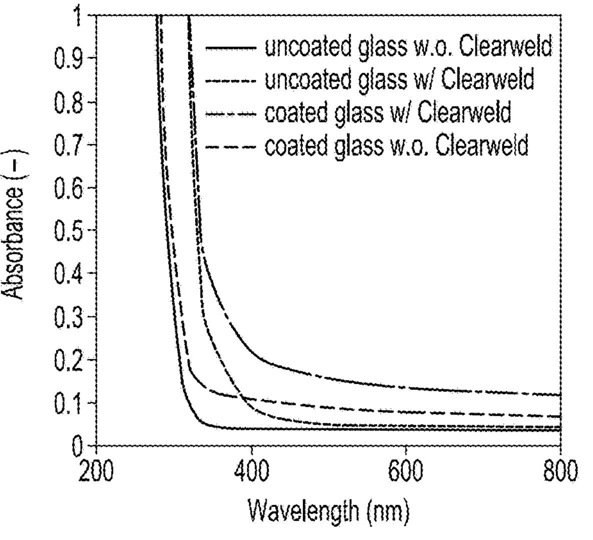
FIG. 19B
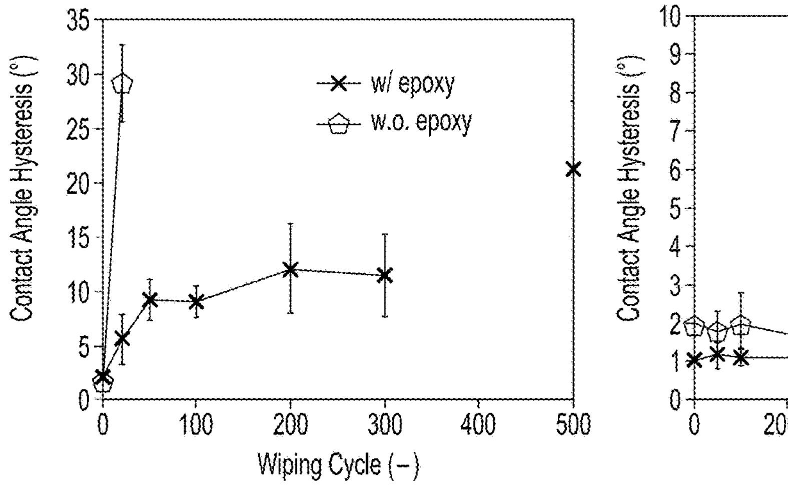
FIG. 19C
FIG. 19D

| | Adhesion strength (kPa) | Critical force per width (N/cm) | Interfacial toughness (J/m$^2$) |
|---|---|---|---|
| Inventive Embodiment | 32.27±1.25 | 18.79±0.96 | 0.035±0.004 |
| LIT PDMS | 55.76±2.26 | 34.82±2.08 | 0.12±0.03 |
| Van der Waals | – | – | 0.10 |

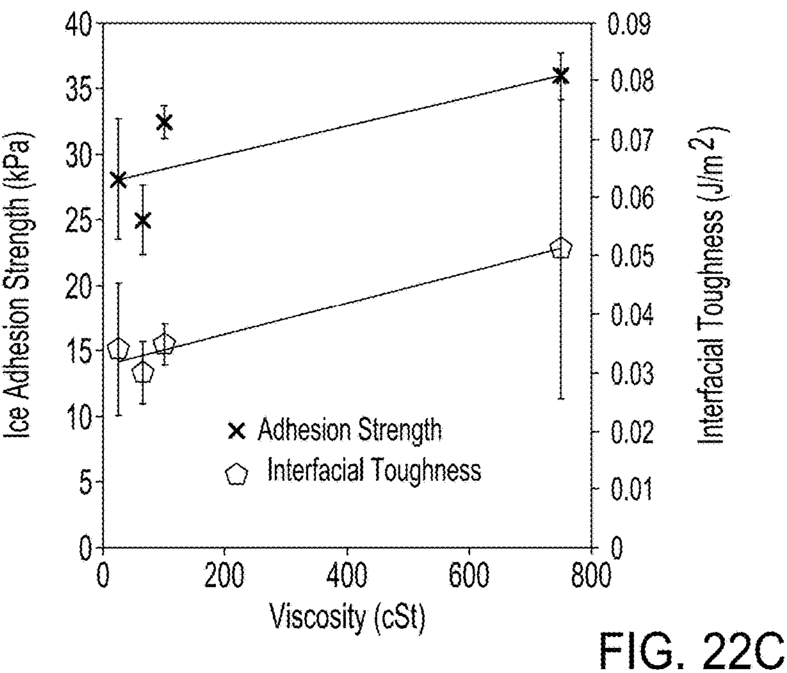
FIG. 22C
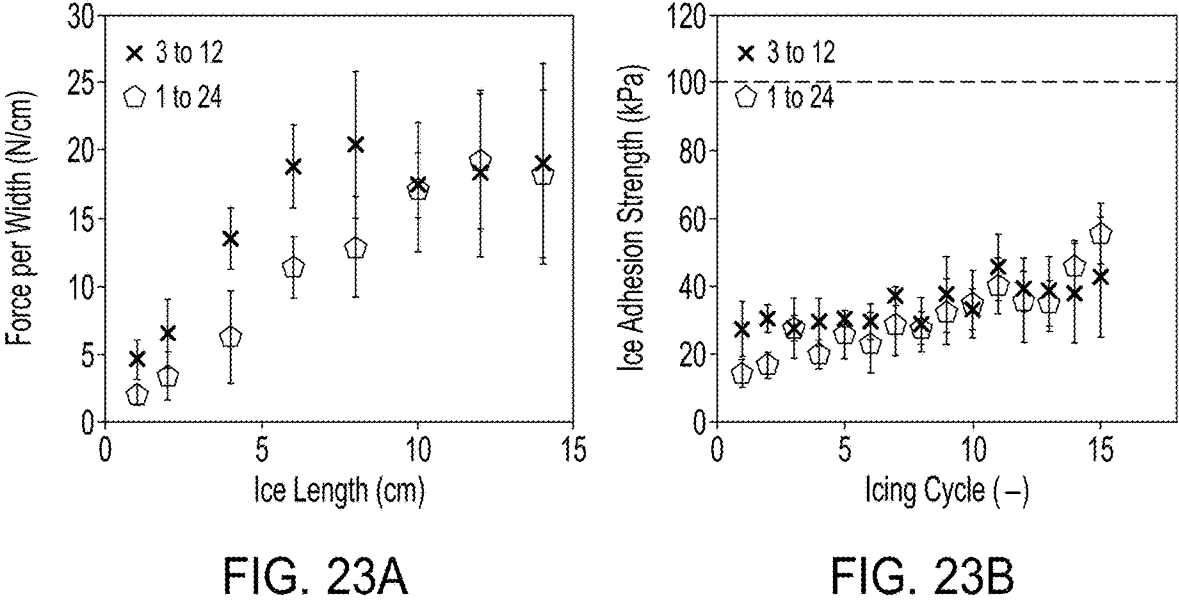
FIG. 23A
FIG. 23B

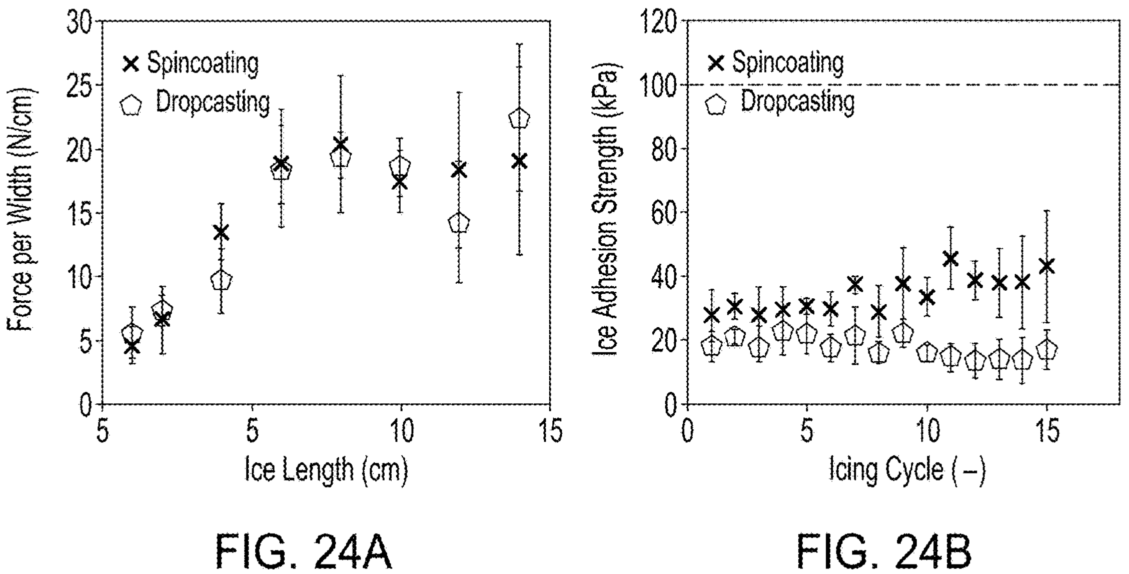
FIG. 24A
FIG. 24B
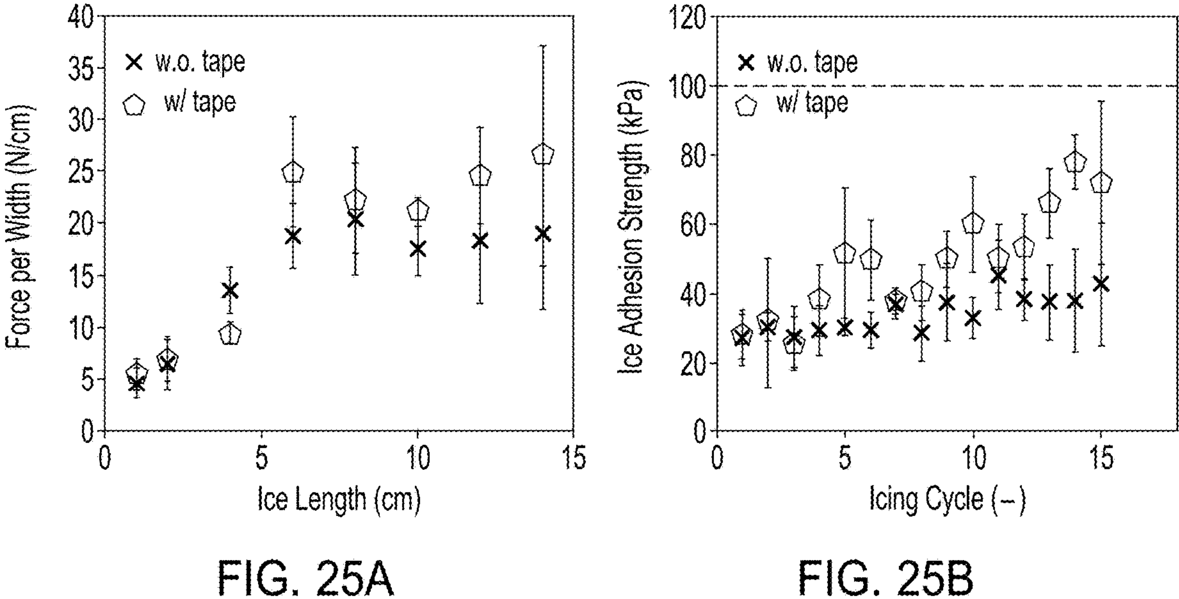
FIG. 25A
FIG. 25B

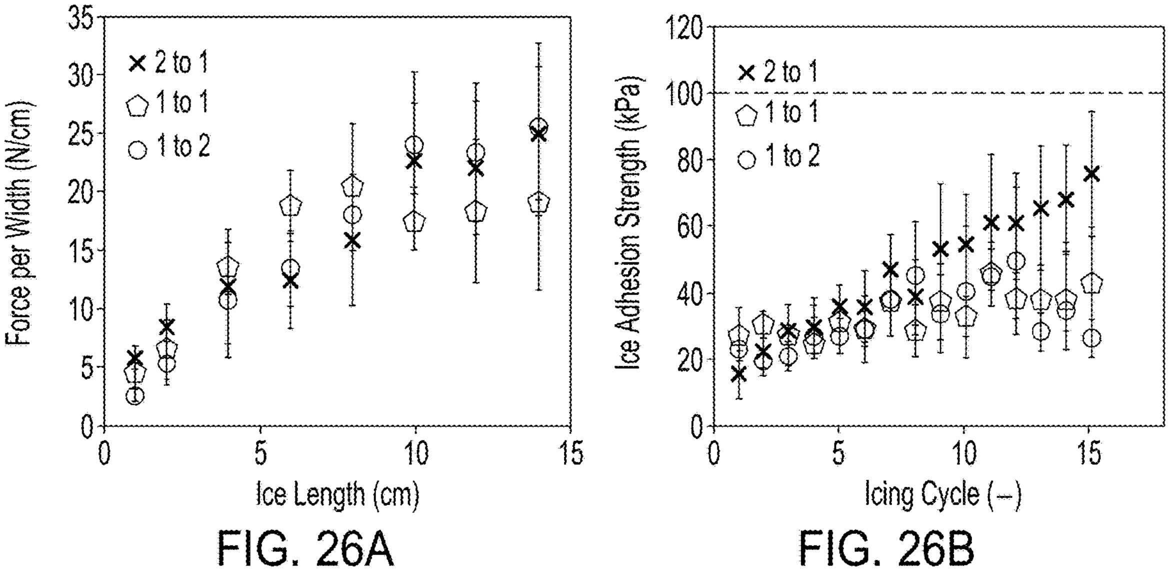
FIG. 26A
FIG. 26B
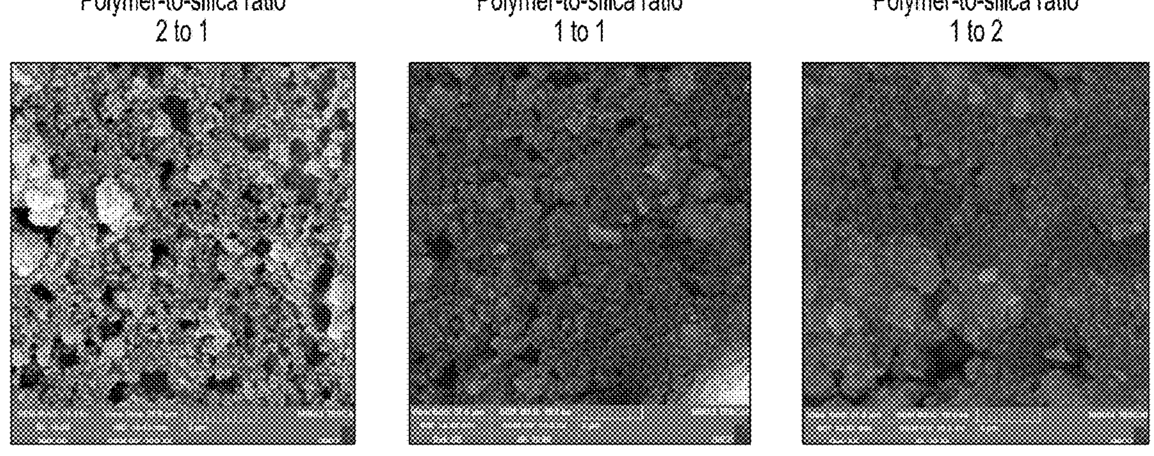
FIG. 26C

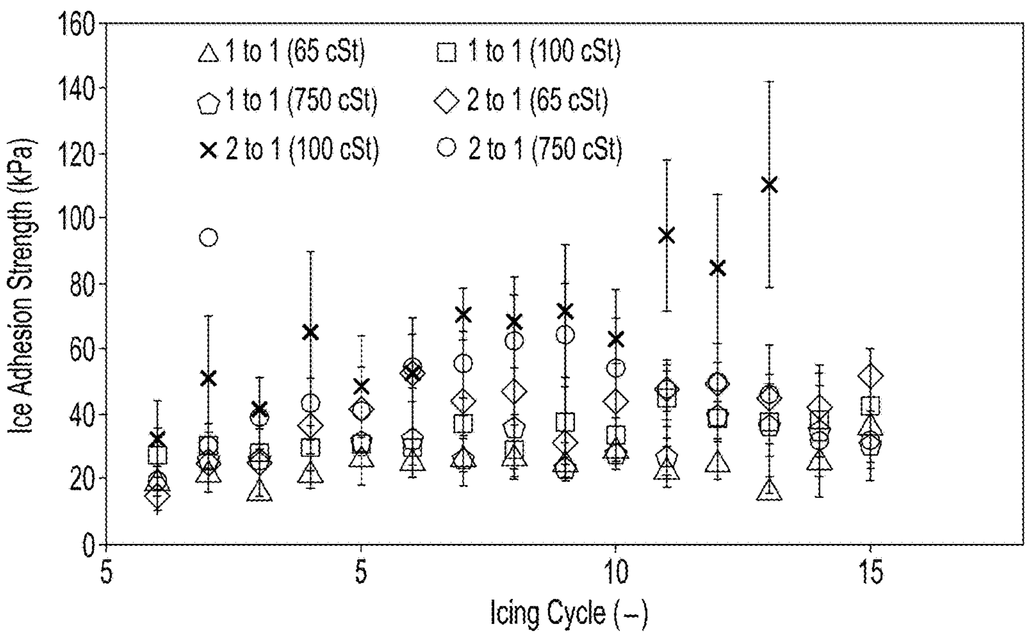
FIG. 27
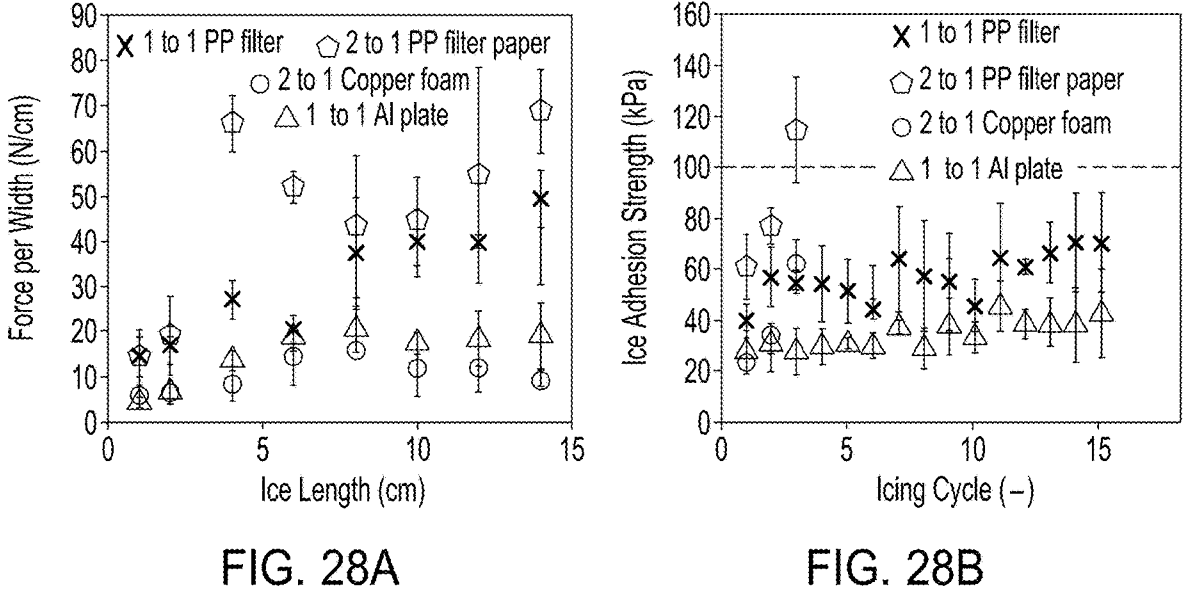
FIG. 28A
FIG. 28B

DURABLE LUBRICANT-REACTED NANOCOMPOSITE COATINGS FOR PREVENTING LIQUID- AND SOLID-FOULING AND METHODS FOR PREPARING THE SAME

CROSS-REFERENCE TO RELATED APPLICATIONS

This application claims the benefit of U.S. Provisional Application No. 63/450,505, filed on Mar. 7, 2023. The entire disclosure of the above application is incorporated herein by reference.

GOVERNMENT SUPPORT

This invention was made with government support under N00014-20-1-2817 awarded by the U.S. Department of Navy, U.S. Office of Naval Research. The government has certain rights in the invention.

FIELD

The present disclosure relates to durable solid and liquid repellant material having a partially crosslinked polymeric matrix with domains formed from reactive lubricant precursors and nanoparticles distributed therein and methods for making the same.

BACKGROUND

Summary

This section provides a general summary of the disclosure, and is not a comprehensive disclosure of its full scope or all of its features.

In certain aspects, the present disclosure relates to a durable solid (e.g., ice) and liquid repellant nanocomposite material comprising a polymeric matrix comprising polyurethane or fluoropolyurethane and having a plurality of lubricating domains distributed therein formed by a partial crosslinking reaction between a reactive oil comprising a first reactive group selected from the group consisting of: hydroxyl, amine, carboxylic acid, and combinations and a second reactive functional group selected from the group consisting of: isocyanate, hydroxyl, and combinations thereof on a polymeric precursor of the polymeric matrix. The durable solid and liquid repellant nanocomposite material further comprise a plurality of nanoparticles comprising silicon dioxide ($SiO_2$) distributed in the polymeric matrix, where at least a portion of the plurality of nanoparticles are bonded to the polymeric matrix.

In one aspect, the plurality of nanoparticles comprises silicon dioxide ($SiO_2$).

In one aspect, the first reactive group comprises hydroxyl and the second reactive functional group comprises isocyanate.

In one aspect, the reactive oil is selected from the group consisting of: hydroxyl-terminated polydimethylsiloxane, hydroxyl-terminated per-fluorinated polydimethylsiloxane, hydroxyl-terminated perfluoropolyether (PFPE), and combinations thereof.

In one aspect, the durable solid and liquid repellant nanocomposite material defines a plurality of pores, where a free reactive oil is distributed in at least a portion of the plurality of pores.

In one further aspect, the free reactive oil is selected from the group consisting of: hydroxyl-terminated polydimethylsiloxane, hydroxyl-terminated per-fluorinated polydimethylsiloxane, hydroxyl-terminated perfluoropolyether (PFPE), and combinations thereof.

In one aspect, a weight ratio of the combined polymeric matrix and plurality of nanoparticles to the reactive oil in a solvent is greater than or equal to about 1:4.

In one aspect, a viscosity of the reactive oil is greater than or equal to about 25 cSt to less than or equal to about 750 cSt at about 20° C.

In one aspect, the polymeric precursor is formed from a polyol having a molecular weight of greater than or equal to about 100 Da to less than or equal to about 10,000 Da.

In one aspect, a weight ratio of the polymeric matrix to the plurality of nanoparticles is less than or equal to about 2:1.

In one aspect, a weight ratio of the polymeric matrix to the plurality of nanoparticles is about 1:1.

In one aspect, the plurality of nanoparticles has an average diameter of less than or equal to about 60 nm.

In one aspect, an exposed surface of the durable solid and liquid repellant nanocomposite material exhibits an initial ice adhesion strength of less than or equal to about 50 kPa prior to exposure to icing conditions and an ice adhesion strength after 10 cycles of icing and deicing conditions that is less than or equal to about 50% above the initial ice adhesion strength.

In one aspect, after at least 1,000 abrasion cycles, the durable solid and liquid repellant material has a contact angle hysteresis of less than or equal to about 5° for water and for a predetermined oil.

In one aspect, after at least 10,000 abrasion cycles, the durable solid and liquid repellant material has a contact angle hysteresis of less than or equal to about 5° for water and for a predetermined oil.

In one aspect, the polymeric precursor is formed from a component comprising three isocyanate functional groups.

In one further aspect, the polymeric precursor comprises a triisocyanate aromatic polyurethane.

In one aspect, the durable solid and liquid repellant material has a transmissivity to wavelengths in the visible range of greater than or equal to about 90%.

In certain aspects, the present disclosure relates a method of making a durable solid and liquid repellant material. For example, the method may comprise mixing (i) a polymeric precursor having a first reactive functional group selected from the group consisting of: isocyanate, alkene, amine, carboxylic acid, hydroxyl, and combinations thereof, (ii) a polyol having a second reactive functional group selected from the group consisting of: hydroxyl group, amine, carboxylic acid, and combinations thereof, (iii) a plurality of nanoparticles comprising silicon dioxide ($SiO_2$) and (iv) a catalyst to form an admixture. The method further includes applying the admixture to a surface of a substrate comprising reactive groups capable of reacting with the first reactive functional group, heating the admixture on the substrate, and adding a reactive oil to the admixture on the substrate. The method may further include curing the admixture to promote a partial crosslinking reaction between the first reactive functional group and the second reactive functional group to form an polymeric matrix disposed over the substrate and reacting the first reactive functional group with at least a portion of the plurality of nanoparticles and the reactive oil, so that the polymeric matrix has a plurality of lubricating domains provided by the reactive oil distributed therein.

In one aspect, the polymeric matrix comprises polyurethane or fluoropolyurethane and the reactive oil is selected from the group consisting of: hydroxyl-terminated polydimethylsiloxane, hydroxyl-terminated per-fluorinated polydimethylsiloxane, hydroxyl-terminated perfluoropolyether (PFPE), and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a design of a durable coating comprising a lubricant-reacted porous composite prepared in accordance with certain aspects of the present disclosure.

Figure 2C:
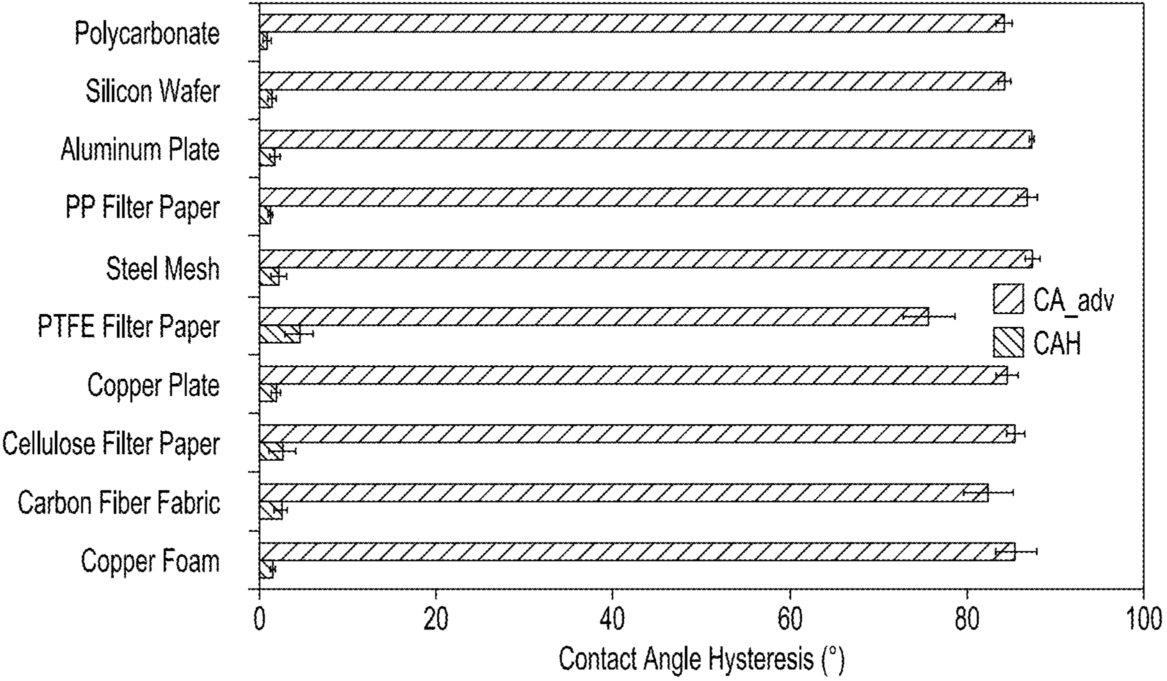

FIGS. 2A-2C show that the coating can be applied on various substrates and the micro-topology depends on the morphology of the substrates. FIG. 2A shows the SEM topology of the porous structure of the coating on various flat substrates. FIG. 2B shows the SEM topology of the wrinkled structure of the coating on various porous substrates. FIG. 2C shows the contact angle hysteresis (orange column) and advancing contact angle (blue column) on various coated substrates. The error bars show the standard deviations of at least 3 independent measurements.

Figure 3A:
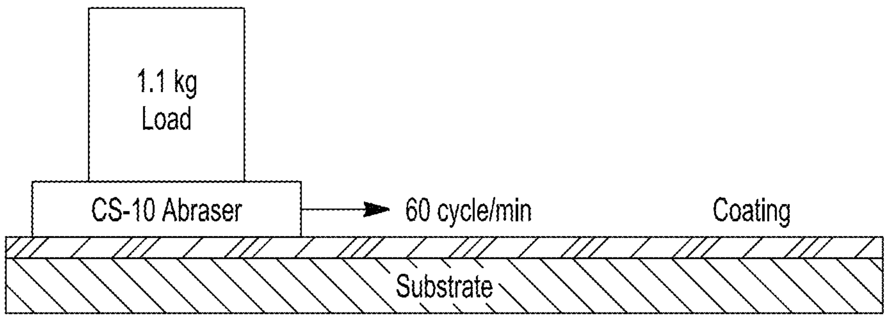
Figures 3B, 3C, 3D:
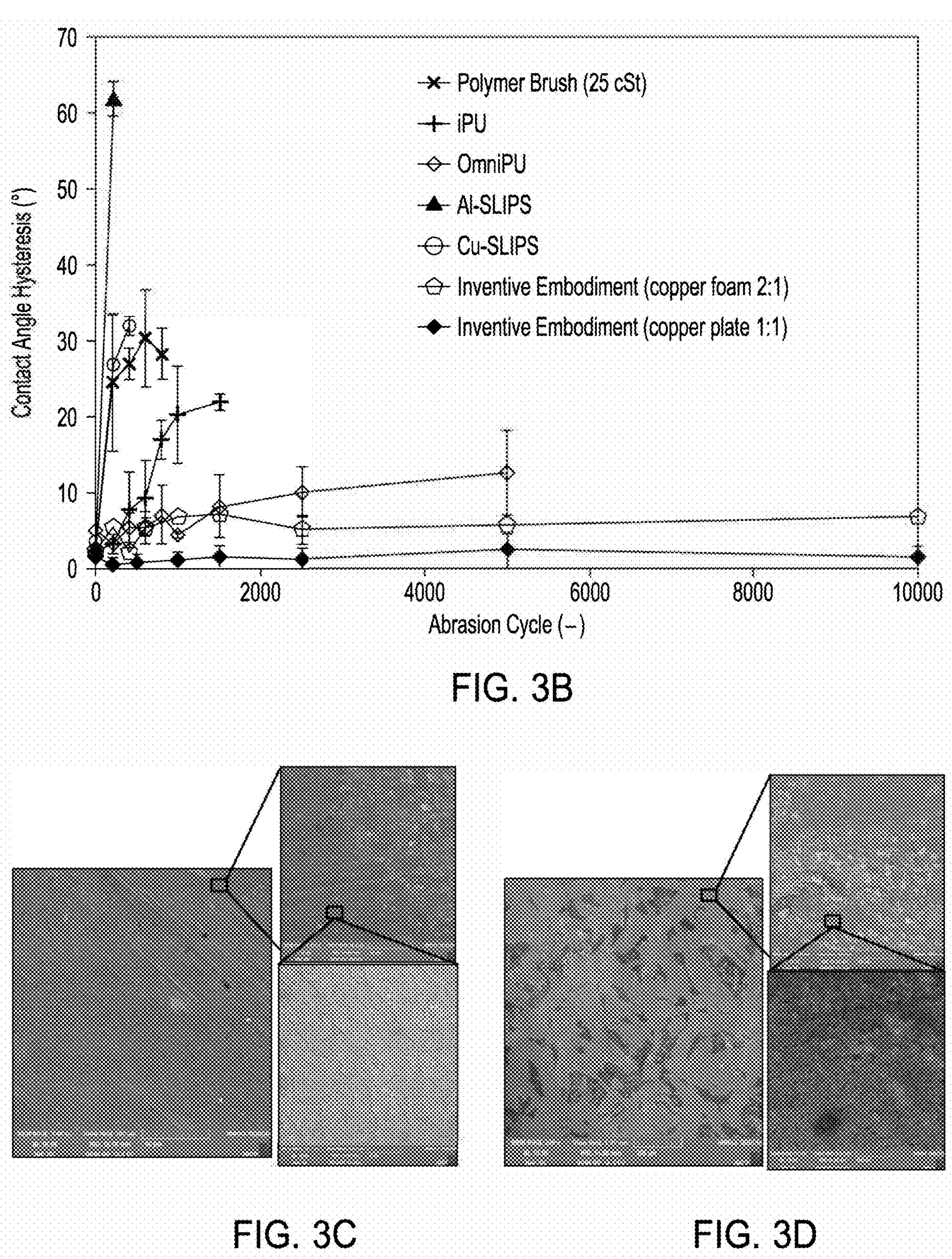

FIG. 3A-3D show the comparison of abrasion durability between various lubricated surfaces and the SEM topology of the abraded coating on both flat substrates and porous substrates. FIG. 3A shows the schematic of the abrasion test setup. FIG. 3B shows the comparison of the abrasion durability between various lubricated surfaces. The error bars show the standard deviations of at least 3 independent measurements. FIG. 3C-3D respectively show the SEM topology of the abraded coated copper plate and copper foam.

Figure 4:
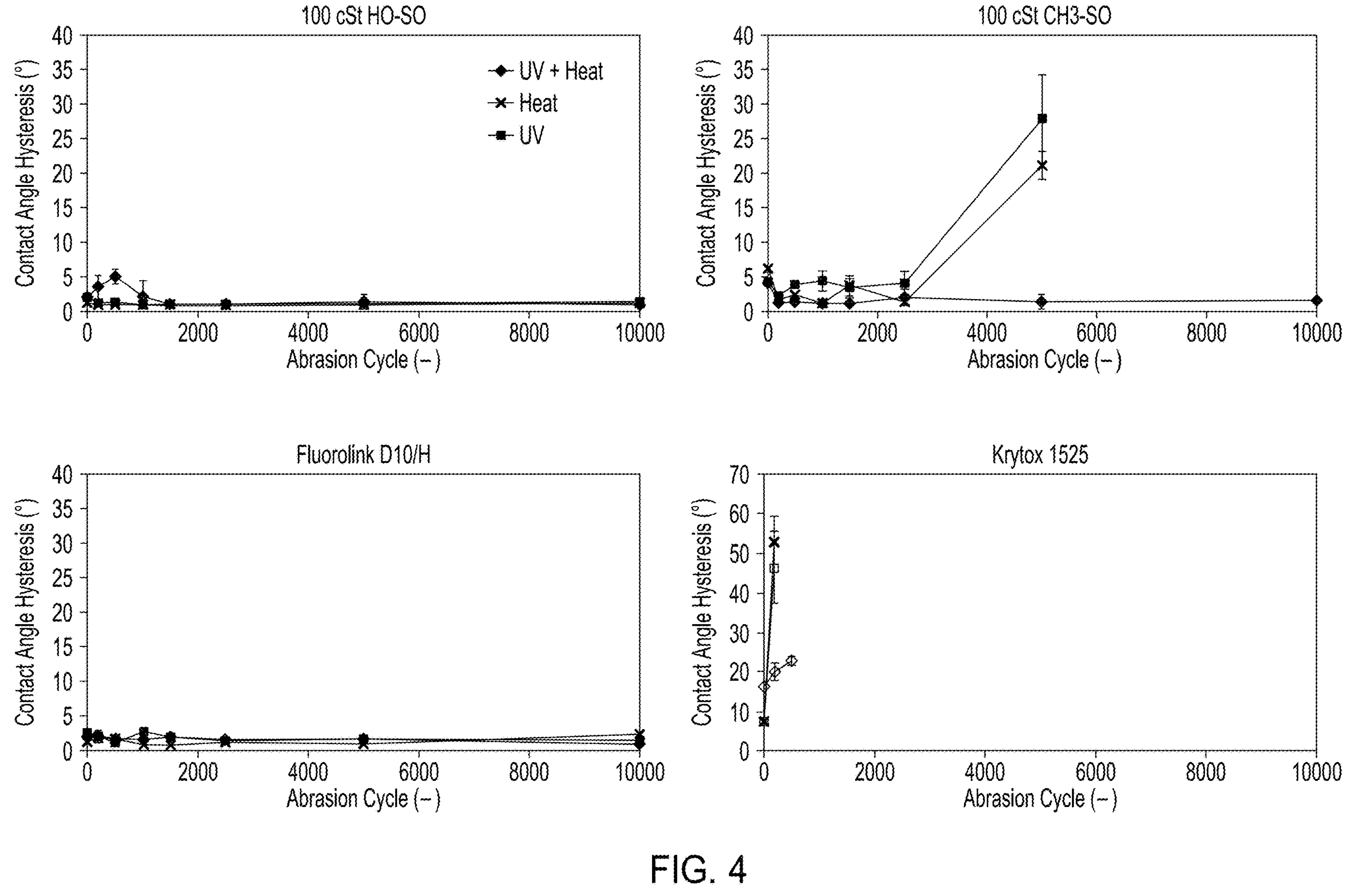

FIG. 4 shows the influence of the heating and UV curing process on the coating performance with different lubricants. The polymer-to-silica ratio was 1 to 1 and the composite-to-solvent ratio was 1 to 4 for all coatings in FIG. 4. The blue color "UV+Heat" denotes the fabrication process with 1-day heating with lubricant and 1-hour UV curing. The yellow color "Heat" denotes the fabrication process with only 1-day heating with lubricant. The orange color "UV" denotes the fabrication process with 1-day heating without lubricant and 1-hour UV curing (the lubricant was added after 1-day heating). 100 cSt HO-SO denotes hydroxyl terminated silicone oil of 100 cSt viscosity. 100 cSt CH3-SO denotes trimethyl terminated silicone oil of 100 cSt viscosity. D10/H denotes hydroxyl terminated fluorinated oil FLUOROLINK™ D10/H. The error bars show the standard deviations of at least 5 independent measurements.

Figure 5A:
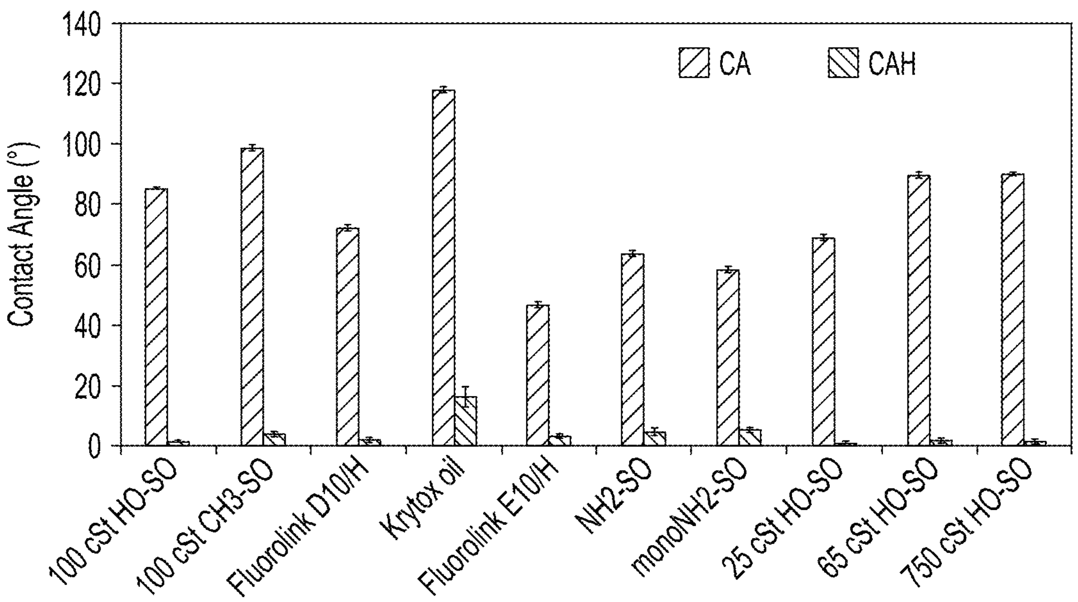
Figure 5B:
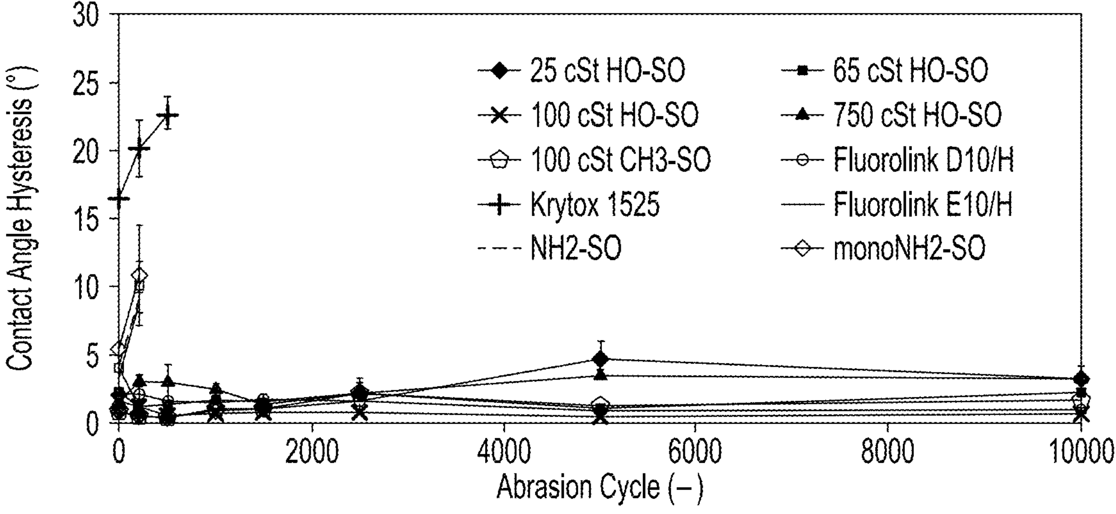

FIG. 5A-5B show the wetting performance of the coatings infused with various oils. FIG. 5A shows the advancing contact angle and the contact angle hysteresis before abrasion. FIG. 5B shows the relationship between the abrasion cycle and contact angle hysteresis of the coatings with various lubricants. The polymer-to-silica ratio was 1 to 1 and the composite-to-solvent ratio was 1 to 4 for all coatings in FIG. 5. HO-SO denotes hydroxyl terminated silicone oil. CH3-SO denotes trimethylsiloxy terminated silicone oil. NH2-SO denotes aminopropyl terminated silicone oil. monoNH2-SO denotes asymmetric monoaminopropyl terminated silicone oil. D10/H denotes hydroxyl terminated fluorinated oil FLUOROLINK™ D10/H. E10/H denotes ethoxylated terminated fluorinated oil FLUOROLINK™ E10/H. The error bars show the standard deviations of at least 5 independent measurements.

Figure 6:
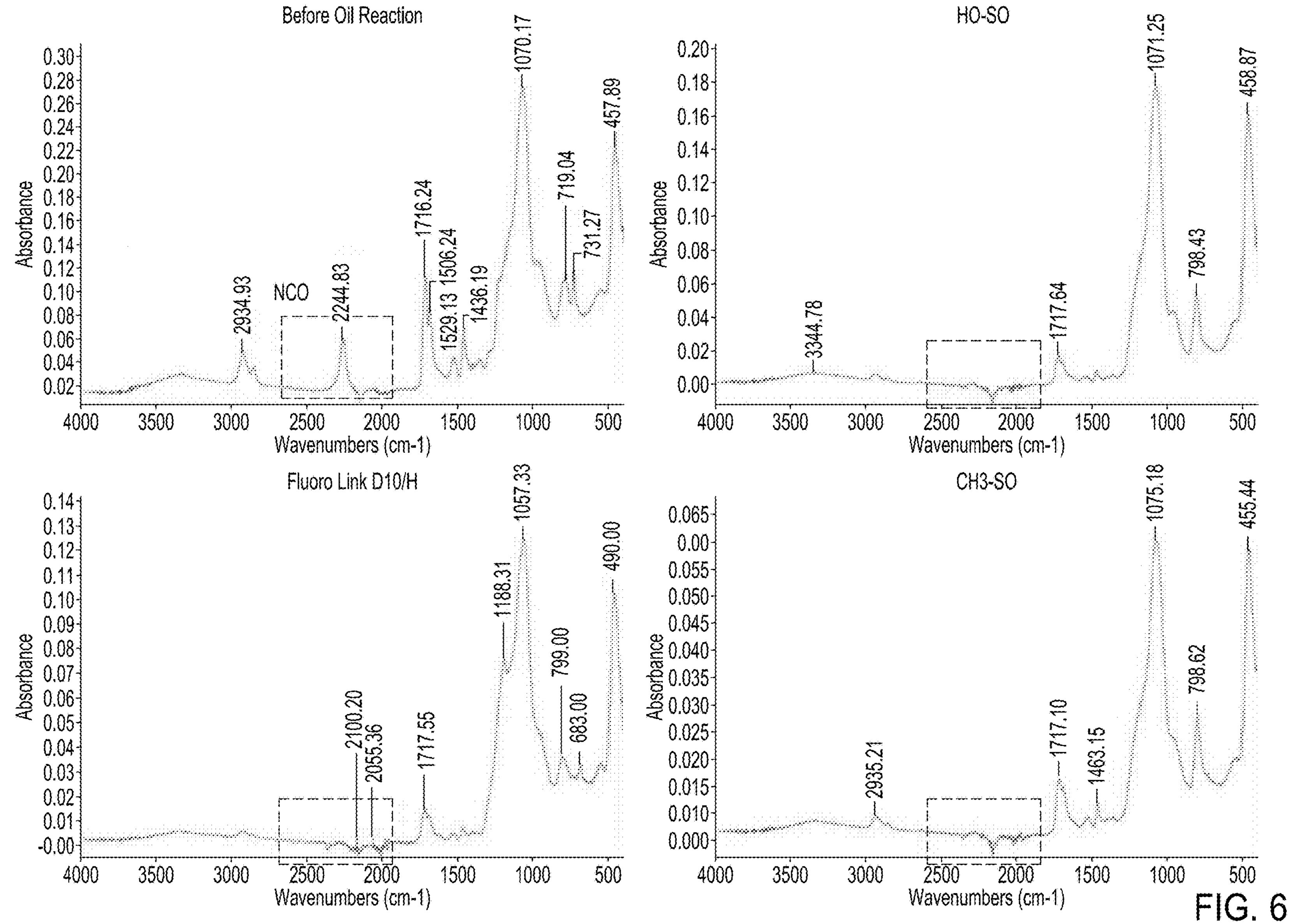

FIG. 6 shows the FTIR spectrums of the coatings with different lubricants and without lubricants to support the statement that the lubricants react with the coatings. HO-SO denotes hydroxyl terminated silicone oil. CH3-SO denotes trimethylsiloxy terminated silicone oil. D10/H denotes hydroxyl terminated fluorinated oil FLUOROLINK™ D10/H. The polymer-to-silica ratio was 1 to 1 and the composite-to-solvent ratio was 1 to 4 for all coatings in FIG. 6.

Figure 7:
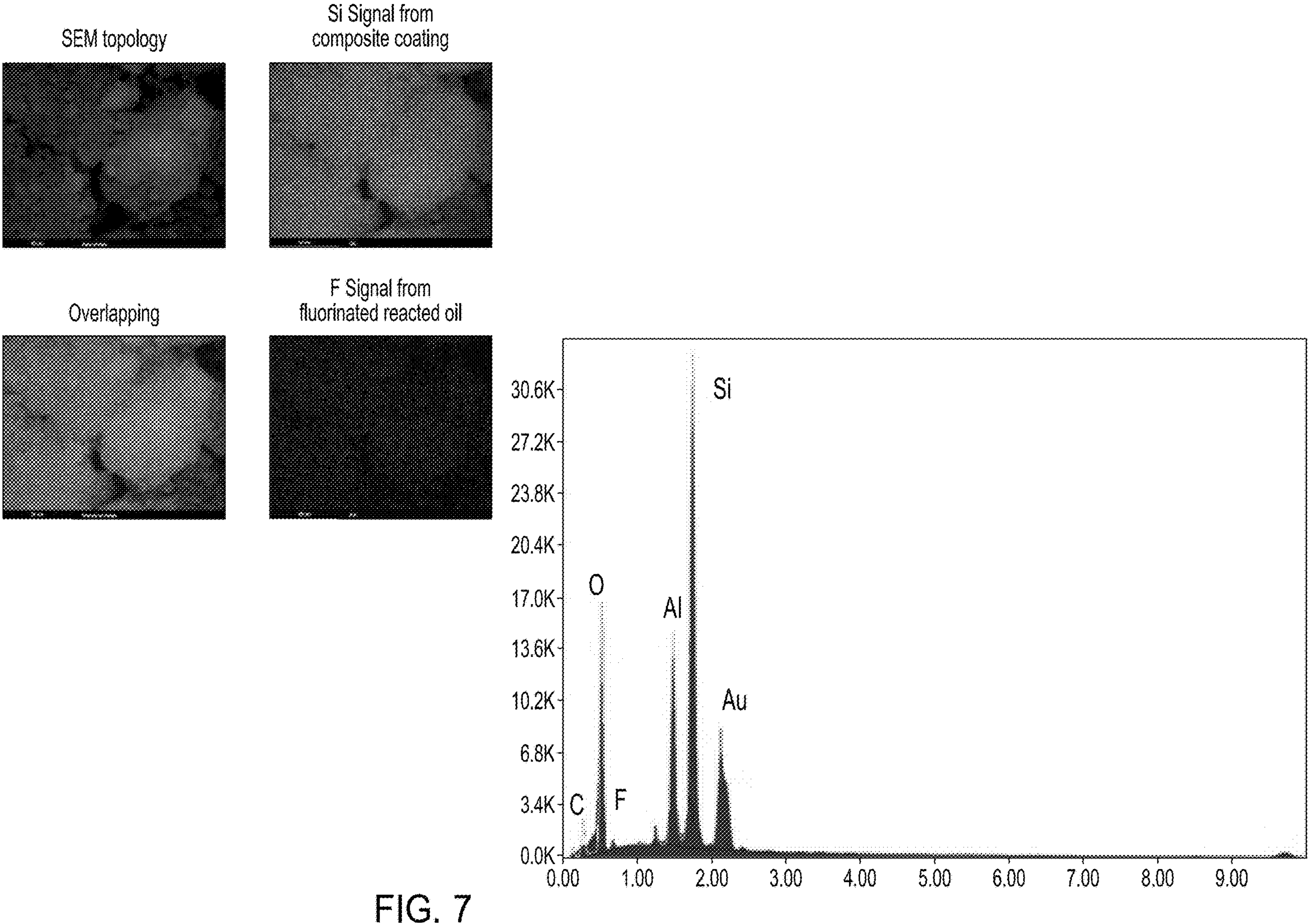

FIG. 7 shows the element mapping and the EDS spectrum of the unabraded coating. The left four figures are respectively the SEM topology, Si signal mapping, F signal mapping, and overlapping of Si and F signal. The right figure is the EDS spectrum with F and Si peaks highlighted. The polymer-to-silica ratio was 1 to 1 and the composite-to-solvent ratio was 1 to 4 for all the coatings and the lubricant used in the coatings was FLUOROLINK™ D10/H hydroxyl terminated PFPE oil.

Figure 8:
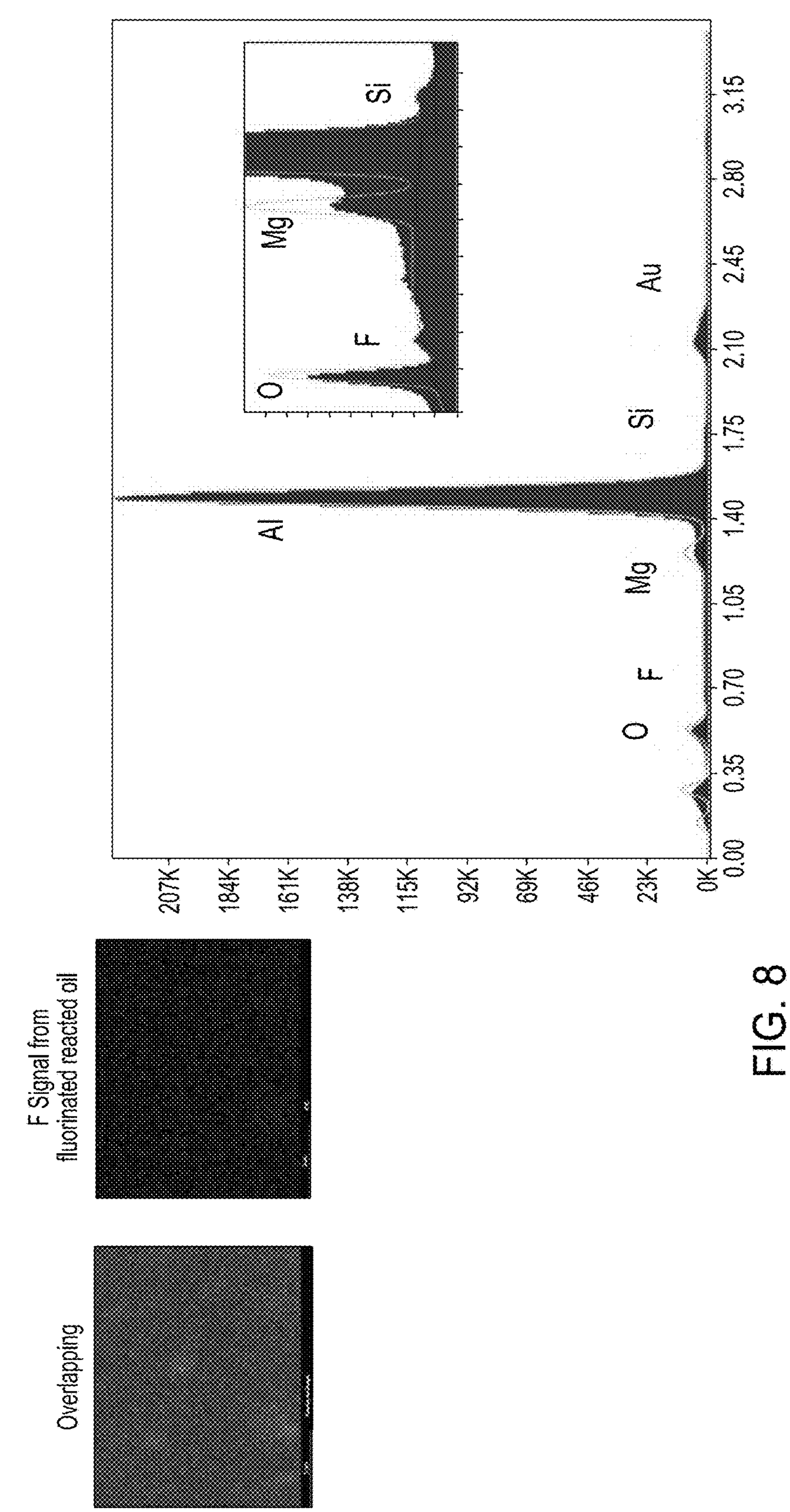

FIG. 8 shows the element mapping and the EDS spectrum of the abraded coating. The left four figures are respectively the SEM topology, Si signal mapping, F signal mapping, and overlapping of Si and F signal. The right figure is the EDS spectrum with F and Si peaks highlighted. The insert is the enlarged EDS spectrum to show the F and Si peaks. The polymer-to-silica ratio was 1 to 1 and the composite-to-solvent ratio was 1 to 4 for all the coatings and the lubricant used in the coatings was FLUOROLINK™ D10/H hydroxyl terminated PFPE oil. The coating was imaged after 10,000 CS-10 abrasion under the load of 1.1 kg.

Figures 9A, 9B, 9C:
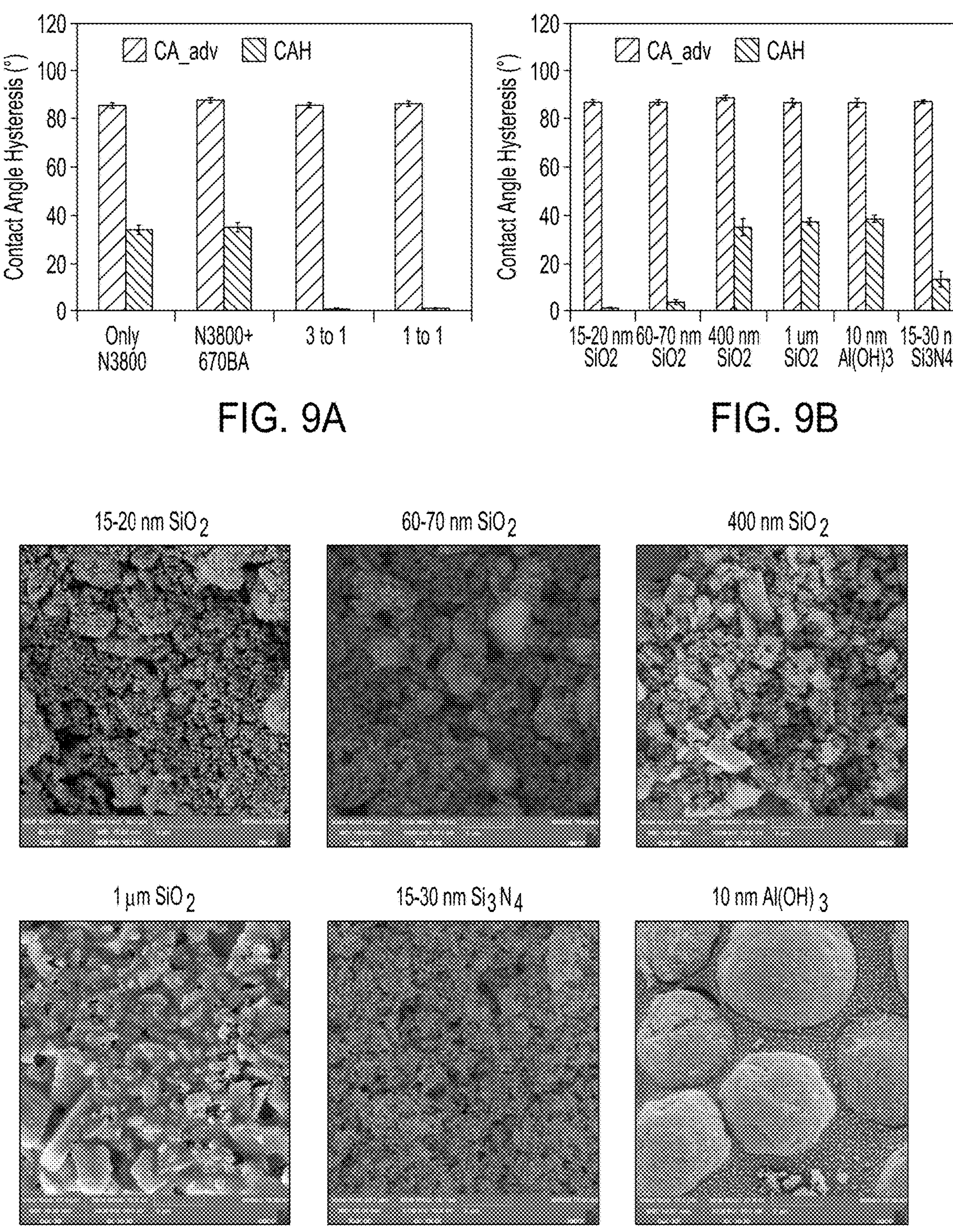

FIG. 9A-9C show the experiments to check the role of each component in the coating. FIG. 9A shows the contact angle hysteresis for coatings with different compositions. The polymer-to-nanoparticle ratio was 1 to 1 and the composite-to-solvent ratio was 1 to 12 for all coatings in FIG. 9A. FIG. 9B shows the contact angle hysteresis for coatings with different fillers. FIG. 9C shows the SEM images for coatings with different fillers. The polymer-to-nanoparticle ratio was 1 to 1 and the composite-to-solvent ratio was 1 to 4 for all coatings in FIG. 9B-9C. All the coatings were infused with 100 cSt hydroxyl terminated silicone oil as a lubricant in FIG. 9. The error bars show the standard deviations of at least 5 independent measurements.

Figures 10, 11A:
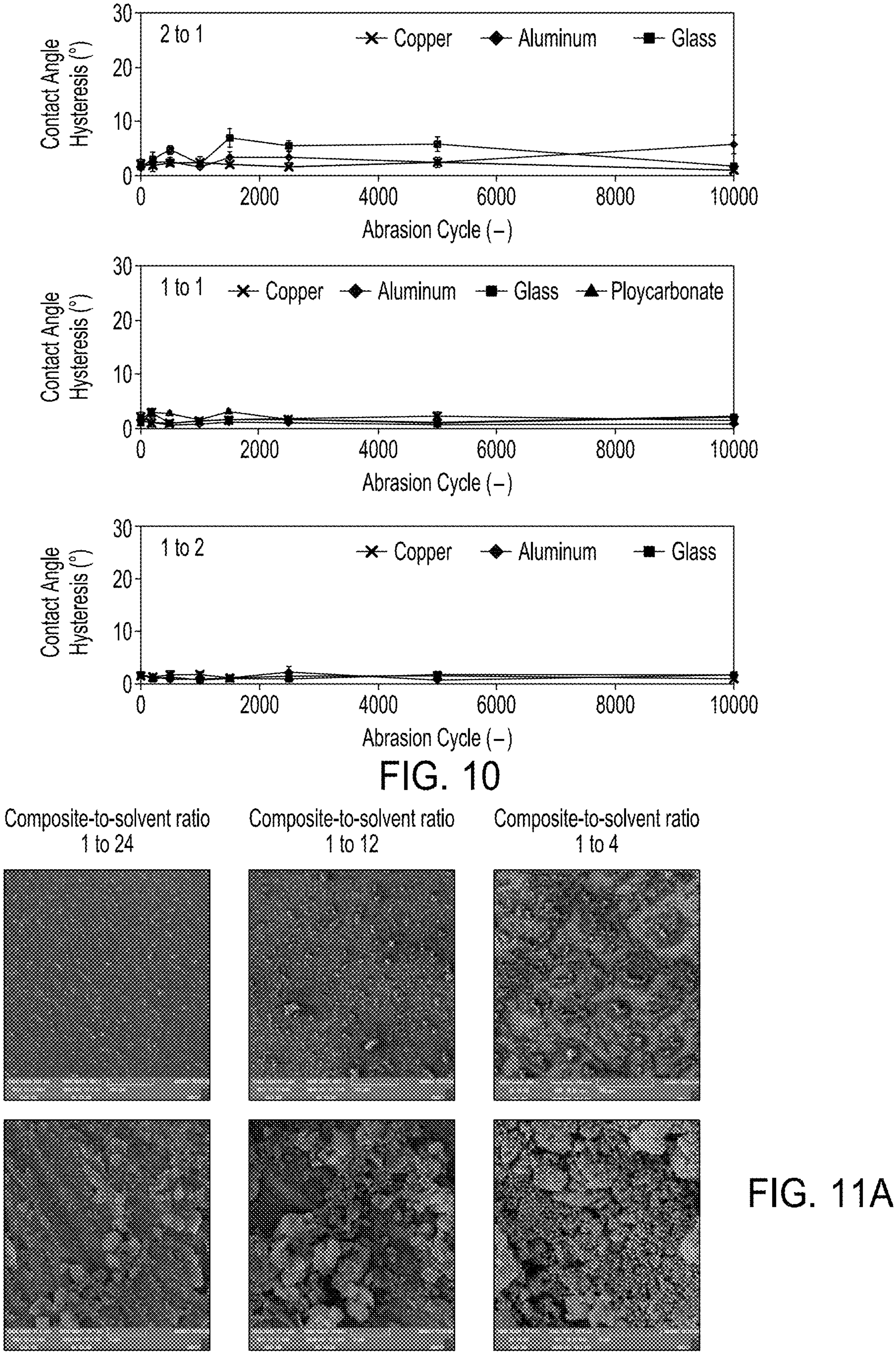

FIG. 10 shows the relationship between the abrasion cycle and contact angle hysteresis of the coatings with different polymer-to-silica ratios (noted at the up-left corners) on various substrates. The composite-to-solvent ratio was 1 to 4 and the lubricant was 100 cSt hydroxyl terminated silicone oil. The error bars show the standard deviations of at least 5 independent measurements.

Figure 11B:
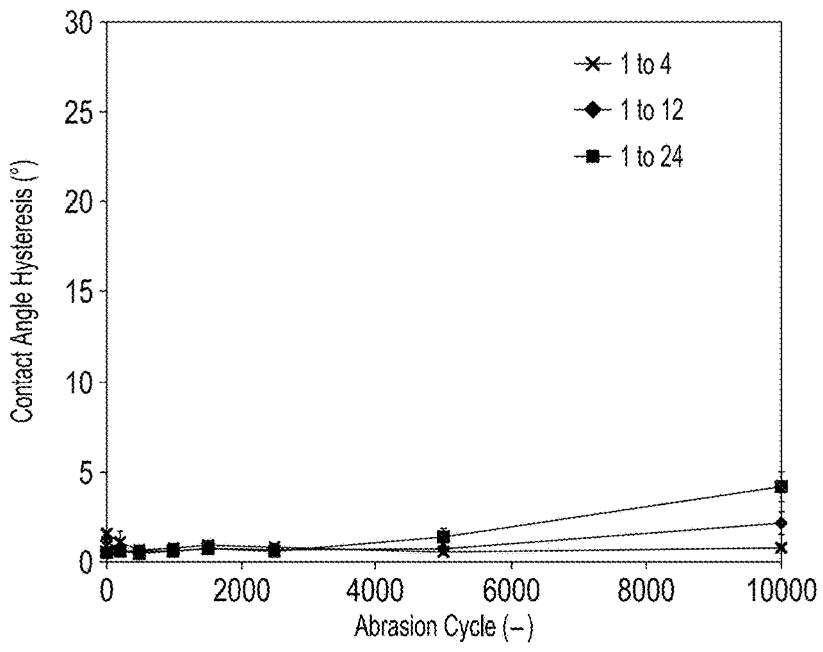

FIG. 11A-11B show the SEM topology and the relationship between the abrasion cycle and contact angle hysteresis of the coatings with different composite-to-solvent ratios. FIG. 11A shows the SEM topology while FIG. 11B shows the relationship between the abrasion cycle and contact angle hysteresis. The polymer-to-silica ratio was 1 to 1 and the lubricant was 100 cSt hydroxyl terminated silicone oil. The error bars show the standard deviations of at least 5 independent measurements.

Figure 12:
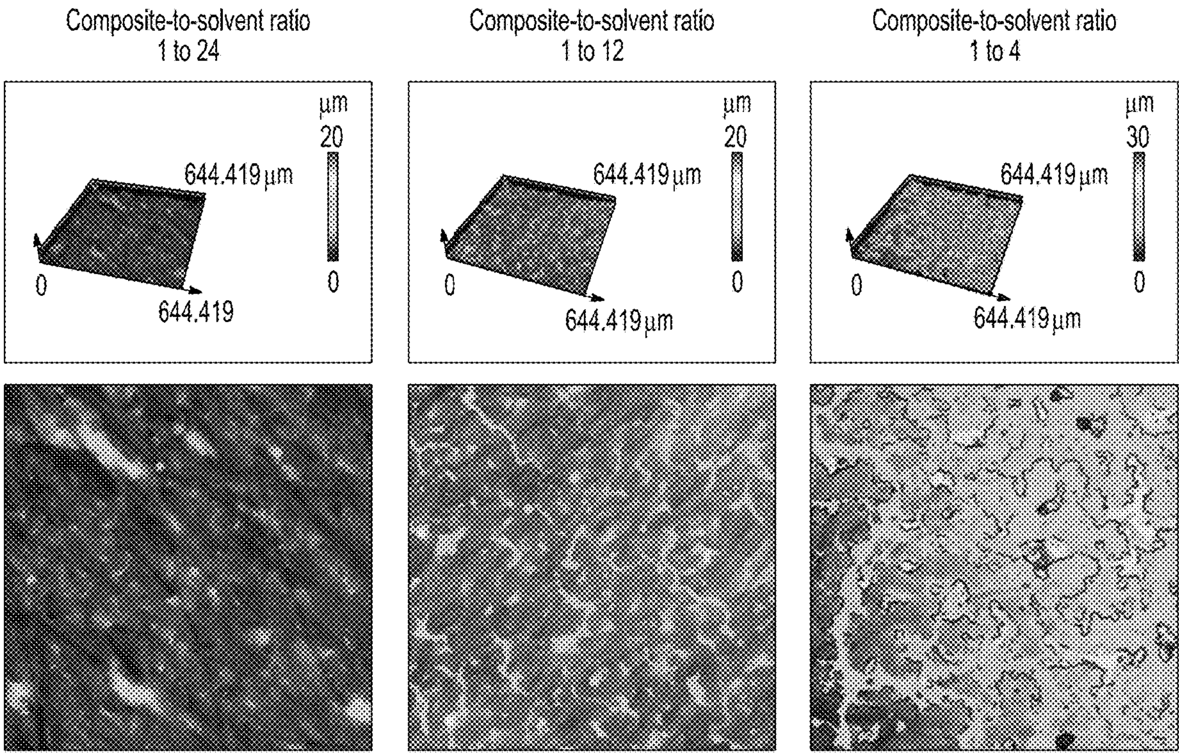

FIG. 12 shows the LEXT 3D topology of coatings with different composite-to-solvent ratios. The polymer-to-silica ratio was 1 to 1 and the lubricant was 100 cSt hydroxyl terminated silicone oil.

Figures 13A, 13B:
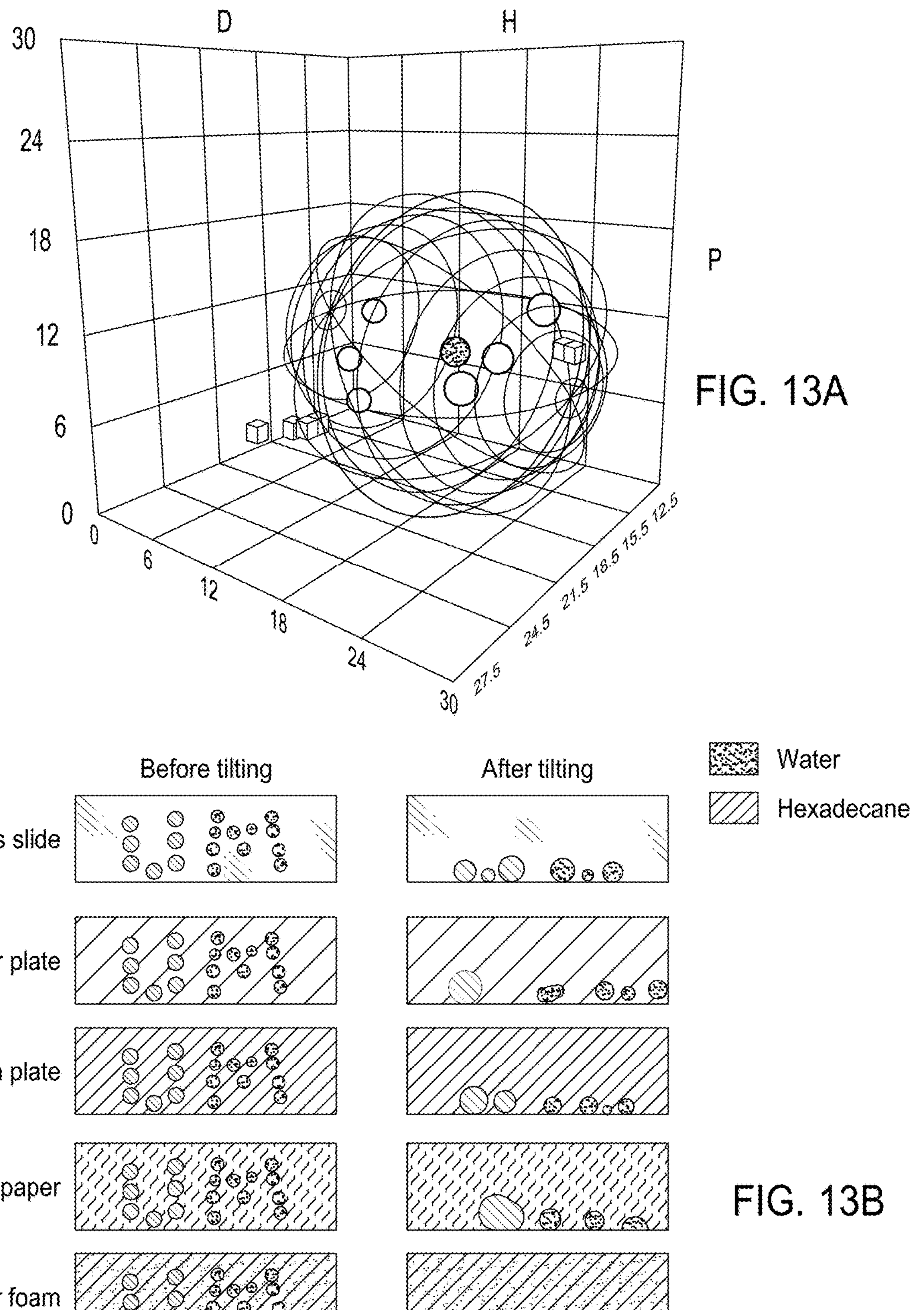

FIG. 13A-13B show the Hansen solubility analysis of the fluorinated lubricant FLUOROLINK™ D10/H and the omniphobicity on various substrates. FIG. 13A shows the Hansen solubility diagram of the fluorinated lubricant. FIG. 13B shows that water (blue) and hexadecane (red) can be easily removed from various coated substrates using FLUOROLINK™ D10/H as a lubricant.

Figures 14A, 14B, 14C:
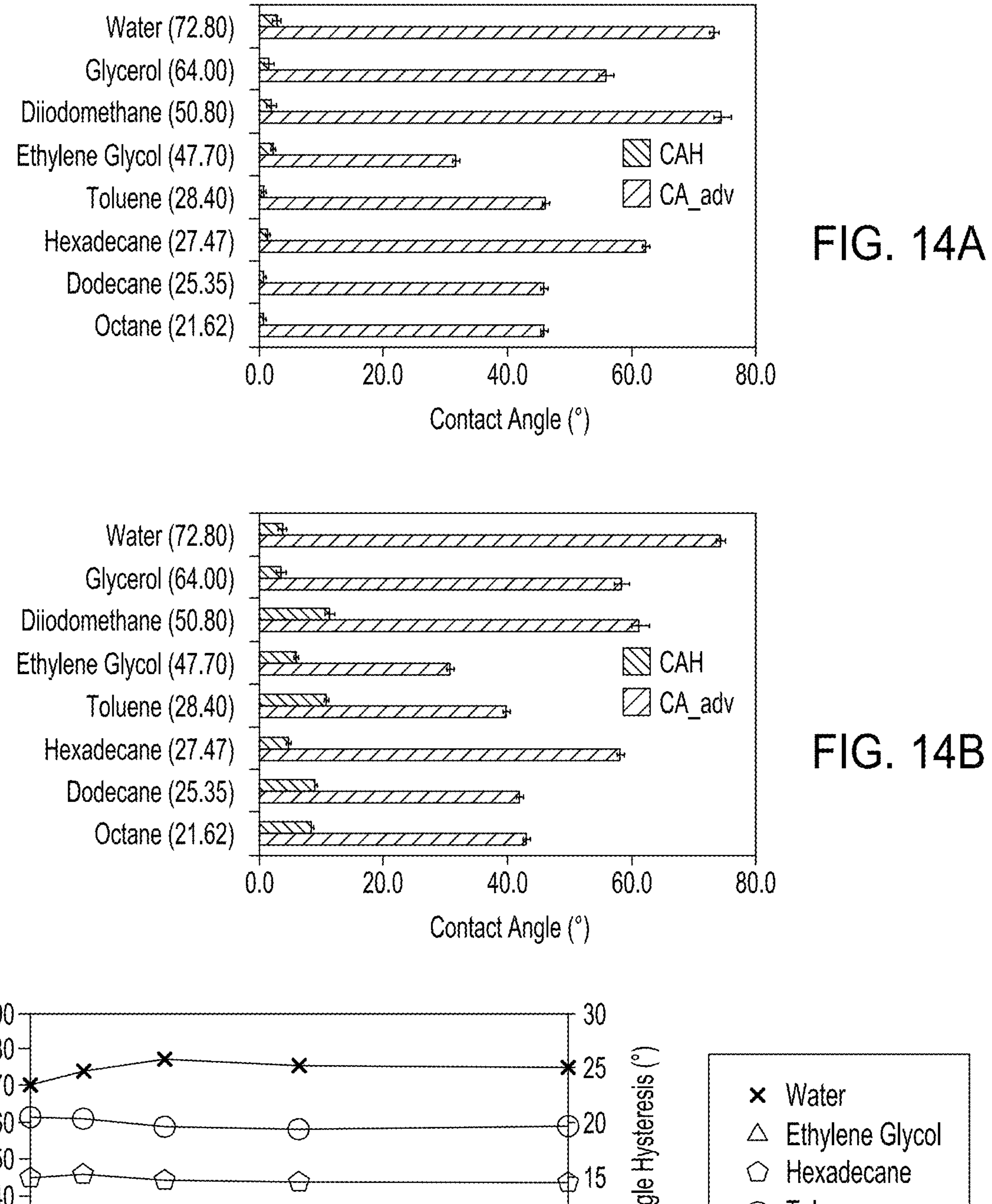

FIG. 14A-14C show the omniphobicity and abrasion durability on various liquids for both flat and porous substrate. FIG. 14A shows the advancing contact angle (blue) and contact angle hysteresis (orange) on various liquids (the numbers in the brackets denote the value of surface tension, unit: mN/m) on flat aluminum substrates. FIG. 14B shows the advancing contact angle (blue) and contact angle hysteresis (orange) on various liquids (the numbers in the brackets denote the value of surface tension, unit: mN/m) on copper foam substrates. FIG. 14C shows the relationship between the abrasion cycle and both advancing contact angle and contact angle hysteresis on various liquids on flat aluminum substrates. The X mark denotes the advancing contact angle and the cross sign denotes the contact angle hysteresis. The polymer-to-silica ratio was 1 to 1 and composite-to-solvent ratio was 1 to 4. FLUOROLINK™ D10/H hydroxyl terminated PFPE oil was used as a lubricant. The error bars show the standard deviations of at least 5 independent measurements.

FIG. 15A-15C show that coatings with different coating methods can still approach similar omniphobicity and abrasion durability. FIG. 15A shows that water (blue) and hexadecane (red) can be easily removed from various coated substrates using different methods. FIG. 15B shows the SEM topology of the coatings using different methods. FIG. 15C shows the relationship between the abrasion cycle and both advancing contact angle and contact angle hysteresis on various liquids on coated flat aluminum substrates using different methods.

Figure 16:
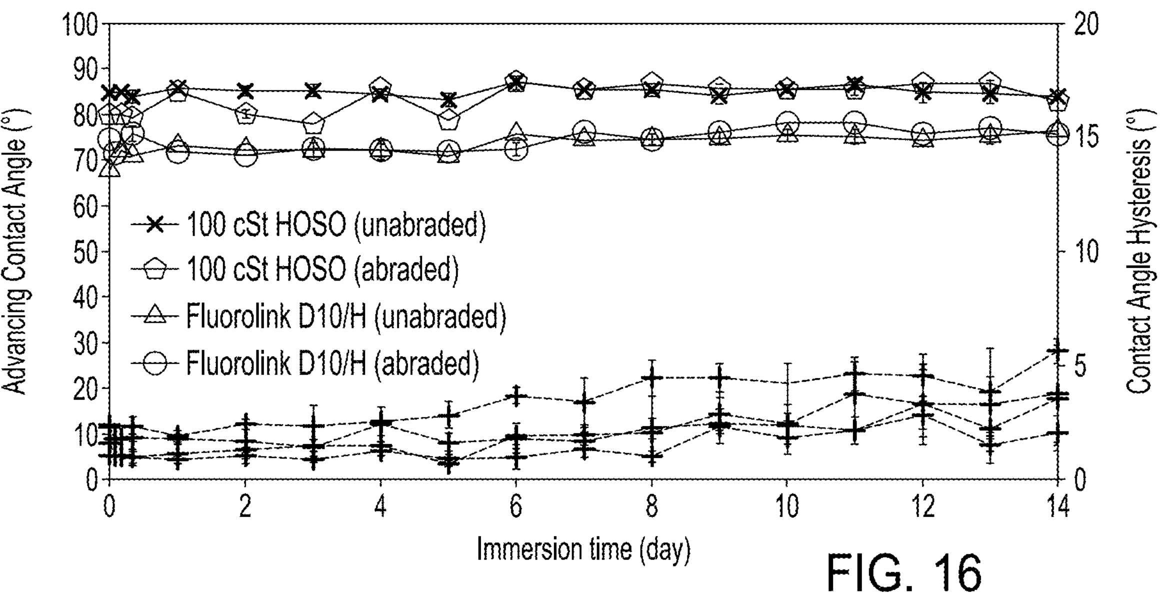

FIG. 16 shows the wettability performance of the unabraded/abraded coatings after DI water immersion. The abraded coatings were abraded by CS-10 abrader for 1000 cycles under 1.1 kg load. The X mark denotes the advancing contact angle and the cross sign denotes the contact angle hysteresis. Yellow and orange colors respectively represent unabraded and abraded coating infused with hydroxyl terminated silicone oil of 100 cSt viscosity. Blue and green colors respectively represent unabraded and abraded coating infused with hydroxyl terminated fluorinated oil FLUOROLINK™ D10/H. The polymer-to-silica ratio was 1 to 1 and the composite-to-solvent ratio was 1 to 4 in the coatings tested in FIG. 16. The error bars show the standard deviations of at least 5 independent measurements.

Figure 17A:
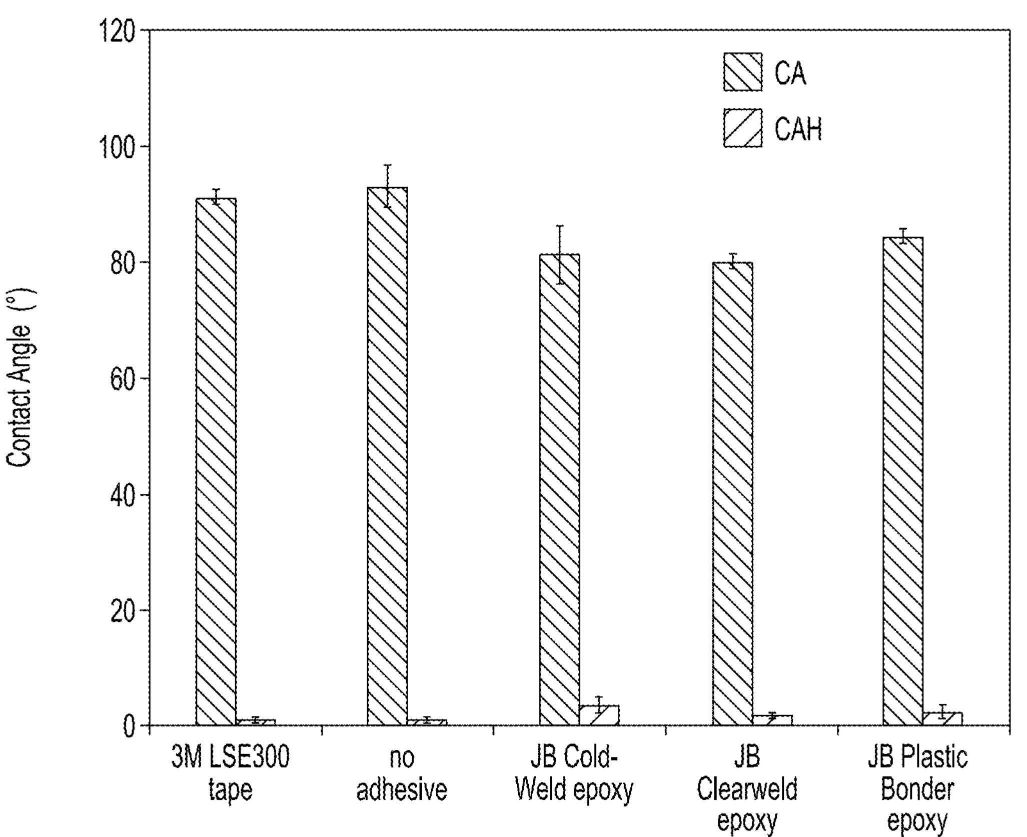
Figure 17B:
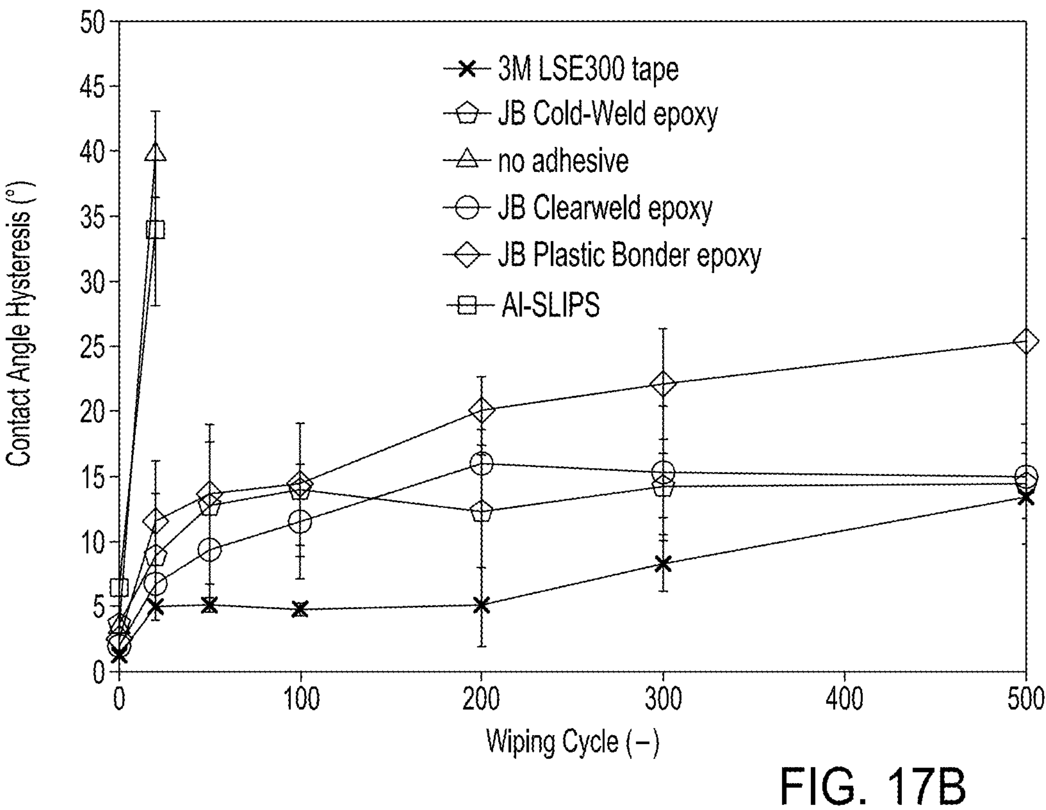
Figure 17C:
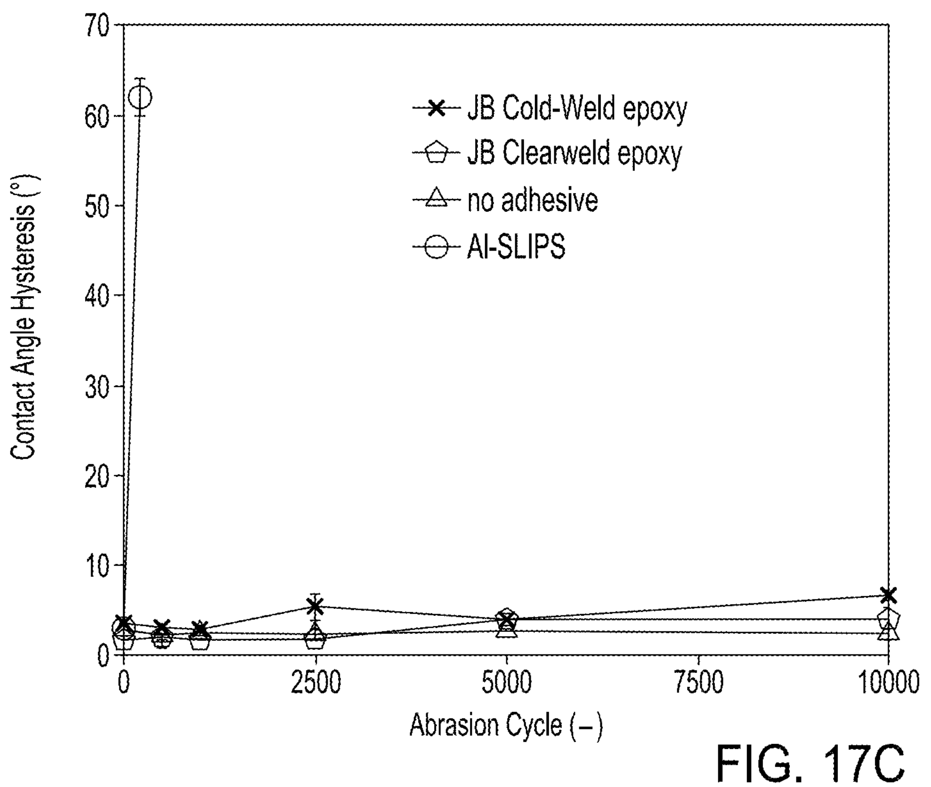

FIG. 17A-17C show the wetting performance of the coatings with and without adhesives as a medium after wiping and abrasion. FIG. 17A shows the advancing contact angle and the contact angle hysteresis of the coatings without any damage. FIG. 17B shows the relationship between wiping cycles and contact angle hysteresis. The substrates were wiped by a piece of Kimwipes under 350 g load. FIG. 17C shows the relationship between abrasion cycles and contact angle hysteresis. The substrates were abraded by CS-10 abrader under 1.1 kg load. The polymer-to-silica ratio was 1 to 1 and composite-to-solvent ratio was 1 to 6. 100 cSt hydroxyl terminated silicone oil was used as a lubricant. The error bars show the standard deviations of at least 5 independent measurements.

Figure 18:
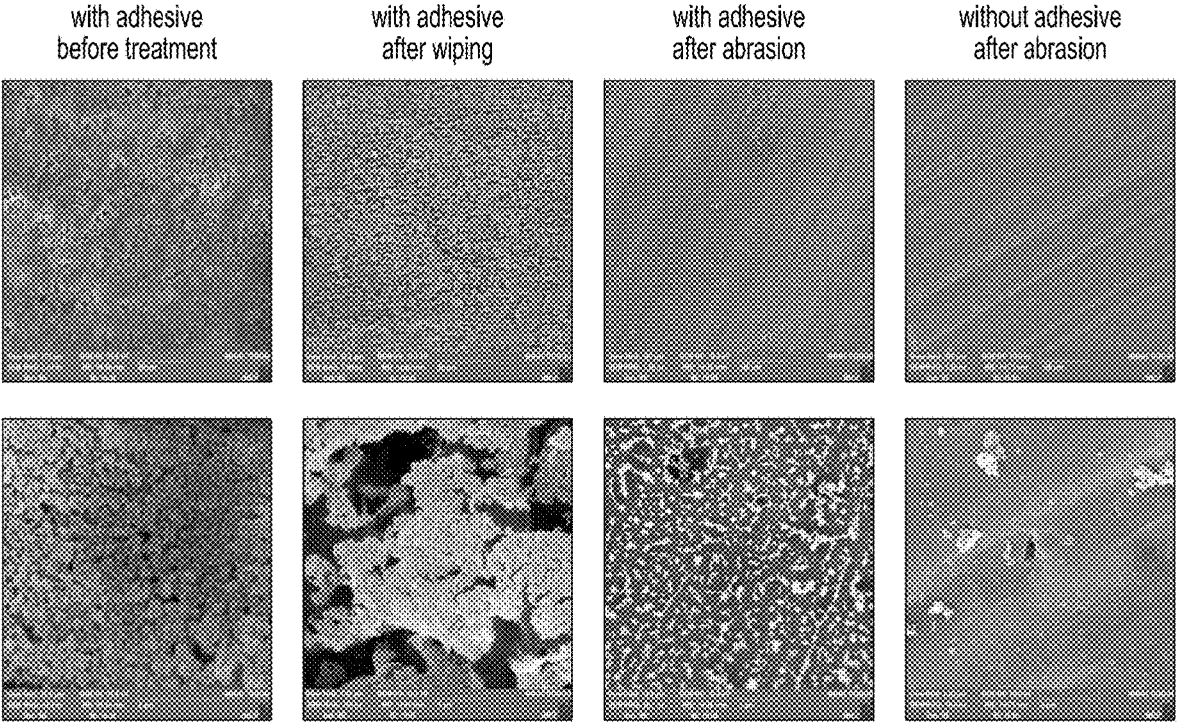

FIG. 18 shows the SEM topology of the coatings with and without adhesive (J-B Weld ClearWeld epoxy as an example) under different treatments (no treatment, wiping, and abrasion). The wiping test was 500 wiping cycles by Kimwipe under a 350 g load and the abrasion test was 10,000 CS-10 abrasion cycles under a 1.1 kg load. The polymer-to-silica ratio was 1 to 1 and the composite-to-solvent ratio was 1 to 6. 100 cSt hydroxyl terminated silicone oil was used as a lubricant.

Figure 19A:
Figure 19A:
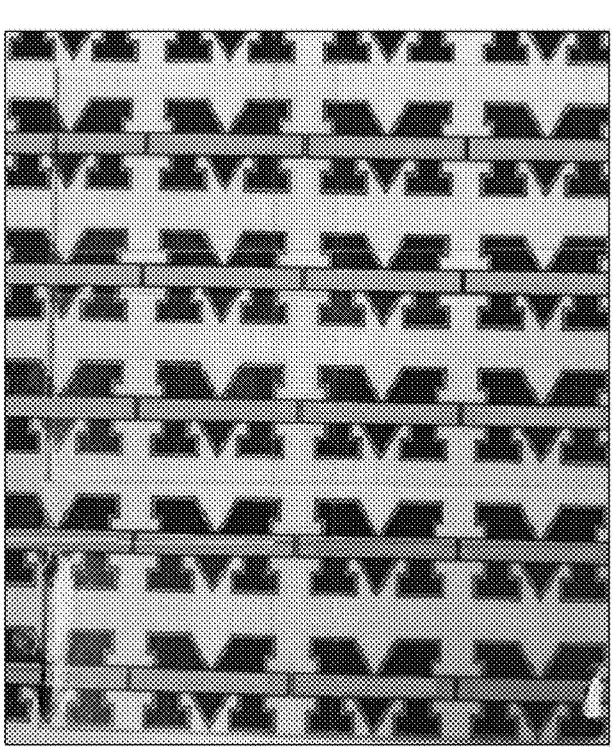

FIG. 19A-19D show the transparency and wetting performance of the transparent coatings with and without transparent epoxy J-B Weld ClearWeld as an adhesive after wiping and abrasion. FIG. 19A shows the image of uncoated glass with epoxy, coated glass without epoxy, and coated glass with epoxy. FIG. 19B shows the UV-Vis absorbance of uncoated glass, coated glass without epoxy, uncoated glass with epoxy, and coated glass with epoxy. FIG. 19C shows the relationship between wiping cycles and contact angle hysteresis. The substrates were wiped by a piece of Kimwipes under a 350 g load. FIG. 19D shows the relationship between abrasion cycles and contact angle hysteresis. The substrates were abraded by CS-10 abrader under a 1.1 kg load. The polymer-to-silica ratio was 1 to 1 and the composite-to-solvent ratio was 1 to 48. 100 cSt hydroxyl terminated silicone oil was used as a lubricant. The error bars show the standard deviations of at least 5 independent measurements.

Figure 20:
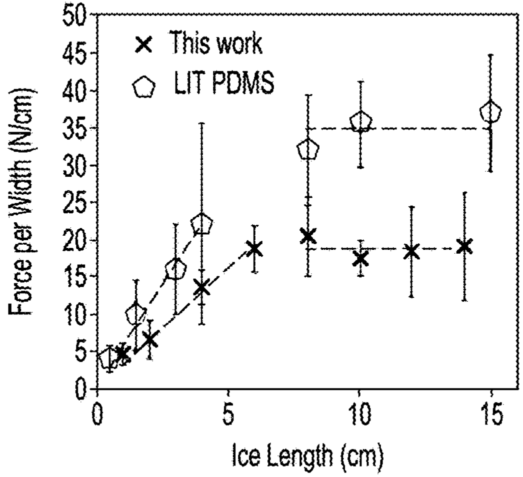

FIG. 20 shows the comparison of ice-shedding behaviors between this work and LIT PDMS. The left figure shows the relationship between detachment force per width and ice length. The right table shows the adhesion strength, critical force per width, and interfacial toughness. The polymer-to-silica ratio was 1 to 1 and the composite-to-solvent ratio was 1 to 4 for all coatings. 100 cSt hydroxyl terminated silicone oil was used as a lubricant. The error bars show the standard deviations of at least 4 independent measurements.

Figure 21A:
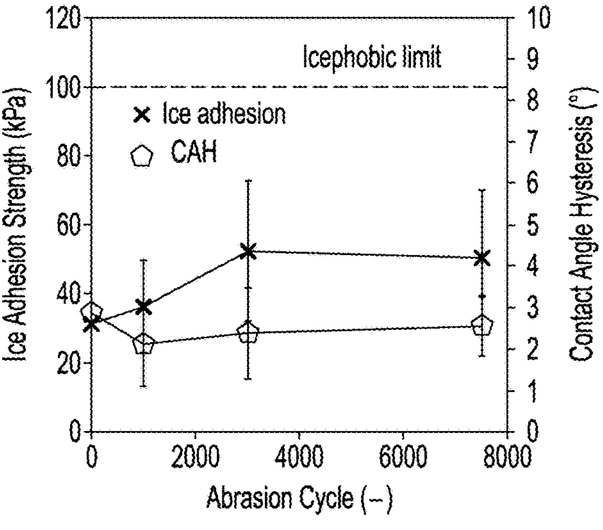
Figure 21A:
Figure 21B:
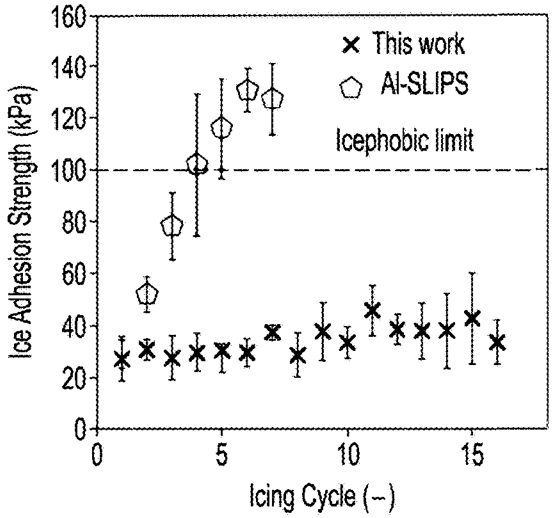

FIG. 21A-21B show the durability of both abrasion and icing cycle. FIG. 21A shows the relationship of both ice adhesion strength and contact angle hysteresis and abrasion cycle. The blue line represents the ice phobic limit ($\tau_{ice}$<100 kPa). FIG. 21B shows the relationship between ice adhesion strength and icing cycle for an embodiment according to certain variations of the present disclosure and the usual aluminum-based SLIPS. The polymer-to-silica ratio was 1 to 1 and composite-to-solvent ratio was 1 to 4 for all coatings. 100 cSt hydroxyl terminated silicone oil was used as a lubricant. The error bars show the standard deviations of at least 4 independent measurements.

Figure 22A:
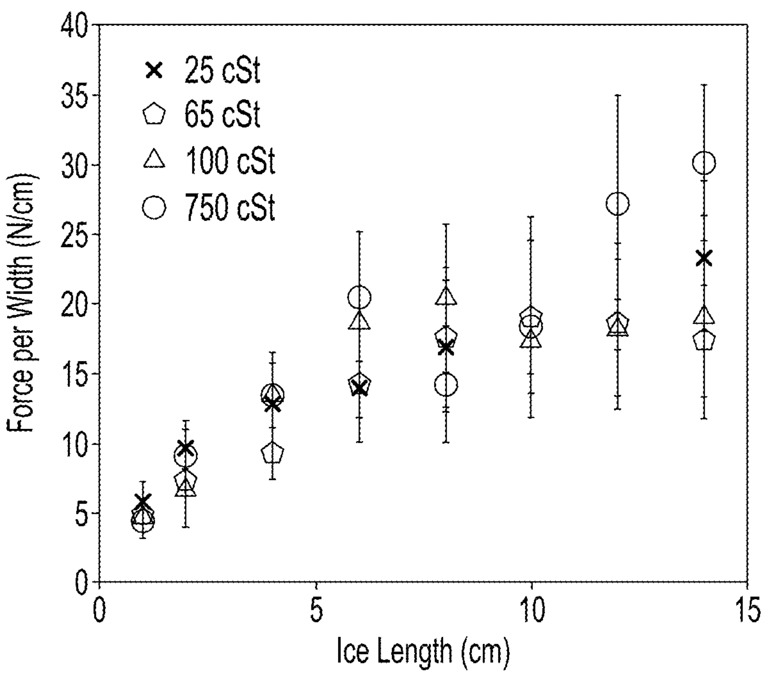
Figure 22B:
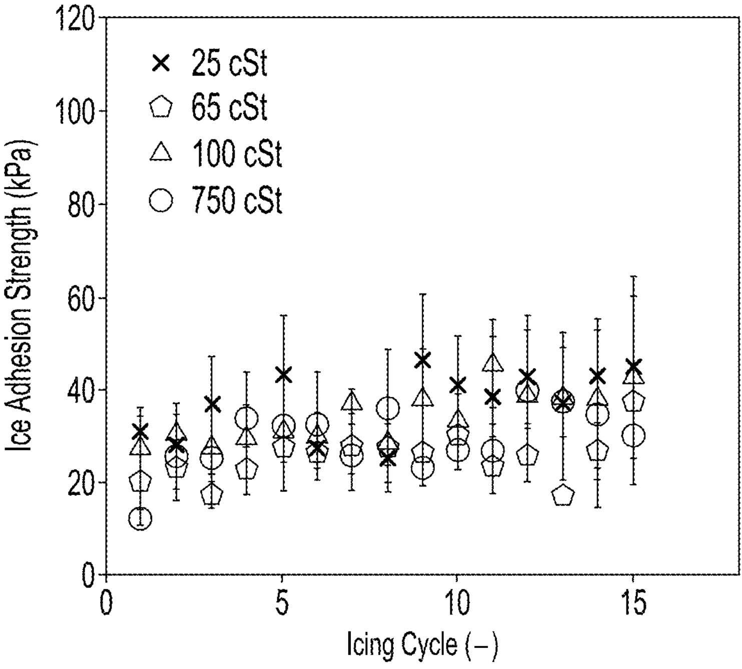

FIG. 22A-22C show the ice-shedding behaviors of the coatings with different viscosities. FIG. 22A shows the relationship between ice length and force per width. FIG. 22B shows the relationship between the icing cycle and ice adhesion strength. FIG. 22C shows the viscosity dependency of adhesion strength and interfacial toughness. The error bars show the standard deviations of at least 4 independent measurements.

FIG. 23A-23B show the ice-shedding behaviors of the coatings with different composite-to-solvent ratios. FIG. 23A shows the relationship between ice length and force per width. FIG. 23B shows the relationship between the icing cycle and ice adhesion strength. The polymer-to-silica ratio was 1 to 1 for all coatings. 100 cSt hydroxyl terminated silicone oil was used as a lubricant. The error bars show the standard deviations of at least 4 independent measurements.

FIG. 24A-24B show the ice-shedding behaviors of the coatings fabricated by different methods (spin-coating and drop-casting). FIG. 24A shows the relationship between ice length and force per width. FIG. 24B shows the relationship between the icing cycle and ice adhesion strength. The polymer-to-silica ratio was 1 to 1 and composite-to-solvent ratios were 1 to 4 for spin-coating and 1 to 12 for drop-casting for all coatings. 100 cSt hydroxyl terminated silicone oil was used as a lubricant. The error bars show the standard deviations of at least 4 independent measurements.

FIG. 25A-25B show the ice-shedding behaviors of the coatings with tape or without tape as a medium. FIG. 25A shows the relationship between ice length and force per width. FIG. 25B shows the relationship between the icing cycle and ice adhesion strength. The polymer-to-silica ratio was 1 to 1 and the composite-to-solvent ratio was 1 to 4 for all coatings. 100 cSt hydroxyl terminated silicone oil was used as a lubricant. The error bars show the standard deviations of at least 3 independent measurements.

FIG. 26A-26C show the ice-shedding behaviors and SEM images of the coatings with different polymer-to-silica ratios. FIG. 26A shows the relationship between ice length and force per width. FIG. 26B shows the relationship between the icing cycle and ice adhesion strength. FIG. 26C shows the micro topology of the coatings with different polymer-to-silica ratios. The composite-to-solvent ratio was 1 to 4 for all coatings. 100 cSt hydroxyl terminated silicone oil was used as a lubricant. The error bars show the standard deviations of at least 4 independent measurements.

FIG. 27 shows the icing event durability of the coatings with different lubricant viscosities and polymer-to-silica ratios. The composite-to-solvent ratio was 1 to 4 for all coatings. The error bars show the standard deviations of at least 4 independent measurements.

FIG. 28A-28B show the ice-shedding behaviors of the coatings fabricated on different porous substrates. "X to X" denotes the polymer-to-silica ratio of the coating. FIG. 28A shows the relationship between ice length and force per width. FIG. 28B shows the relationship between the icing cycle and ice adhesion strength. The composite-to-solvent ratios were 1 to 4 for aluminum plates, 1 to 12 for PP filter paper, and 3 to 4 for copper foam. 100 cSt hydroxyl terminated silicone oil was used as a lubricant. The error bars show the standard deviations of at least 4 independent measurements.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Unless otherwise indicated, percentages and ratios are by mass/weight.

The disclosures and relevant content of all references cited or discussed in this disclosure are incorporated by reference herein, unless otherwise indicated.

Example embodiments will now be described more fully with reference to the accompanying drawings.

Surfaces exposed to real-world conditions are often immersed in complex environments, facing both liquid and solid fouling. These surface fouling issues may have significant consequences, for example, affecting long-term performance of machines and human health. Further, fouling simultaneously involve multiples phases of foulants and fouling length-scales, making them extremely challenging to prevent. While numerous liquid or solid-repellent surfaces have been developed using a wide variety of approaches, all such surfaces suffer from poor mechanical durability, and as a consequence, in spite of numerous potential applications, no such surfaces have undergone widespread utilization or commercialization.

Additionally, typically the design of solid-repellent coatings is very different from liquid-repellent coatings, and thus far a durable coating that can repel both liquids and solids has not been developed.

The present disclosure provides a durable novel coating that comprises a lubricant-reacted porous structure that exhibits excellent liquid and solid (e.g., ice) repellency. Via systematic lubricant selection, omniphobicity (e.g., hydrophobic and oleophobic surfaces and in certain aspects, superhydrophobic and superoleophobic surfaces) can be fulfilled and thus the coating can repel both high and low surface tension liquids, such as water and hydrocarbons, e.g., the contact angle hysteresis can be lower than 5 degrees for various liquids. For example, by partially crosslinking a lubricant within a nano-composite coating, a new durable surface is provided that repels virtually all solid- and liquid-foulants. The coatings are particularly well suited for shedding ice and can display both icephobic (e.g., advantageous properties for shedding ice over small areas) and low interfacial toughness (e.g., advantageous for shedding ice over larger areas) properties. In particular, the low interfacial toughness values observed for certain coatings prepared in accordance with the present disclosure fall below the theoretical limit predicted in the literature.

The coatings of the present disclosure can also be applied on a variety of different substrates, regardless of surface topology, while still maintaining good liquid repellency. Further, the durable coating exhibits excellent ice-shedding performance, exhibiting both low ice adhesion and low interfacial toughness. The observed interfacial toughness is very low and even lower than the interfacial toughness when only considering Van der Waals interaction. As will described further herein, this may be because the fracture is dominated by lubricant liquid bridges in lubricated systems. Plus, the performance of the coating can be maintained, even after the porous structure is damaged. As such, the coating provides outstanding icing event durability and abrasion resistance for ice shedding. It also performs excellent abrasion and water immersion resistance for liquid repellency. In certain variations, the coating can be transparent and achieve excellent wiping resistance, for example, by applying epoxy as an adhesive. As a result, the outstanding performance and durability for both liquid repellency and ice shedding make the coating suitable for various applications.

As background and noted previously above, lubricated surfaces that try to maximize liquid and solid repellency may involve coatings of lubricant-infused surfaces (also known as LIS) where a stable lubricant film is formed on a surface via polymer brush grafting or slippery lubricant infused porous surface (SLIPS). Polymer brush grafting utilizes the Van der Waals force between lubricant and polymer brush to form a stable lubricant layer. Slippery lubricant-infused porous surfaces utilize a porous surface such as polymer matrix and micro-structures that provides a surface tension to generate a strong interaction between the porous surface and lubricant.

In the aspect of liquid repellency, the contact angle hysteresis of a lubricant-infused surface is usually lower than 2 degrees due to the atomically smooth lubricant surface of the lubricant. The low contact angle hysteresis enables subtle resistant force for drop removal and even can achieve spontaneous thermocapillary or Laplace droplet motion. Also, repellency of low surface tension liquids can be fulfilled via an appropriate selection of lubricant based on solubility and interaction between liquid, lubricant, and solid surface, which is beneficial for multiple functions such as low surface tension liquid condensation or self-cleaning surfaces. Based on the above benefits, LIS is promising for wide applications such as condensation enhancement, anti-icing, ice-shedding behaviors, anti-fogging, and anti-fouling.

In the aspect of ice shedding, icing events can have a large impact on society from the perspective of economics and safety. The accretion of ice on surfaces may cause higher energy costs for transportation or heat transfer and also some safety issues in industrial systems, such as aircraft, ships, power lines, and wind turbines. Passive ice shedding is being studied worldwide to increase economic benefits and reduce fatal accidents. Several strategies have been proposed to fulfill passive ice-shedding, mainly based on six mechanisms: 1) low surface energy 2) lubrication 3) interfacial slippage 4) shear-induced surface instability 5) low interfacial toughness 6) crack initiators.

Within those mechanisms, low interfacial toughness is especially important for large-scale ice shedding. Two parameters are widely used to quantify ice adhesion behaviors, apparent ice adhesion strength $\tau_{ice}$ ($\equiv$F/A, denoting the force F required to debond ice of a specific area A from surfaces) and critical detachment force per width $\tilde{F}_{ice}$ ($-\equiv$F/ w, denoting the force F required to debond ice of a specific width w perpendicular to the force direction from surfaces). When ice length is less than a critical length (so-called nominal cohesive length), the ice adhesion behavior is strength-controlled, showing a linear relationship between $\tilde{F}_{ice}$ and ice length albeit the independency of the ice length on ice adhesion strength ($\tau_{ice}$). Usually, a coating can be regarded as an icephobic material when its apparent ice adhesion strength ($t_{ice}$) is less than or equal to about 100 kPa. Further, it is desirable to be able to remove ice passively from a surface without inputting significant amounts of external energy (whether mechanical, chemical, or thermal) to remove the ice. The passive removal of ice typically requires much lower values of $t_{ice}$ for applications such as airplane wings ($t_{ice} \leq 50$ kPa).

When ice length is greater than a certain critical value, the ice adhesion is then toughness-controlled. In this regime, $\tilde{F}_{ice}$ is independent of ice length. Thus, how to decrease ice adhesion strength in the strength-controlled regime and lower the interfacial toughness in the toughness-controlled regime is important for lowering ice adhesion. Unfortunately, polymeric coatings usually encounter a design paradox for simultaneous low adhesion strength and interfacial toughness. To address this issue, a lubricated composite coating is provided by the present teachings that concurrently provides low ice adhesion strength and low interfacial toughness, as will be described further below.

Although there are a plethora of promising applications for lubricant-infused surfaces, oil depletion is a significant issue. Due to the intrinsic mobility of lubricants as liquids, lubricants are inevitably removed from the surfaces in several ways, such as shear flow and ice detachment, causing deterioration in both liquid repellency and ice shedding. Thus, several strategies have been developed to suppress oil depletion, such as systematic selection of lubrication oils, special geometric designs, crosslinked or phase-transition lubricants, and even automatic replenishing system. Though various techniques have been proposed, none of them can fulfill commercial applications because oil depletion leads to an unsuitably low life cycle. Also, the low mechanical durability is problematic, especially in micro-structured SLIPSs. Due to the intrinsic brittleness of the micro-structured metal oxide on the surface, the SLIPSs possess low wear resistance and thus may be easily damaged by environmental factors/interference.

The present disclosure contemplates a robust abrasion resistant lubricated nanocomposite coating having both liquid repellency and ice shedding making it suitable for commercial applications. In various aspects, the present disclosure provides solid-and-liquid repellent polymeric nanocomposite coatings that incorporate partially cross-linked lubricating chains within a durable polymer matrix. As used herein, the durable solid and liquid repellant or anti-fouling nanocomposite material further includes a plurality of nanoparticles distributed therein. The polymeric matrix may comprise polyurethane or fluoropolyurethane, for example, being formed by a first precursor that has a hydroxyl functional group (e.g., a polyol having multiple hydroxy groups) and a second precursor that has a functional group selected from the group consisting of: isocyanate, hydroxyl, and combinations thereof. In certain aspects, the first precursor and second precursor react to form a polymeric precursor that still has a reactive functional group selected from the group consisting of: isocyanate, hydroxyl, and combinations thereof, which is capable of further reacting with other components in the material. The polymeric matrix thus has a plurality of lubricating domains distributed therein, which may be formed by a partial crosslinking reaction between a reactive oil comprising a first reactive group selected from the group consisting of: hydroxyl, amine, carboxylic acid, and combinations thereof and a second reactive functional group selected from the group consisting of: isocyanate, hydroxyl, and combinations thereof. In certain variations, a first reactive group selected from the group consisting of: hydroxyl and a second reactive functional group selected from the group consisting of: isocyanate, hydroxyl, and combinations thereof. In this manner, the lubricating domains are formed from the reactive oil and incorporated into the polymeric matrix.

In certain aspects, the plurality of nanoparticles may comprise silicon dioxide ($SiO_2$ or silica) nanoparticles distributed in the polymeric matrix. In certain variations, the silica particle surfaces bear active oxygen and/or hydroxyl groups that may be at least partially reacted with the second reactive group of the polymeric precursor. A nanoparticle may be a particle having at least one spatial dimension that is less than about 1 μm (i.e., 1,000 nm), optionally less than about 0.5 μm (i.e., 500 nm), optionally less than about 0.4 μm (i.e., 400 nm), optionally less than about 0.3 μm (i.e., 300 nm), optionally less than about 0.2 μm (i.e., 200 nm), and in certain variations, optionally less than about 0.1 μm (i.e., 100 nm). In certain variations, the nanoparticles may have an average diameter of less than or equal to about 60 nm, for example, greater than about 1 nm and less than about 60 nm. It should be noted that so long as at least one dimension of the nanoparticle falls within the above-described nano-sized scale (for example, diameter), one or more other axes may well exceed the nano-size (for example, length and/or width).

In this manner, at least a portion of the plurality of nanoparticles are bonded to the polymeric matrix. The durable solid and liquid repellant or anti-fouling nanocomposite material may be a porous material defining a plurality of pores between the nanoparticles and polymeric matrix, which may be filled with a free lubricant oil and/or solvent, as will be described further herein.

In various aspects, the coating is applied to a substrate, which can form a surface exhibiting solid and liquid repellant or omniphobic properties. By "omniphobic" as used herein, it is meant that a surface of a substrate or a material exhibits both hydrophobic and oleophobic properties (e.g., very low contact angle hysteresis with various liquids), including with respect to water or other polar liquids (e.g., alcohols, dimethyl formamide and the like), as well as to various oils and solids. While traditionally, the term omniphobic refers only to the ability to repel water and oil, in accordance with various aspects of the present disclosure, the term omniphobic means the surface is not only repellant with respect to liquids, but is repellant to solids, as well.

Surfaces that display a contact angle of greater than or equal to about 90° with water or display low contact angle hysteresis (e.g., less than or equal to about 10°), meaning a difference between the advancing $\theta_{adv}$ and the receding contact angle $\theta_{rec}$, are considered to be "hydrophobic." Superhydrophobic surfaces are those that display a contact angle of greater than or equal to about 150° along with low contact angle hysteresis with water.

Surfaces that display a contact angle of greater than or equal to about 90° with a preselected oil (e.g., hydrocarbon), or display low contact angle hysteresis (e.g., less than or equal to about 10°), are considered to be "oleophobic." A "preselected oil" is intended to include any oil or combinations of oils of interest. As discussed herein, in certain non-limiting variations, an exemplary preselected oil used to demonstrate oleophobicity/oleophilicity is rapeseed oil (RSO). Superoleophobic surfaces are those that display a contact angle of greater than or equal to about 150° along with low contact angle hysteresis with preselected low surface tension liquids, such as a representative oil (for example, rapeseed oil (RSO)).

Generally, the omniphobic surfaces prepared in accordance with certain aspects of the present disclosure can repel liquids with a wide range of surface tensions, for example, ranging from greater than or equal to about 10 mN/m to less than or equal to about 72 mN/m. Further, the omniphobic surfaces exhibit solid repellency. For example, the durable solid and liquid repellant material defines an exposed surface that reduces adhesion of solid foulants by greater than or equal to 30% after 30 days as compared to an exposed surface of a comparative polymeric material (for example, the same type of polymeric material as the inventive coating material but lacking the crosslinked lubricating domains described further below). For example, solid repellency of the coatings prepared in accordance with the present disclosure may reduce adhesion of a solid foulant on the surface by greater than or equal to about 30%, optionally greater than or equal to about 50%, and in certain aspects, optionally greater than or equal to about 70% as compared to the comparative polymeric material, for a period of time, for example, 30 days.

In accordance with certain aspects of the present disclosure, durable, robust icephobic materials having sustained low ice adhesion strengths are provided. In certain aspects, the durable icephobic materials are surface coatings on an article. Exemplary and non-limiting articles include parts or components having surfaces potentially exposed to ice and snow conditions, including aircraft, vehicles, marine vessels and marine equipment, outdoor equipment, structures, and buildings, snow or ice removal equipment, outdoor recreational equipment, sports equipment, wind turbines, telecommunications equipment, power lines, combinations and equivalents thereof. Such icephobic materials can provide long-term, durable icephobic properties on such surfaces, including maintaining low ice adhesion strength over time.

In certain aspects, an article may be formed from or include a structural surface layer of the durable solid and liquid repellant nanocomposite material. In other aspects, the solid and liquid repellant materials of the present disclosure may be in the form of a coating on an article, which may be applied to a variety of different surfaces or substrates. The coating materials of the present disclosure are generally compatible with a wide range of substrate materials, as discussed above.

When the durable solid/icephobic and liquid repellant nanocomposite materials of the present disclosure are in the form of a coating on an article, they may be applied to a variety of different surfaces or substrates. The coating materials of the present disclosure are generally compatible with a wide range of substrate materials. Therefore, in certain exemplary embodiments, the substrate may be porous or non-porous and may formed of plastic or polymeric materials, metallic materials, inorganic materials, organic materials (such as materials derived from plants or animals), and combinations thereof. In certain aspects, the substrate is constructed from one or more materials selected from the group consisting of metal, such as sheet metal, cast metal, forged metal, metal foam, and the like, composite materials comprising resin and reinforcing materials, plastic or polymeric materials, screens, mesh, paper, fibrous materials and cloth, foam, equivalents, and combinations thereof. The substrate may also comprise a plurality of three-dimensional structures, such as pillars, nubs, posts, ribs, and the like.

In certain variations, where the durable icephobic/solid and liquid repellant nanocomposite materials of the present disclosure are in the form of a polymeric/elastomeric coating on a surface or substrate, where the coating may have a thickness of greater than or equal to about 0.5 micrometers (m), optionally greater than or equal to about 1 m, optionally greater than or equal to about 5 m, optionally greater than or equal to about 10 m, optionally greater than or equal to about 25 m, optionally greater than or equal to about 50 m, optionally greater than or equal to about 75 m, optionally greater than or equal to about 100 m, optionally greater than or equal to about 200 m, optionally greater than or equal to about 300 m, optionally greater than or equal to about 400 am, optionally greater than or equal to about 500 am, optionally greater than or equal to about 600 am, optionally greater than or equal to about 700 am, optionally greater than or equal to about 800 am, optionally greater than or equal to about 900 am, optionally greater than or equal to about 1,000 m (1 mm), optionally greater than or equal to about 2,000 m (2 mm), optionally greater than or equal to about 3,000 m (3 mm), optionally greater than or equal to about 4,000 m (4 mm), and in certain variations, optionally greater than or equal to about 5,000 m (5 mm). In certain aspects, the durable solid and liquid repellant coating materials of the present disclosure may optionally have a thickness ranging from greater than or equal to about 1 m to less than or equal to about 100 μm. In certain other variations, the durable solid and liquid repellant nanocomposite coating materials of the present disclosure may optionally have a thickness ranging from greater than or equal to about 1 m to less than or equal to about 10 am.

The durable icephobic/solid and liquid repellant nanocomposite material in certain variations of the present disclosure may exhibit an initial ice adhesion strength ($\tau_{ice}$) of less than or equal to about 100 kPa before exposure to any icing conditions. In certain variations, suitable ice adhesion strengths ($t_{ice}$) exhibited by the durable icephobic materials of the present disclosure are optionally less than or equal to about 80 kPa, optionally less than or equal to about 70 kPa, optionally less than or equal to about 60 kPa, optionally less than or equal to about 50 kPa, optionally less than or equal to about 40 kPa, optionally less than or equal to about 30 kPa, optionally less than or equal to about 20 kPa, optionally less than or equal to about 15 kPa, optionally less than or equal to about 10 kPa, optionally less than or equal to about 9 kPa, optionally less than or equal to about 8 kPa, optionally less than or equal to about 7 kPa, optionally less than or equal to about 6 kPa, optionally less than or equal to about 5 kPa, optionally less than or equal to about 4 kPa, optionally less than or equal to about 3 kPa, optionally less than or equal to about 2 kPa, and in certain variations, optionally less than or equal to about 1 kPa. A surface enabling passive removal of ice typically requires very low values of ice adhesion strengths, which is an advantage provided by the durable icephobic materials of the present disclosure. For example, passive removal of ice occurs in different applications at different ice adhesion strengths, for example, $\tau_{ice}$<50 kPa for airplane wings or $\tau_{ice}$<20 kPa for power lines, by way of non-limiting example. The durable icephobic surfaces of certain variations of the present disclosure have ice adhesion strengths below these levels and thus facilitate passive removal of ice from such surfaces.

Further, the surfaces of the present disclosure provide durable or robust icephobic properties resulting in ice adhesion strength after 10 cycles of icing and deicing conditions that increases less than or equal to about 50% above the initial ice adhesion strength. For example, certain durable icephobic coatings prepared in accordance with the present disclosure have ice adhesion strength levels (e.g., $\tau_{ice}$<10 kPa) that can be maintained over many icing/de-icing cycles, after harsh mechanical abrasion, and even in wintery outdoor freezing conditions (in Michigan) over several months of exposure. Thus, after 10 cycles of icing and deicing, a durable icephobic coating having an initial ice adhesion strength ($t_{ice-initial}$) of less than or equal to about 10 kPa has a subsequent ice adhesion strength after 10 icing/deicing cycles (tice-cycling) that remains less than or equal to about 15 kPa.

In one variation, the present disclosure provides a durable icephobic/solid and liquid repellant nanocomposite material, such as a coating, comprising an elastomeric polymeric matrix having a plurality of lubricating domains defining an exposed surface that exhibits an initial ice adhesion strength of less than or equal to about 100 kPa prior to exposure to icing conditions and an ice adhesion strength after 10 cycles of icing and deicing conditions that increases to less than or equal to about 50% more than the initial ice adhesion strength (less than or equal to about 150 kPa). In other variations, the durable or robust icephobic properties of the icephobic materials result in an ice adhesion strength after 20 cycles of icing and deicing conditions that is less than or equal to about 50% above the initial ice adhesion strength, optionally after 30 cycles, optionally after 40 cycles, optionally after 50 cycles, optionally after 60 cycles, optionally after 70 cycles, optionally after 80 cycles, optionally after 90 cycles, optionally after 100 cycles, optionally after 150 cycles, optionally after 200 cycles, and in certain variations, optionally after 300 cycles of icing and deicing conditions, the subsequent ice adhesion strength is less than or equal to about 50% more than the initial ice adhesion strength. In certain aspects, the subsequent ice adhesion strength is less than or equal to about 60% above the initial ice adhesion strength for the icephobic surface, is less than or equal to about 65% above the initial ice adhesion strength, optionally less than or equal to about 70% more than the initial ice adhesion strength, optionally less than or equal to about 75% above the initial ice adhesion strength, optionally less than or equal to about 80% more than the initial ice adhesion strength, optionally less than or equal to about 85% more than the initial ice adhesion strength, optionally less than or equal to about 90% more than the initial ice adhesion strength, and in certain variations, optionally less than or equal to about 95% above the initial ice adhesion strength after 10 cycles of icing and deicing conditions. The icephobic surface may retain such levels of ice adhesion strength (from initial ice adhesion strength to subsequent ice adhesion strength) for any of the additional icing/deicing cycle conditions listed above.

In one variation, the durable icephobic/solid and liquid repellant nanocomposite possesses an advantageously low interfacial toughness, for example, exhibiting an ice adhesion strength ($t_{ice}$) of less than or equal to about 35 kPa (e.g., $\tau_{ice}$, 32.37 kPa), a critical detachment force per width of less than or equal to about 20 N/cm (e.g., $\tilde{F}_{crit}$, 18.79 N/cm, and an interfacial toughness of less than or equal to about 0.05 $J/m^2$ (e.g., $\Gamma$, 0.035 $J/m^2$).

Thus, in various aspects, the present disclosure provides a durable novel coating that comprises a lubricant-reacted porous structure that exhibits excellent liquid and ice repellency. Even after physical damage, the coating still exhibits a low contact angle hysteresis, due to a reaction between the coating and lubricant contained therein. This coating can be applied on various kinds of substrates and still maintain a low contact angle hysteresis ($\Delta\theta$, the difference between the advancing and receding contact angles) after abrasion for select liquids, including polar and/or non-polar liquids. For example, in certain variations, the contact angle hysteresis (difference between the advancing $\theta_{adv}$ and the receding contact angle $\theta_{rec}$) may still be lower than 2 degrees even after 10,000 CS-10 abrasion cycles under 1.1 kg load, while most conventional lubricated surfaces can only endure less than 1,000 cycles.

As described further herein, several characterizations have been done to probe the durability mechanism. The SEM images show that the porous structures are removed after abrasion. However, a nanometer-scale lubricated layer remains on the surface, as observed from both EDS and ellipsometry analysis. A reactive lubricant included int the coating is believed to be particularly advantageous in retaining the lubrication properties after damage. Also, the abrasion tests show that abrasion durability can be achieved under a wide range of reactive lubricants and composite compositions. The coatings can also be designed to have omniphobicity by lubricant selection. The abrasion test shows that the omniphobicity is also abrasion resistant and not damaged after 10,000 abrasion cycles.

In certain aspects, an adhesive layer may be applied to a substrate over which the durable coating is applied to enhance adhesion of the coating. Though the coating is abrasion resistant, in certain environments, the coating may be poorly bonded to the underlying substrate, and therefore susceptible to removal by wiping. To address this, an adhesive layer, such as epoxy, may be disposed between the coating and substrate to successfully enhance the wiping resistance.

In certain aspects, the durable novel coatings provided by the present disclosure also exhibit outstanding ice-shedding behaviors. The coating possesses not only low ice adhesion strength but is also believed to exhibit the lowest interfacial toughness ever reported. The interfacial toughness is even lower than the interfacial toughness considering pure Van der Waals interaction. This may be because the fracture behaviors for a lubricated interface is controlled by a liquid bridge, leading to a possibility of possessing lower interface toughness. Moreover, the inventive coatings show excellent abrasion and icing event durability with various kinds of lubricants. Lubricant viscosities show weak dependency on the icing durability and ice-shedding behaviors. The coating still performs excellent icing event durability and similar ice-shedding behaviors within different coating methods and compositions, which makes it promising for industrial applications.

In certain aspects, the present disclosure contemplates a durable solid and liquid repellant material comprising a polymeric or elastomeric layer having a plurality of lubricating domains distributed therein. The polymeric material having a plurality of lubricating domains may be formed by a crosslinking reaction between a polymeric precursor having a first reactive functional group and a polyol having a second reactive functional group and a narrow solubility circle, as will be defined further below. In certain aspects, the crosslinking reaction is only a partial crosslinking reaction, so that a portion of the available functional groups on the polymeric precursor are reacted with functional groups on the polyol, while a portion of the polymeric precursor functional groups remain unreacted. The unreacted functional groups may then further react with other components in the system, including the reactive lubricant oil and/or nanoparticles comprising silica. In certain variations, greater than or equal to about 20% of the functional groups react, optionally greater than or equal to about 50% of the functional groups react. In certain aspects, the durable solid and liquid repellant material further comprises a free reactive lubricant oil (e.g., polyol) and/or solvent distributed therein, for example, unreacted polyol/oil may remain in the material in pores.

Surface hydroxyl groups can also be used to adhere the durable solid and liquid repellant material coating to the substrate. For example, the substrate may be treated with an oxygen plasma treatment to form hydroxyl groups on the surface thereof.

In certain variations, a polymeric precursor that forms the polymeric matrix has a first reactive functional group capable of reacting with a second reactive functional group on the reactive lubricant oil, as will be described further below. The first reactive functional group may be selected from the group consisting of: isocyanate (—N═C═O), alkene (—C═C), amine (—$NH_2$), carboxylic acid (—C═O(OH)), hydroxyl (—OH), and combinations thereof. In certain variations, the first reactive functional group is an isocyanate. In certain aspects, the polymeric precursor may form a polymer selected from the group consisting of: polyurethane, fluoropolyurethane, copolymers and combinations thereof. In preferred aspects, the polymeric matrix comprises polyurethane. In one particular variation, the precursor is a polyurethane with isocyanate reactive groups, for example, it may be a triisocyanate polyurethane precursor having three isocyanate reactive groups. In certain variations, the precursor may be an aromatic polyurethane with isocyanate groups, such as a triisocyanate aromatic polyurethane monomer.

In certain variations, a polyol component for reacting with the isocyanate may have multiple hydroxy groups. In certain variations, the functional or reactive group of the polyol is selected from the group consisting of: hydroxyl group (—OH), amine (—$NH_2$), carboxylic acid (—C═O(OH)), and combinations thereof. In certain variations, the functional or reactive group is a hydroxyl group. In certain variations, each polyol has at least two reactive groups. For example, a polyol has at least two hydroxyl groups and thus is a diol or may have more than two hydroxyl groups (e.g., triol, tetraol, pentaol). As will be described further herein, in certain variations, a precursor of the polymeric matrix may include a reaction between a first reactive functional group discussed above and a polyol having the second reactive functional group. The polyol may be any of those discussed below in the context of the reactive oil. In certain variations, the polyol has a molecular weight of greater than or equal to about 100 Da to less than or equal to about 10,000 Da. In one variation, the polyol component may be a slightly branched hydroxyl-bearing polyester (polyol, DESMOPHEN™ 670BA).

The polymeric matrix further includes a plurality of lubricating domains anchored to and distributed therein. In certain variations, the plurality of lubricating domains may be distributed evenly or homogeneously throughout the polymeric matrix. The plurality of lubricating domains may be attached via a crosslinking reaction (e.g., covalently bonded) to the polymeric matrix. The plurality of lubricating domains may be formed by a reactive oil that has at least one functional group capable of reacting with functional/reactive groups on the elastomer in the matrix. The reactive oil comprises a first reactive group selected from the group consisting of: hydroxyl group (—OH), amine (—$NH_2$), carboxylic acid (—C═O(OH)), and combinations thereof. The reactive oil may be a hydroxyl group in certain variations. Further, in certain variations, greater than or equal to about 20% of the functional groups react, optionally greater than or equal to about 50% of the functional groups react. For example, greater than or equal to about 20% to less than or equal to about 75% of the functional groups react, optionally greater than or equal to about 50% to less than or equal to about 65% of the functional groups react.

In accordance with certain aspects of the present disclosure, a Hansen solubility analysis may be used for selecting the reactive oils. A narrow solubility circle means that the reactive oils are only soluble in select liquids, rather than having a large solubility circle where the oil is soluble in high polar and low polar, and sometimes even nonpolar liquids. The solubility circle may be expressed as Hansen solubility parameters or a solubility circle considering several of these parameters. The Hansen solubility circles are defined as the minimal circular area that can cover all of the liquids that are soluble in the corresponding oils. In certain aspects, a suitable reactive oils may have a dispersion (SD) parameter of less than or equal to about 22 $MPa^{1/2}$, for example, from greater than 0 to less than or equal to about 22 $MPa^{1/2}$. The polar (δP) solubility parameter may be less than or equal to about 20 $MPa^{1/2}$, for example, from greater than 0 to less than or equal to about 20 $MPa^{1/2}$. In certain aspects, the oil has both a dispersion (SD) parameter of less than or equal to about 22 $MPa^{1/2}$, for example, from greater than 0 to less than or equal to about 22 $MPa^{1/2}$ and a polar (δP) solubility parameter of less than or equal to about 20 $MPa^{1/2}$, for example, from greater than 0 to less than or equal to about 20 $MPa^{1/2}$.

In certain variations, the reactive lubricant oil is selected from the group consisting of: hydroxyl-terminated polydimethylsiloxane (PDMS), hydroxyl-terminated perfluoropolyether (PFPE), polyphenols, amino acids, natural oils, and combinations thereof. In certain variations, the reactive lubricant oil is selected from the group consisting of: catechin, hesperetin, cyanidin, quercetin, caffeic acid, catechol, gallic acid, tannic acid, epigallocatechin, epicatechin gallate, and epigallocatechin gallate, phenylalanine, valine, threonine, tryptophane, isoleucine, methionine, histidine, arginine, leucine, and lysine, hydroxyl- or amino-terminated polydimethylsiloxane, hydroxyl- or amino-terminated perfluorinated polydimethylsiloxane coconut oil, essential oils (oil products extracted or isolated from natural sources), castor oil, sunflower seed oil, jojoba oil, grapeseed oil, and combinations thereof. In certain variations, the reactive oil or polyol is selected from the group consisting of: hydroxyl-terminated polydimethylsiloxane, hydroxyl-terminated perfluorinated polydimethylsiloxane, hydroxyl-terminated perfluoropolyether, and combinations thereof. It should be noted that reactive oils having a high solubility circle are excluded as being unsuitable in certain variations, which excludes compounds like ethylene glycol, ethanol, methanol, isopropanol, and the like.

In certain aspects, the solid-and-liquid repellent polymeric materials provided herein exhibit abrasion resistance. Current liquid and/or solid repellent coatings are generally susceptible to mechanical damage, particularly under harsh abrasion conditions. Specifically, in certain variations, solid-and-liquid-repellant/omniphobic materials prepared in accordance with certain aspects of the present disclosure can withstand over ten times greater harsh abrasion cycles than current omniphobic coatings. An abrasion cycle may be mechanical abrasion performed in accordance with ASTM standard D4060, for example, by using a rotary TABER® Abrasion machine with a CS-10 resilient abrader and a total weight of 60 g or 1.1 kg. The abrader is refaced before each set of abrasion cycles using sand paper (from Taber®). Refacing may be done at 25 cycles/min for 25 cycles. For abrasion, a sample having the omniphobic/solid and liquid repellant surface may be clamped down and abraded for up to 10,000 cycles at 60 cycles/min. After a total number of mechanical abrasion cycles are completed, the sample is assessed for its properties, for example, an apparent advancing dynamic contact angle and roll-off angle for water.

In certain aspects, the durable or robust solid and liquid repellant materials properties, a contact angle (or advancing angle) can have a vary, for example, from greater than or equal to about 40° to about 120°, but the surface can maintain a low contact angle hysteresis after mechanical abrasion, such as after at least about 100 abrasion cycles, optionally after at least about 1,000 abrasion cycles, optionally after at least about 5,000 abrasion cycles, and in certain variations, after about 10,000 abrasion cycles.

For example, solid repellency of the coatings prepared in accordance with the present disclosure may reduce adhesion of a solid foulant on the surface by greater than or equal to about 30%, optionally greater than or equal to about 50%, and in certain aspects, optionally greater than or equal to about 70% as compared to the comparative polymeric material, for a period of time, for example, 30 days.

In certain variations, the solid and liquid repellant/omniphobic surface exhibits both a contact angle of greater than or equal to about 90°, optionally greater than or equal to about 150°, and a roll-off angle of less than or equal to about 30°, optionally less than or equal to about 150 for water after greater than or equal to about 150 abrasion cycles. In other variations, the solid and liquid repellant/omniphobic surface exhibits both such a contact angle (of greater than or equal to about 90° or optionally greater than or equal to about 150°) and a roll-off angle (of less than or equal to about 30, optionally less than or equal to about 15°) for both water and oil after greater than or equal to about 200 abrasion cycles, optionally after greater than or equal to about 300 abrasion cycles, optionally after greater than or equal to about 400 abrasion cycles, optionally after greater than or equal to about 500 abrasion cycles, optionally after greater than or equal to about 1,000 abrasion cycles, optionally after greater than or equal to about 1,500 abrasion cycles, optionally after greater than or equal to about 2,000 abrasion cycles, optionally after greater than or equal to about 5,000 abrasion cycles, optionally after greater than or equal to about 7,500 abrasion cycles, and in certain aspects, optionally after greater than or equal to about 10,000 abrasion cycles.

In certain variations, the solid and liquid repellant/omniphobic or superomniphobic surface exhibits a contact angle hysteresis of less than or equal to about 150 for water and a preselected oil, optionally less than or equal to about 100 for water and a preselected oil, optionally less than or equal to about 5° for water and a preselected oil, optionally less than or equal to about 4° for water and a preselected oil, optionally less than or equal to about 3° for water and a preselected oil, and in certain variations, the contact angle hysteresis may be less than or equal to about 2° for water and a preselected oil.

In other aspects, the solid and liquid repellant/omniphobic or superomniphobic material has a contact angle hysteresis of less than or equal to about 15°, optionally less than or equal to about 10°, optionally less than or equal to about 5°, optionally less than or equal to about 4° for water and a preselected oil, optionally less than or equal to about 3° for water and a preselected oil (e.g., rapeseed oil (RSO), optionally less than or equal to about 2° for water and a preselected oil after greater than or equal to about 200 abrasion cycles, optionally after greater than or equal to about 300 abrasion cycles, optionally after greater than or equal to about 400 abrasion cycles, optionally after greater than or equal to about 500 abrasion cycles, optionally after greater than or equal to about 1,000 abrasion cycles, optionally after greater than or equal to about 1,500 abrasion cycles, optionally after greater than or equal to about 2,000 abrasion cycles, optionally after greater than or equal to about 5,000 abrasion cycles, optionally after greater than or equal to about 7,500 abrasion cycles, and in certain aspects, optionally after greater than or equal to about 10,000 abrasion cycles.

In certain variations, the durable solid and liquid repellant nanocomposite material maintains repellency of polar and non-polar liquids, such as a predetermined oil (e.g., rapeseed oil (RSO), after substantial abrasion occurs. For example, after at least 10,000 abrasion cycles under 1.1 kg load, the durable solid and liquid repellant nanocomposite material has a contact angle hysteresis of less than or equal to about 100 for water and for a predetermined oil, optionally less than or equal to about 5°, optionally less than or equal to about 4°, optionally less than or equal to about 3°, and in certain variations, optionally less than or equal to about 2°. The coatings show different micro-structure topologies on various substrates but consistently exhibit a low contact angle hysteresis.

In certain other variations, the solid and liquid repellant/omniphobic material defines a surface exhibiting solid repellency. While a solid may include ice, the icephobic properties are discussed previously above. In this context, the additional solid foulants may include infectious bacteria, such as *E. coli*, soft or hard marine foulants (such as cyanobacteria and diatom), by way of non-limiting example. For example, such solid repellency may be where adhesion of solid foulant on the surface is minimized or reduced by greater than or equal to about 30%, optionally greater than or equal to about 50%, and in certain aspects, optionally greater than or equal to about 70% as compared to the comparative polymeric material, for a period of time, for example, 30 days.

In certain variations, the solid and liquid repellant/omniphobic nanocomposite material is transparent to visible light, for example, having wavelengths ranging from about 390 to about 750 nm. By transparent, it is meant that the material is transmissive for a target range of wavelengths of electromagnetic energy, for example, in the visible wavelength ranges. Thus, in certain aspects, a transparent solid and liquid repellant/omniphobic material transmits greater than or equal to about 75% of electromagnetic energy at the predetermined range of wavelengths, optionally greater than or equal to about 80%, optionally greater than or equal to about 85%, optionally greater than or equal to about 90%, and in certain preferred aspects, optionally greater than or equal to about 95% of the electromagnetic energy at the predetermined range of wavelengths (e.g., in the visible range of the spectrum) is transmitted.

A design concept for forming lubricant reacted surfaces is based on the following. A wear model is introduced to build a systematic approach for designing a durable lubricated surface. A classic wear model, known as Archard's equation, predicts the volume worn per sliding distance, i.e., wear rate ($W_R$) is given as $$W_R = \frac{KL}{H}, \quad (1)$$

where K is a constant, H is the hardness of the material, and L is the load.

The lubricant effect is then extracted from the system constant $K \equiv kK_\mu$ and the theory of boundary lubrication is introduced to calculate the friction coefficient, giving $$K_\mu = (rs_l + (1-r)s_s)/H \approx (1-r)s_s/H, \quad (2)$$

where r is the ratio of lubricated area to the total area, $s_l$ and $s_s$ are the shear strength of the lubricant film and the solid substrate respectively. The last equal mark holds when $s_l$ is much lower in magnitude than $s_s$. Thus, the wear rate ($W_R$) can be expressed as $$W_R \approx kL(1-r)s_s/H^2 \quad (3)$$

From Eqn. (3), increasing the lubricated area and the substrate hardness leads to higher durability. However, it is hard to possess both high hardness and high lubricated area. Plus, the performance of liquid repellency is not linear with wear rate. A little damage can lead to a large change in surface energy and thus a drastic increase in contact angle hysteresis.

The present disclosure provides a new concept where surfaces remain lubricated after abrasion, or namely anti-fouling performance is maintained after damage, rather than focusing on hardness enhancement as has been done in the past. A multi-structural lubricant reacted nanocomposite prepared in accordance with certain aspects of the present disclosure, like that shown in FIG. 1 as inventive technology, combines advantages associated with slippery lubricant-infused porous surfaces, a swollen polymer, and polymer grafting surfaces in one material system and provides a design of a durable coating. More specifically, the coatings provided by certain aspects of the present disclosure can combine advantageous features of a wicked structure, a polymer brush structure, and a swollen polymer structure to build a multi-structural lubricant-reacted porous structure in accordance with certain aspects of the inventive technology.

In certain variations, a nanoparticle, such as a silica nanoparticle, is incorporated in a polymeric material. For example, the polymeric material may comprise a polyurethane, so that a silica nanoparticle-polyurethane combination serves as a filler-binder system to construct a porous structure. The reaction between a reactive lubricant, hydroxyl groups on the silica nanoparticles, and polyurethane (formed from precursors comprising isocyanate and polyol functional groups) provides a covalent bonding network to form a polymer grafting surface and swollen polymer.

The coating provided by the present disclosure is capable of being applied on various substrates and still desirably exhibits low contact angle hysteresis. Also, the microstructure topology varies with the substrate morphology. Porous structures are observed for the coatings on flat surfaces such as copper plate and glass slides, while wrinkled structures are formed on coated porous substrates such as filter paper and copper foam. The SEM images are shown in FIGS. 2A and 2B and the contact angle hysteresis on various substrates are shown in FIG. 2C. More specifically, FIG. 2A shows the SEM topology of the porous structure of the coating on various flat substrates. FIG. 2B shows the SEM topology of the wrinkled structure of the coating on various porous substrates. FIG. 2C shows the contact angle hysteresis (orange column) and advancing contact angle (blue column) on various coated substrates. All the coatings in FIGS. 2A-2C were infused with 100 cSt hydroxyl terminated silicone oil as a lubricant and the polymer-to-silica ratio of the coatings was 1 to 1.

EXAMPLES

An omniphobic durable solid and liquid repellant nanocomposite material prepared in accordance with certain aspects of the present disclosure via lubricant oil infusion (hydroxy terminated PDMS) is manufactured using multiple steps.

The materials used in the examples are as follows. Slightly branched hydroxyl-bearing polyester (polyol, DESMOPHEN™ 670BA) and Aliphatic polyisocyanate (flexibilizing HDI trimer, DESMODUR™ N 3800) are available from Covestro, Germany. Hydroxyl-terminated fluorinated oil (FLUOROLINK™ D10/H) and ethoxylated-terminated fluorinated oil (FLUOROLINK™ E10/H) were purchased from Solvay, Belgium.

The following lubricant oil materials are used. HO-SO denotes hydroxyl terminated polydimethylsiloxane (PDMS) or silicone oil. $CH_3$—SO denotes trimethylsiloxy terminated silicone oil. $NH_2$—SO denotes aminopropyl terminated silicone oil. mono$NH_2$—SO denotes asymmetric monoaminopropyl terminated silicone oil. D10/H denotes hydroxyl terminated fluorinated oil FLUOROLINK™ D10/H. E10/H denotes ethoxylated terminated fluorinated oil FLUOROLINKT E10/H. The polydimethylsiloxane (PDMS) or silicone oil functionalized materials include: 100-120 cSt (average molecular weight: 5,000 g/mol) aminopropyl terminated, 18-25 cSt (average molecular weight: 2,000 g/mol) asymmetric monoaminopropyl terminated, 100 cSt (average molecular weight: 5,970 g/mol) trimethylsiloxy terminated, 16-32 cSt (denoted as 25 cSt herein, average molecular weight: 400-700 g/mol), 45-85 cSt (denoted as 65 cSt herein, average molecular weight: 2,000-3,500 g/mol), 90-120 cSt (denoted as 100 cSt herein, average molecular weight: 4,200 g/mol), and 700-800 cSt (denoted as 750 cSt herein, average molecular weight: 18,000 g/mol) silanol terminated polydimethylsiloxane (PDMS) and (heptadecafluoro-1,1,2,2-tetrahydrodecyl)trichlorosilane were purchased from Gelest, United States. The term silanol terminated is synonymous with the term hydroxyl terminated.

Reinforcement particles include silicon oxide nanopowder/$SiO_2$ nanoparticles ($SiO_2$, 99.5+%, average particle size of 15-20 nm, P-type, porous), aluminum hydroxide $Al(OH)_3$ nanopowder/nanoparticles ($Al(OH)_3$, 99.9%, average particle size of 10 nm), silicon nitride $Si_3N_4$ nanopowder/nanoparticles ($Si_3N_4$, 99+%, average particle size of 15-30 nm, amorphous), silicon oxide $SiO_2$ Powder (99.5%, polycrystalline, average particle size of 1 m), silica powder/silicon dioxide $SiO_2$ Powder ($SiO_2$, 99+%, average particle size of 400 nm), and silicon dioxide $SiO_2$ nanopowder/nanoparticles ($SiO_2$, 98+%, average particle size of 60-70 nm) were purchased from US Research Nanomaterials, Inc., United States.

VERTREL™ XF and KRYTOX™ 1525 were purchased from Chemours, United States. Potassium hydroxide was purchased from Spectrum Chemical, United States. Dibutyltin dilaurate, methyl isobutyl ketone (MIBK), 2-propanol (IPA), ethanol, methanol, n-hexane, hydrochloric acid, and toluene were purchased from Fisher Scientific, United States. Perfluorohexane and n-hexadecane were purchased from Alfa Aesar, United States. Acetone, decane, and 1H,1H,2H,2H-perfluorodecanethiol were purchased from Sigma Aldrich, United States. Dodecane, ethylene glycol, n-octane, diiodomethane, and glycerol were purchased from Acros Organics, United States.

2.5 mm×7.5 mm×1 mm glass slides were purchased from Fisher Scientific, United States. 99.9% 24 gauge copper plates and carbon fiber fabric were purchased from Amazon, United States. Aluminum 6064 plates and 400 mesh 304 stainless steel mesh were purchased from McMaster-Carr, United States. Cellulose filter paper (Genuine Whatman No. 5) was purchased from W & R Balston Limited, United Kingdom. Polytetrafluoroethylene (PTFE) and polypropylene (PP) filter paper (pore size: 0.45 um) were purchased from Tisch Scientific, United States. Copper foam sheets (thickness: 80 um) were purchased from MTI Corporation, United States. Double-sided tape (300LSE) was purchased from 3M, United States. Plastic Binder epoxy, CLEARWELD™ epoxy, and COLD-WELD™ Steel Reinforced Epoxy were purchased from J-B Weld, United States.

Example 1

Abrasion-resistant lubricant-reacted nanocomposite coatings are fabricated as follows. Silica nanoparticles, N3800 (isocyanate), and 670BA (polyol) in a methyl isobutyl ketone (MIBK) were mixed in predetermined mass ratios and sonicated for 30 minutes. In this example, the mass ratio of isocyanate (N3800) and polyol (670BA) in polymer binder held 2 to 1 so that remaining excess isocyanate could react with other reactants (2 to 1 leads to a reaction extent of 0.483 based on the information that N3800 possesses 26.2 weight percent of isocyanate and 670BA possesses 25.3 weight percent of hydroxyl group). The catalyst (dibutyltin dilaurate 1 wt. % in MIBK) was then added to the solution with the catalyst-to-MIBK volume ratio of 1 to 50.

The solution was vortex mixed for 30 minutes (Vortex-Genie (G560) SI-0236 2 Shaker, Scientific Industries, United States) and then coated on substrates via drop casting, spin coating (Spincoat G3P-8, Specialty Coating Systems, United States), or spray coating. Prior to coating, the substrates were hydroxylated via oxygen plasma exposure (PPE-75, Plasma Etch, United States) for 20 minutes with a power of 40 W before applying the coating solution. The coated substrates were then placed in the oven (Isotemp Vacuum Oven 282A, Fisher Scientific, United States) at 75° C. for 1 hour to pre-cure the composite. Lubricant MIBK solution (1 to 1 volume ratio) was then added to the coating for reaction. The coated substrates were then placed in the oven (Isotemp Vacuum Oven 282A, Fisher Scientific, United States) at 75° C. overnight, followed by an hour of UV curing (wavelength: 254 nm UVC, XX-40S UV bench lamp, Analytik Jena, Germany) if necessary.

Example 2

The abrasion-resistant lubricant-reacted nanocomposite coatings are further applied on substrates with different adhesives disposed therebetween. For 3M 300LSE double-sided tape, the tape was applied on the substrate and then the coating solution was applied on the tape via drop casting. For J-B Weld CLEARWELD™ and Plastic Bonder epoxy, the epoxy and MIBK were mixed at the weight ratio of 2 to 1 and then applied on the substrate. The epoxy-coated substrate was then cured at 75° C. for around 1 hour in the oven (Isotemp Vacuum Oven 282A, Fisher Scientific, United States) and then the coating solution was applied on the epoxy via drop casting. For J-B Weld COLD-WELD™ epoxy, the epoxy and MIBK were mixed at the weight ratio of 5 to 1 and then applied on the substrate. The epoxy-coated substrate was then cured at 75° C. for around 3 hours in the oven (Isotemp Vacuum Oven 282A, Fisher Scientific, United States) and then the coating solution was applied on the epoxy via drop casting.

Example 3

Copper-based slippery lubricant-infused porous surfaces (Cu-SLIPS) are made as follows. Cleaned copper plates were first immersed in concentrated hydrochloric acid for 15 minutes and then rinsed with DI water. Then the copper plates were immersed in 400 mM potassium hydroxide solution until the surfaces turned black. Then the copper plates were soaked in 0.1M 1H,1H,2H,2H-perfluorodecanethiol ethanol solution overnight in the sealed container with an argon-rich atmosphere. The modified copper plates were then superhydrophobic. After being infused with KRYTOX™ 1525, the copper plates became Cu-SLIPSs.

Example 4

Aluminum-based slippery lubricant-infused porous surfaces (Al-SLIPS) are made as follows. Cleaned aluminum plates were first placed in 2.5 M hydrochloric acid solution for 20 minutes. Then the plates were immersed in DI water under sonication to remove dust. The cleaned aluminum plates were then placed in boiling water for 20 minutes and dried with air guns. The plates were then placed in a container with 200 microliters (l) (heptadecafluoro-1,1,2,2-tetrahydrodecyl)trichlorosilane under a moisture-free environment for 2 days. The aluminum plates were superhydrophobic. After being infused with KRYTOX™ 1525, the aluminum plates became Al-SLIPSs.

Example 5

A polyurethane (PU) swelled with PDMS-OH oil (iPU) is fabricated as follows. N3800 (isocyanate), and 670BA (polyol) in a methyl isobutyl ketone (MIBK) solvent in the weight ratio of 1:1:1 were mixed together via vortex mixing (Vortex-Genie (G560) SI-0236 2 Shaker, Scientific Industries, United States) for 15 minutes. Then 50 μl catalyst (dibutyltin dilaurate 1 wt. % in MIBK) was added to the solution and then vortex mixed for 5 minutes. The solution then coats on surfaces via drop casting and is placed in the oven (Isotemp Vacuum Oven 282A, Fisher Scientific, United States) at 90° C. until the polyurethane (PU) was fully cured. After curing, the PU coating was then placed upside down in 25 cSt silanol terminated PDMS oil for one day. Due to the fast reaction of N3800 and 670BA in this condition, the reaction time varies based on the environmental condition.

Example 6

In this example, polymer brush grafted surfaces are formed. The fabrication method is based on the method described in Chen, L., et al. "One-Step Fabrication of Universal Slippery Lubricated Surfaces," *Advanced Materials Interfaces* 2020, 7 (18), 200030, the relevant portions of which are incorporated herein. 25 cSt silanol terminated PDMS oil was placed on oxygen plasma treated copper substrates (oxygen plasma exposure (PPE-75, Plasma Etch, United States) for 20 minutes with a power of 40 W). The copper substrates were then placed under UV light (wavelength: 254 nm UVC, XX-40S UV bench lamp, Analytik Jena, Germany) for 4 hours.

Example 7

Omni-PU having a hard PU base (elastomeric) layer with complete lubrication with reactive oil infusion (25 cSt silanol terminated PDMS) was manufactured based on the methods described in Wang, J., et al., "Durable Liquid- and Solid-Repellent Elastomeric Coatings Infused with Partially Crosslinked Lubricants," *ACS Applied Materials & Interfaces* (2022), the relevant portions of which are incorporated herein by reference. At first, 25 cSt silanol terminated PDMS, N3800 (isocyanate), and 670BA (polyol) in a methyl isobutyl ketone (MIBK) solvent in the weight ratio of 1:1:1:1.8 were mixed via vortex mixing (Vortex-Genie (G560) SI-0236 2 Shaker from Scientific Industries) for 15 min. Then 50 μl catalyst (dibutyltin dilaurate 1 wt. % in MIBK) was added to the solution and then has 5 min vortex mixing and 10 min sonication (FS30, Fisher Scientific, United States). The solution was then preheated to 90° C. in the oven (Isotemp Vacuum Oven 282A, Fisher Scientific, United States) for 90 min and drop cast onto surfaces. The surfaces were hydroxylated via oxygen plasma exposure (PE-75, Plasma Etch, United States) for 20 min with an RF power of 40 W. The coating was then cured in the oven (Isotemp Vacuum Oven 282A, Fisher Scientific, United States) at 60° C. overnight. The polyol was added to enhance the mechanical durability but with this process, the coating is not transparent.

Material characterization and analysis was conducted as follows. The scanning electron microscope (SEM, Tescan Mira3 FEG SEM, Tescan, Czech Republic) was used to examine the surface morphology and the energy dispersive spectroscopy (EDS) analysis was carried out on an EDAX system attached to the SEM. The Fourier transform infrared spectrometry (FTIR, Nicolet 6700, Thermo Electron Corporation, United States) was used to examine the chemical structures. The 3D Laser scanning microscope (LEXT OLS5100, Olympus, Japan) was used to obtain the quantified measurement of the surface morphology. The samples were rinsed with VERTREL™ XF, acetone, and isopropanol before material characterization. 10 min plasma cleaning (PE-75, Plasma Etch, United States) and 90 seconds of gold sputter coating (SPI sputter coater, Structure Probe, Inc., United States) were processed before the SEM. The ellipsometer (M-2000DI, J. A. Woollam, United States) was used to examine the remaining coating thickness after abrasion. Because the roughness is too large to examine after CS-10 abrasion, the thickness was obtained on a coated silicon wafer (polymer-to-silica ratio: 1 to 1; composite-to-solvent ratio: 1 to 4) after 1,000 cycles of CS-0 (rubber) abrasion and the free oil was then removed by IPA and acetone rinsing.

For the ellipsometry analysis, a three-layered model was utilized to obtain the thickness. (substrate: silicon, layer #1: silicon dioxide 4.25 nm, and layer #2: Cauchy mathematical model) The Ultraviolet-visible (UV-Vis) spectrophotometer (Varian Cary 50 Bio UV-Visible Spectrophotometer, SpectraLab Scientific Inc, Canada) was used to measure the absorbance to quantify the coating transparency.

Contact angle measurements were performed with a Ramé-Hart 200-F1 contact angle goniometer using the sessile drop method. Advancing and receding contact angles were obtained by measuring the angle while the testing liquid drop size slowly increased or decreased.

Abrasion testing was conducted as follows. A linear abraser (Taber 5750 Linear Abraser) was used to test the abrasion durability of the samples and to reciprocate a resilient abradant CS-10 with an applied load of 1.1 kg over coated substrates. It is noteworthy that during the abrasion some debris was generated from relative motion between the coating and the abrader. The debris contained hydrophilic alumina and may lead to higher contact angle hysteresis sometimes. Herein, the coating may be rinsed carefully with water to remove the debris before the contact angle measurement to get more precise results.

Wiping tests were conducted as follows. A linear abraser (Taber 5750 Linear Abraser) was used to test the wiping durability of the samples and to reciprocate a piece of Kimtech Science Kimwipes delicate task wiper with an applied load of 350 g over coated substrates.

Icing tests were conducted in the following manner. The measurement set-ups were similar to the techniques reported in Golovin, K., et al., "Low-interfacial toughness materials for effective large-scale deicing," *Science* (2019), 364 (6438), pp. 371-375, the relevant portions of which are incorporated herein by reference. The Peltier-plate system used in these examples (Laird Technologies) measured 22 cm in length and 6 cm in width. In all these experiments, the height and width of ice were fixed at h=0.6 cm and w=1 cm. The ice was frozen at −15° C. The force required to dislodge the ice was recorded using a force gauge (Nextech DFS500) with the precision of 0.1 N at a controlled velocity of 74 μm/s.

There were three types of experiments: ice length testing, icing cycle durability, and abrasion durability. In the ice length testing, ice lengths were varied from 1 to 14 cm. In the icing event durability test, the ice length is controlled at 8 cm and run 15 icing cycles at the same places. In the abrasion durability test, the ice length is controlled at 2 cm.

A Hansen solubility parameter provides a guideline for miscibility between two substances with the consideration of the dispersion force, dipole-dipole force, and hydrogen bond. The dispersion (SD), the dipole-dipole (6p), and the hydrogen (6 h) solubility parameters were obtained from the Hansen Solubility Handbook. 0.5 mL of lubricant was slowly added to 16 different solvents (mixing volume ratio 1:1), including acetone, dodecane, ethanol, ethylene glycol, hexane, methanol, octane, hexadecane, perfluorohexacene, toluene, water, decane, glycerol, isopropanol, methyl isobutyl ketone (MIBK), and diiodomethane. After the judgment of the miscibility, the Hansen solubility sphere of the tested lubricant is obtained, including the diameter and the center of the sphere.

A systematic analysis of abrasion resistance for wettability is conducted. A durable coating comprising a lubricant-reacted porous nanocomposite according to certain aspects of the present disclosure is demonstrated to have low contact angle hysteresis even after 10,000 CS-10 abrasion cycles under the load of 1.1 kg in both flat and porous substrates. The schematic of the abrasion test is shown in FIG. 3A. The coated substrates were placed under CS-10 abradant under a 1.1 kg load. The CS-10 abradant moved reciprocally at the rate of 60 cycles/min. FIG. 3C-3D respectively show the SEM topology of the abraded coated copper plate and copper foam. The coatings in FIG. 3C-3D were imaged after 10,000 CS-10 abrasion cycles under a load of 1.1 kg. All the coatings were infused with 100 cSt hydroxyl terminated silicone oil as a lubricant and the polymer-to-silica ratio was 1 to 1.

The coated flat copper plate shows a contact angle hysteresis lower than 2 degrees while the coated porous copper foam possesses a contact angle hysteresis lower than 10 degrees. The inventive coatings show outstanding abrasion resistance compared to most conventional lubricated surfaces, which can only withstand less than 1,000 abrasion cycles. The comparison is shown in FIG. 3B between various lubricated surfaces. The mechanism of high abrasion durability is further discussed below. The SEM (scanning electron microscope) images of the coated substrates after abrasion, shown in FIGS. 3C and 3D, suggest that at least portions of the coatings on both flat surfaces and porous surfaces are removed after abrasion. This may support the concept that the coating is still lubricated after abrasion. The general design principle of this kind of coating is investigated herein.

Several types of lubricants are studied in the examples. The potential reaction sites are the terminal groups and the polymer chain backbones. The terminal group, such as hydroxyl terminal groups, can react with isocyanate to form a covalent bonding. In the polymer chain backbones, a Si—O—Si polymer chain with lower bond energy can potentially break under UV light or heating and react with composite. There are four types of lubricants investigated. The first type is lubricants with both reactive terminal groups and breakable polymer chains, such as hydroxyl terminated silicone oils. The second type is lubricants with reactive terminal groups and unbreakable polymer chains, such as hydroxyl terminated fluorinated oil FLUOROLINK™ D10/H. The third type is lubricants with breakable polymer chains and unreactive terminal groups, such as trimethyl terminated silicone oils. The last one is unreactive lubricants, such as fluorinated oils KRYTOX™ 1525.

The abrasion test has been applied on coatings with various types of lubricants and the results are shown in FIG. 4. FIG. 4 shows that except for the unreactive lubricants (Type 4, KRYTOX™ 1525) all the other genres of reactive lubricants can potentially fulfill the high abrasion durability.

The influences of the UV light process and the thermal process are also probed. The abrasion test shows that if the lubricants possess reactive terminal groups either thermal or UV light process can fulfill the high durability (still exhibiting low contact angle hysteresis, e.g., <2 degrees after 10,000 abrasion cycles). While the lubricants possess only breakable polymer chains, both processes are required to reach high durability. Further investigation of various kinds of lubricants was conducted and the results are shown in FIGS. 5A and 5B. Viscosities show weak dependence on the abrasion durability and both perfluoropolyether (PFPE) and polydimethylsiloxane (PDMS) backbone can fulfill abrasion durability when the end group is hydroxyl terminated. In this example, monoaminopropyl, aminopropyl, and ethoxylated terminal end groups do not reach desired levels of abrasion resistance, even if they can react with isocyanate. This may be due to the more hydrophilic properties of these lubricants, but the mechanisms require further investigation. Overall, the contact angle of the inventive coatings is tunable via lubricant oil selection that is incorporated into the material.

Several material characterizations were conducted to demonstrate that the lubricants react with the composite. The FTIR (Fourier-transform infrared spectroscopy) analysis suggests that the isocyanate reacts with all three types of lubricants shown in FIG. 6. The isocyanate peak diminishes after the lubricants are added. Also, the coating was examined with the EDS (energy-dispersive spectroscopy) after free oil removal (rinsed by isopropanol (IPA), acetone, and VERTREL™ XF twice). The hydroxyl terminated fluorinated lubricant was selected because the existence of the lubricant can be easily supported by the detection of fluorine (F) signal and also the existence of silica nanoparticle would be the only source of silicon (Si) signal while in the case of silicon oils both nanoparticle and lubricant contribute to the silicon signal.

The results are shown in FIGS. 7 and 8, respectively showing the EDS results of the coating before abrasion (FIG. 7) and after abrasion (FIG. 8). The fluorine (F) and silicon (Si) signals are highlighted to respectively show the existence of lubricant and silica nanoparticles. FIG. 7 suggests that F signal still exists after free oil removal and thus the lubricant reacts on the composite. Moreover, FIG. 8 suggests that the nanoparticle and lubricant still remain after 10,000 abrasion cycles due to the existence of silicon and fluorine signals. It is noteworthy that the substrate used (Aluminum 6061) may also possess a small amount of silicon but the peak from this source is undetectable due to the limitation of the EDS used, implying that the silicon signal is mainly from the coating. Also, the analysis of ellipsometry suggests that there is a thin layer remaining after abrasion (thickness: 27.03±8.69 nm). In conclusion, a thin lubricated layer remains after abrasion to maintain the pristine wettability performance.

Parameter sweeping for high abrasion resistance is also conducted. The influence of the composition was surveyed via the wettability measurement of coatings with different compositions. The results are shown in FIGS. 9A-9C. FIG. 9A shows the wettability performance of different component combinations to probe the function of each component. The combination of reactive lubricant, isocyanate, and polyols without nanoparticles leads to high contact angle hysteresis. This suggests that silica nanoparticles play an important role in forming porous structures to lower the surface energy difference. The porous structure contributes to the slipperiness in the beginning and then the remaining lubricated layer takes over the contribution after long-term abrasion. The nanoparticle species were also surveyed shown in FIG. 9B. The results suggest that the decrease of the particle size may lead to lower contact angle hysteresis with an upper limit of around 60 nm. The increase in the difficulties to move contact lines when the particle size increases may lead to a larger contact angle hysteresis. Interestingly, in these experiments, alumina and silicon nitride cannot fulfill low contact angle hysteresis even with small particle sizes (approximately 10 nm). Alumina possesses totally different microstructures shown in FIG. 9C, leading to a much higher contact angle hysteresis (CAH>30°) due to the difficulty of contact line movement. The lack of reactive hydroxyl group may contribute to the higher contact angle hysteresis (CAH of approximately 10°) for silicon nitride even though it possesses similar microstructures.

Also, several composition parameters have been discussed to show the feasible range of high abrasion durability in accordance with certain aspects of the present disclosure. FIG. 10 shows the abrasion results of coating with different polymer-to-silica ratios on glass slides, copper plates, aluminum plates, and polycarbonate plates. The results suggest that decreasing the polymer-to-silica ratio may slightly enhance the abrasion durability. Overall, the coatings with a polymer-to-silica ratio lower than 2 to 1 perform abrasion-resistant water repellency, maintaining a contact angle hysteresis lower than 5 degrees on various flat substrates. Such coatings are particularly suitable for commercial applications due to the wide feasible range of composition and the ability to apply on various substrates.

Furthermore, the composite-to-solvent ratios are also probed to show the influence of the coating amount on the abrasion durability in FIGS. 11A-11B. FIG. 11A shows the SEM topology of coatings with different composite-to-solvent ratios. For higher composite-to-solvent ratios the coating is rough and full of porous structures. When the composite-to-solvent ratio is low (using 1 to 24 as an example), the topology has virtually no porous structure. Abrasion tests show that the contact angle hysteresis is still lower than 5 degrees after 10,000 cycles even when the topology has virtually no porous structure (the case of a 1 to 24 ratio). This demonstrates that this coating still performs excellent liquid repellency even after damage or with fewer structures.

To further probe the surface morphology of coatings with different composite-to-solvent ratios, the 3D topologies of the coatings were obtained by the LEXT optical microscope shown in FIG. 12. The roughness decreases drastically with the composite-to-solvent ratio and the height variation is large when the composite-to-solvent ratio increases.

Lubricant selection can help provide abrasion-resistant omniphobicity to the coatings prepared in accordance with the present disclosure. Systematic lubricant selection can even fulfill abrasion-resistant omniphobicity. A Hansen solubility parameter is used to evaluate miscibility as a primary judgment for lubricant candidates to fulfill omniphobicity. In these examples, a hydroxyl-terminated fluorinated oil FLUOROLINK™ D10/H was utilized as an example. FIG. 13A shows the Hansen solubility analysis of the fluorinated oil to show the miscibility between the lubricant and various working liquids. The analysis suggests that the hydroxyl terminated fluorinated oil is immiscible with hydrocarbon, water, and some alcohols. Water repellency may lead to a wide range of daily applications while hydrocarbon repellency may fulfill some promising industrial applications. Herein, low contact angle hysteresis on both low and high surface tension liquids can be achieved. Moreover, omniphobicity can also be fulfilled on different substrates.

FIG. 13B shows the repellency of water and hexadecane, respectively, representing the repellency of high surface tension and low surface tension liquids, on both flat and porous substrates. The results indicate that both water and hydrocarbon can be easily removed by tilting even on coated porous substrates such as filter paper and copper foam. The contact angle hysteresis of various liquids is further measured on the coated flat surface (aluminum surface) shown in FIG. 14A and porous surface (copper foam) shown in FIG. 14B. The contact line on porous substrates may encounter higher surface energy/topographical changes, leading to higher contact angle hysteresis on porous substrates than on flat substrates. Coated flat substrates also display outstanding abrasion-resistant omniphobicity. Four liquids are selected for a demonstration to show the abrasion durability, shown in FIG. 14C. Both contact angle and contact angle hysteresis remain almost unchanged after 10,000 CS-10 abrasion cycles under 1.1 kg load even for the liquids that possess low surface tension.

Different coating methods (e.g., spin coating, spray coating, and drop casting) have been used to apply the inventive nanocomposite coatings and to evaluate the capability to scale-up production. FIG. 15A shows that a coating that is infused with hydroxyl terminated fluorinated oil according to certain aspects of the present disclosure exhibits omniphobicity no matter which coating method is utilized. The polymer-to-silica ratio of the nanocomposite was 1 to 1 and the composite-to-solvent ratio was 1 to 4. FLUOROLINK™ D10/H hydroxyl terminated PFPE oil was used as the lubricant. The SEM topologies of the coatings from different fabrication methods were captured to probe the microstructure made from different procedures shown in FIG. 15B, indicating that different fabrication procedures lead to slightly different micro-structures. Though the topologies are different, they all perform similar abrasion-resistant omniphobicity (here we use water and hexadecane as a demonstration). FIG. 15C shows the relationship between the abrasion cycle and both advancing contact angle and contact angle hysteresis on various liquids on coated flat aluminum substrates using different methods. The X mark denotes the advancing contact angle and the cross sign denotes the contact angle hysteresis. The error bars show the standard deviations of at least 5 independent measurements.

Durability of the inventive nanocomposite coating after water immersion is also investigated herein. More specifically, a water immersion test was conducted to check the lubricant retention ability before and after abrasion. Coatings (unabraded/abraded for 1,000 CS-10 abrasion cycles under 1.1 kg) were soaked in deionized (DI) water and the contact angles were measured for several days (up to 14 days or 2 weeks). The results are shown in FIG. 16. The contact angle shows nearly no change on both unabraded and abraded coatings with various infused oils (100 cSt hydroxyl terminated silicone oil and hydroxyl terminated fluorinated oil for demonstration), indicating that the coating possesses excellent oil retention before and after abrasion with various lubricants.

In certain aspects, although the inventive anti-fouling nanocomposite coatings show excellent abrasion resistance, they may have relatively weak wiping resistance from a substrate for certain applications. The abrasion resistance of the coating stems from the remaining lubricity or "slippery" properties even after damage. However, the coating may be removed from the surface by cloth wiping and thus, the slippery property of the surface of the substrate is then negated. Thus, for certain applications, an intermediate adhesive layer may be applied to a surface of the substrate and then the coating applied over the adhesive layer. In one variation, a double-sided adhesive tape or epoxy as an adhesive is applied between a substrate and a coating to enhance the bonding and substantially enhances the wiping resistance of the anti-fouling nanocomposite coating. The results are shown in FIGS. 17A and 17B. After adding adhesive such as tape or epoxy as a medium or underlying layer, the contact angle hysteresis of the coating only rises to around 10 degrees after 500 wiping cycles of a piece of KIMWIPES™ under 350 g load while the contact angle hysteresis of the original coating increases to more than 30 degrees within merely 20 cycles. Also, the wiping resistance is far superior to conventional micro-structured SLIPSs. The contact angle hysteresis of conventional micro-structured SLIPSs rises to more than 30 degrees within merely 20 cycles. The abrasion test on the coating with adhesives in FIG. 17C suggests that even with an additional adhesive layer beneath the surface coating, the abrasion resistance is high. The contact angle hysteresis is still around 5 degrees after 10,000 CS-10 abrasion cycles under the load of 1.1 kg.

The micro-topologies of the coatings with and without adhesive (J-B Weld ClearWeld epoxy) are then captured via SEM imaging shown in FIG. 18. The microstructure remains after 500 wiping cycles for the coating with epoxy, while the microstructure of the coating without epoxy is removed after wiping. Without being limited to any particular theory, the high wiping resistance of the coating with epoxy may be because the microstructure is harder to remove than that of the coating without epoxy due to better bonding with the substrate. Also, the microstructure of the coating with epoxy is virtually removed with some silica microstructures remaining after 10,000 CS-10 abrasion cycles. However, since a thin lubricated layer remains, the wettability performance remains after abrasion.

Transparency of the inventive nanocomposite coatings can be achieved with or without transparent epoxy (using J-B Weld ClearWeld as an example). The results are shown in FIGS. 19A-19D. FIG. 19A suggests that coated glass without epoxy and with epoxy both show a high degree of transparency. The absorbance of the coated samples via UV-Vis spectroscopy was measured in FIG. 19B. The results show that both coatings possess absorbances lower than 0.2 within the wavelength range between 400 nm and 800 nm. The higher absorbance of coating with epoxy may be due to the mismatch between the epoxy layer and the coating layer. FIGS. 19C and 19D suggest that the coating with epoxy has both abrasion and wiping resistance, while the coating without epoxy has only abrasion resistance. The above results show a trade-off between transparency and durability. If the application and working environment does not require wiping resistance, but requires higher transparency, an epoxy adhesive layer may be omitted, while in other environments requiring wipe resistance, an epoxy layer may be included.

The ice-shedding performance of the anti-fouling inventive nanocoatings are also examined. The ice-shedding performance simultaneously exhibits low adhesion strength and low interfacial toughness. FIG. 20 compares the ice-shedding performance between the inventive anti-fouling nanocomposite coating and conventional LIT PDMS which possesses the lowest interfacial toughness ever reported. In certain variations, an inventive coating exhibits a lower adhesion strength ($\tau_{ice}$, 32.37 kPa<55.76 kPa), lower critical detachment force per width ($\tilde{F}_{crit}$, 18.79 N/cm<34.82 N/cm), and lower interfacial toughness ($\Gamma$, 0.035 J/m$^2$<0.12 J/m$^2$). The results show that coatings prepared in accordance with various aspects of the present disclosure possess much better ice-shedding performance than LIT PDMS. It is noteworthy that the interfacial toughness of this coating is lower than the theoretical value of a surface considering merely Van der Waals force ($\Gamma$=0.1 J/m$^2$). While not being bound by any particular theory, it is theorized that the lower interfacial toughness may be because the fracture of lubricated interfaces is different from the fracture of dry interfaces. For dry interfaces, two bodies separate and thus create two new surfaces. The theoretical limit would be that two bodies link with the weakest molecular interaction, i.e., the Van der Waals force. However, for lubricated interfaces, two bodies separate, and then a liquid bridge of lubricant forms. The energy required to separate two surfaces would be related to the Laplace force of the liquid bridge, giving $$\Gamma = 2\gamma \cos\theta, \quad (4)$$

where $\Gamma$ is the interfacial toughness, $\gamma$ is the surface tension of the liquid, and $\theta$ is the liquid contact angle on surfaces.

For lubricated surfaces, the surface tension $\gamma$ of silicone oils is around 0.021 J/m$^2$ and the contact angle $\theta$ would be around zero. There are two different surfaces attached to the lubricant: the coating and the ice. The contact angle on ice is nearly zero due to the high surface energy of ice while the contact angle on the coating is also around zero to form a stable lubricant layer. Herein, the theoretical limit of a lubricated interface should be around 0.042 J/m$^2$. The interfacial toughness of the coatings designed in this example is roughly the same as the theoretical limit. Some measured values are lower than the theoretical limit. This may be because the triangular traction separation law is used in the interfacial toughness calculation. However, the interface may not encounter a pure brittle fracture, leading to different profiles of traction separation law. The change in the fracture profile may lead to an underestimation of the interfacial toughness.

The ice-shedding durability of the inventive anti-fouling nanocomposite coatings is also analyzed. Besides excellent ice-shedding behaviors, the coating also performs excellent abrasion and icing event durability. The results in FIG. 21A show that both ice adhesion and contact angle hysteresis remain unchanged after 7,500 abrasion cycles of CS-10 abrader under a 1.1 kg load. Also, the low ice adhesion of the coatings remains even after 15 icing cycles, while the icing event durability of conventional SLIPSs is low due to the lubricant depletion issue. This may be because the coating is still lubricated after damage, leading to a persistently low ice adhesion after ice removal. The results of the icing event durability are shown in FIG. 21B.

FIGS. 22A-22C show ice-shedding behaviors of the coatings having different viscosities. FIG. 22A shows the relationship between ice length and force per width, while FIG. 22B shows the relationship between the icing cycle and ice adhesion strength. FIG. 22C shows the viscosity dependency of adhesion strength and interfacial toughness. The polymer-to-silica ratio was 1 to 1 and the composite-to-solvent ratio was 1 to 4 for all coatings. FIG. 22A shows that viscosities play a minor role in the relationship between ice length and critical detachment force per width. Viscosities also do not impact the icing event durability much, as shown in FIG. 22B. FIG. 22C shows that both adhesion strength and interfacial toughness possess a weak positive correlation with lubricant viscosities. The increase of friction with lubricant viscosities may cause a slight positive correlation. However, since friction is not the dominant factor of adhesion in the case of boundary lubrication the correlation is not prominent.

The influence of the composite-to-solvent ratio in the lubricated porous structures of the inventive coatings is also investigated. The ice length-critical detachment force per width relationship and icing event durability show no difference between both low and high composite-to-solvent ratios, respectively representing coatings with virtually no porous structures and with porous structures, as shown in FIGS. 23A and 23B. This result may imply that the coating is lubricated everywhere not only within the porous structure, leading to excellent and durable ice-shedding performance even without porous structures.

The ice-shedding performance of the coatings made by drop casting is also examined. The results are shown in FIGS. 24A-24B. The ice length-critical detachment force per width relationship and the icing event durability show no difference between the drop-cast and spin-coated coatings. This underscores the ability to make the coatings via various methods and thus ease of commercialization. The ice-shedding behaviors of the coating with an intermediate layer of tape are also evaluated, with the results shown in FIGS. 25A and 25B. Comparing to the coating applied directly on the surface without any tape, the coating with tape disposed over the substrate surface possesses higher interfacial toughness (=0.056 J/m$^2$) and also poorer icing event durability despite having higher wiping resistance. The poor durability stems from the damage to the tape after multiple ice removal cycles.

FIGS. 26A-26C show the influence of amounts of filler particles to binder by varying polymer-to-silica ratios in the nanocomposite coatings. Though polymer-to-silica ratios show no impact on the relationship between ice length and critical detachment force per width shown in FIG. 26A, the icing event durability is much lower when the polymer-to-silica ratio is 2 to 1, while the icing event durability is similar at other ratios shown in FIG. 26B. This may be due to a slight difference in microstructures. The reduced amount of silica in the nanocomposite leads to looser micro-structures shown in FIG. 26C and thus a weaker ability to retain lubricant after damage or depletion, leading to lower icing event durability. Interestingly, the low durability of the polymer-to-silica ratio 2 to 1 only occurs when the lubricant viscosity is 100 cSt. If the viscosity is changed to 25, 65, or 750 cSt, coatings with high icing event durability are still observed. The results are shown in FIG. 27.

In certain aspects, the inventive coatings may also be applied to porous substrates, such as polypropylene (PP) filter paper and copper foam. The ice-shedding performance is shown in FIGS. 28A-28B. In the case of PP filter paper, the polymer-to-silica ratio of 1 to 1 possesses lower adhesion strength and interfacial toughness than that of 2 to 1. Plus, the interfacial toughness of the coated PP filter paper (=0.133 $J/m^2$) is higher than the theoretical value (=0.1 $J/m^2$), not like the coated non-porous plate that possesses a value lower than the theoretical limit. However, the coated copper foam exhibits an extraordinarily low interfacial toughness (=0.015 $J/m^2$) that may be due to the existence of multiple micro-initiators on copper foam. Unfortunately, the coated copper foam and the coated PP filter paper with the polymer-to-silica ratio of 2 to 1 do not appear to exhibit high levels of icing event durability. Only the coated PP filter paper with a 1 to 1 ratio appears to exhibit desirable levels of icing event durability.

The present disclosure thus contemplates the design and fabrication of robust solid and liquid repellant or omniphobic elastomeric nanocomposite coatings using a polyol-reactive infusion method that further reacts with nanoparticles. As noted above, the term omniphobic is used interchangeably herein with solid and liquid repellant in the context of the present disclosure. The ability to concurrently repel liquids and solid foulants for long durations and after experiencing abrasion is particularly advantageous. Specifically, in certain variations, omniphobic polyurethane coatings are prepared through a polyol reactive infusion method to create a partially crosslinked polymer matrix. The reactive oil infusion method provides the ability to use more functional polymers to have the capability to form liquid and solid repellent surfaces, which significantly enables the application of such surfaces in various industrial and medical settings.

Recent studies of using polyurethane as a base polymer matrix have shown high mechanical durability and low adhesion strength towards ice. However, none of these surfaces can repel a wide range of liquids and provide the capability to repel ice as well as other solid foulants. Since polyurethane cannot be swelled by most common alkane oils and silicone oils, the conventional liquid infused method by swelling cannot be applied to form slippery surfaces with polyurethane. Therefore, the present disclosure contemplates new fabrication methods to achieve a mechanically durable and omniphobic polyurethane nanocomposite system, including ice shedding capability.

Herein, mechanically durable nanocomposite coatings, which repel a wide range of liquid and ice/solid foulants, are created. In one variation, an elastomeric or polymeric precursor of an elastomeric or polymeric matrix can be formed that includes reacting a first component that may be a polyol having reactive hydroxy groups and a second component comprising reactive isocyanate groups together to form a polyurethane or a fluoropolyurethane. To realize improved abrasion resistance, a hard polyurethane (PU) elastomer is selected as the base polymer matrix. An elastomeric precursor used to form the elastomeric matrix may have unreacted functional groups remaining that can then be further reacted with a reactive oil and/or hydroxyl groups on silica nanoparticles. In one variation, the first component may be a polyol in the form of a slightly branched hydroxyl-bearing polyester (such as polyol, DESMOPHEN™ 670BA). The second component may be a triisocyanate polyurethane precursor having three isocyanate reactive groups. In certain variations, the elastomeric precursor may be an aromatic polyurethane with isocyanate groups, such as a triisocyanate aromatic polyurethane monomer (such as the tri-isocyanate DESMOPHEN™ N3800 available from Covestro).

The reactive oil (polyol or lubricating regions) reacts with the remaining isocyanate groups (elastomer). Through partial cross-linking of the base polymer with the reactive oils, the elastomeric PU coating forms a stable lubrication layer with lubricating domains created by the reactive oil segments that fully maintain lubrication under abrasion. This not only enhances the mechanical strength of the coating, but also facilitates the repulsion of both liquid and solid foulants. Further, any unreacted free oil can act as the lubrication inside and on top of the polymer. Suitable reactive oils include silicone-based diols (fluorinated and non-fluorinated hydroxy terminated polydimethylsiloxane (PDMS)) or alternatively hydroxyl-terminated perfluoropolyether (PFPE). The hydroxy groups react with the isocyanate groups on the durable elastomeric matrix to form durable slippery omniphobic polyurethane (omni-PU) elastomeric matrix that can exhibit both liquid and solid repellency.

A substrate may have reactive groups or may be treated to form a plurality of reactive groups, for example, by plasma treatment or treatment with a tie layer or cross linker material. As noted above, the substrate may have an adhesive first applied.

Silica nanoparticles, an isocyanate component, and a polyol component may be mixed at predetermined mass ratios and sonicated, for example, for 30 minutes. As noted above, a mass ratio of isocyanate component and polyol component in polymer binder may be about 2 to 1 so that excess isocyanate remains unreacted and available to react with other reactants (2 to 1 leads to a reaction extent of 0.483 based on the information that N3800 possesses 26.2 weight percent of isocyanate and 670BA possesses 25.3 weight percent of hydroxyl group). A catalyst (e.g., dibutyltin dilaurate 1 wt. % in MIBK) may then be added to the solution, for example, with a catalyst-to-MIBK volume ratio of 1 to 50. The admixture may then be mixed, for example, vortex mixed for 30 minutes.

Next, the admixture with the nanoparticles and elastomer monomer having a polyurethane chemical structure formed by combining a polyol component and an isocyanate component is applied over the substrate. Suitable coating methods include drop casting, spin coating, spray coating, or the like. Thus, reactions occur between the reactive groups on the isocyanate, polyol, and silica nanoparticles form covalent bonds that anchor a porous polymeric matrix layer to the surface of the substrate.

The coated substrates may then be heated, for example to pre-cure the nanocomposite. The coated substrates may be placed in an oven (Isotemp Vacuum Oven 282A, Fisher Scientific, United States) at 75° C. for 1 hour to pre-cure the composite.

Next, a reactive lubricant oil may be introduced into the layer on the coated substrate and will be incorporated into the elastomeric matrix as lubricating domains. The reactive oils, such as silicone-based diols (fluorinated and non-fluorinated hydroxy terminated polydimethylsiloxane (PDMS)) or alternatively hydroxyl-terminated perfluoropolyether (PFPE) can react with remaining unreacted isocyanate groups to form the durable slippery omniphobic polyurethane (omni-PU) elastomeric matrix that can exhibit both liquid and solid repellency. The reactive oils may disposed in a solvent, such as methyl isobutyl ketone (MIBK) solution. In certain variations, a volume ratio of the elastomer precursor to reactive oil in may be from 1 to 1 volume ratio to 1 to 4 may be added to the coating for reaction.

The coated substrates with reactive lubricant may then be then be cured for the solidification (e.g., polymerization and/or crosslinking reactions). As noted above, the elastomer precursor/monomer may include isocyanate reactive groups. The precursor material may also include a polyol. The isocyanate monomer and polyol may initially react with one another to form the elastomeric/polymeric precursor still having some reactive groups remaining. As noted above, in accordance with certain aspects of the present disclosure, only a partial crosslinking reaction occurs, for example, where at least about 20% of the functional groups react, optionally greater than or equal to about 50% of the functional groups react. Further, the isocyanate monomer and polyol may react with the reactive groups on the substrate and/or reactive groups on the silica nanoparticles. In this manner, crosslink reactions form connection points between the elastomer monomer and reacted polyol and hydroxyl groups on the silica nanoparticles and substrate. As will be appreciated, in the initial reaction, less than all of the reactive groups on the elastomeric precursor may be reacted with polyol and/or silica nanoparticles leaving groups for subsequent reaction with reactive oil and/or to form a lubricating layer. Thus, the curing or crosslinking step continues bonding the elastomeric precursor, silica nanoparticles, and reactive oil (optionally to the substrate surface). Such curing may occur by heating, for example, by being placed in the oven (Isotemp Vacuum Oven 282A, Fisher Scientific, United States) at 75° C. for 8-12 hours. Further, the coated substrates may be exposed to actinic radiation and/or e-beam for additional curing. By way of example, after the heating, the coated substrate may be exposed to an hour of UV curing (wavelength: 254 nm UVC, XX-40S UV bench lamp, Analytik Jena, Germany) if necessary.

In certain aspects, the present disclosure provides methods of making a durable solid and liquid repellant nanocomposite material. Such a method may comprise mixing (i) an elastomeric precursor having a first reactive functional group selected from the group consisting of: isocyanate, alkene, amine, carboxylic acid, hydroxyl, and combinations thereof, (ii) a polyol having a second reactive functional group selected from the group consisting of: hydroxyl group, amine, carboxylic acid, and combinations thereof, (iii) a plurality of silica nanoparticles; and (iv) a catalyst to form an admixture. In certain variations, the (i) elastomeric precursor's first reactive functional group comprises isocyanate and the (ii) polyol's second reactive functional group comprises a hydroxyl group. The mixing may be vortex mixing. The mixing optionally further comprises first mixing the (i) elastomeric precursor, (ii) polyol, (iii) nanoparticles in a solvent for greater than or equal to about 15 minutes, followed by adding the (iv) catalyst in solvent and mixing.

Then, the admixture may be applied to a surface of a substrate comprising reactive groups capable of reacting with the first reactive functional group. The admixture may be in a liquid or semi-liquid state and thus the applying optionally comprises drop casting, spin coating, or spray coating on the surface of the substrate. The admixture may be precured and/or dried to remove solvent(s) after it is applied to the substrate.

For example, the method may include heating the coated substrates. In certain variations, the heat may occur at greater than or equal to about 70° C. to less than or equal to about 105° C. for greater than or equal to about 60 minutes to less than or equal to about 120 minutes (2 hours). As will be appreciated by those of skill in the art, the higher the temperature during heating, the shorter the duration of heating. The heating is optionally conducted for at least 90 minutes at greater than or equal to about 90° C.

A reactive oil in solvent, such as methyl isobutyl ketone (MIBK), may then be added to the material on the substrate. As noted above, in certain variations, the reactive oils may be such as silicone-based diols (fluorinated and non-fluorinated hydroxy terminated polydimethylsiloxane (PDMS)) or hydroxyl-terminated perfluoropolyether (PFPE).

The admixture may then be cured to promote a reaction between the first reactive functional group, the second reactive functional group, the reactive oil functional groups and the silica nanoparticles to form an elastomeric matrix having at least a portion of silica nanoparticles disposed therein and formed over the substrate. By curing, it is meant that there is at least one reaction that may include crosslinking, but may also include polymerization and reaction between functional groups on the surface of the nanoparticles and/or substrate and the elastomeric matrix. The curing process may involve applying heat, actinic radiation (e.g., UV radiation), e-beam radiation, and the like. In certain aspects, the curing may be done in a low pressure or vacuum environment. The elastomeric matrix may have any of the properties described above, including having a plurality of lubricating domains distributed therein. The curing may be conducted in a vacuum oven. In certain variations, the surrounding environment contains less than or equal to about 10,000 ppm of water (corresponding to about 70% relative humidity at 20° C.), optionally less than or equal to about 7,000 ppm of water (corresponding to about 50% relative humidity at 20° C.), and in certain aspects less than or equal to about 4,000 ppm of water (corresponding to about 30% relative humidity at 20° C.). In certain other variations, the surrounding environment is substantially free of water, meaning for example, less than or equal to about 150 ppm of water (corresponding to less than about 1% relative humidity at 20° C.), optionally less than or equal to about 70 ppm of water (corresponding to about 0.5% relative humidity at 20° C.).

The curing may be conducted at greater than or equal to about 20° C. to less than or equal to about 70° C., optionally greater than or equal to about 40° C. to less than or equal to about 60° C., for greater than or equal to about 4 hours to less than or equal to about 48 hours.

In certain further aspects, the substrate comprises glass (e.g., silicon dioxide, borosilicates, and the like) and the reactive groups on the surface of the substrate comprise hydroxyl (—OH) functional groups or amine (—$NH_2$) functional groups. For example, in one variation, the surface of the substrates were hydroxylated (to form surface oxides) via oxygen plasma exposure (PPE-75, Plasma Etch, United States) for 20 minutes with a power of 40 W before applying the coating solution. In another variation, the surface may be treated with oxygen plasma for forming surface hydroxides followed by reacting the surface with bis(3-trimethoxysilylpropyl) amine to form the amine reactive groups. For example, surface hydroxylation may be achieved by using an oxygen plasma exposure for 15 to 20 minutes with a power of 40 W.

Such methods desirably form a durable solid and liquid repellant material having the properties described above, including abrasion resistance. A summary of the coatings prepared in accordance with certain aspects of the present disclosure having different components and proportions is described below.

TABLE 1

| Isocyanate-to-polyol ratio | Polymer-to-nano-particle ratio | Composite-to-solvent ratio | Lubricant type | Nano-particle type | Substrate | Procedure (Heat/UV) | CAH as prepared (°) | Abrasion resistance? (Y, CAH (°) after 10,000 cycles/N) | Wiping resistance? (Y, CAH (°) after 500 cycles/N) |
|---|---|---|---|---|---|---|---|---|---|
| Various examples of low contact angle hysteresis (CAH) and abrasion resistance tested | | | | | | | | | |
| 2 to 1 | 2 to 1 | 3 to 4 | 100 cSt HO—SO | 15-20 nm $SiO_2$ | Copper foam | Heat/UV Spincoat | 5.4 ± 0.8 (water) | Y, 7.0 ± 0.4 | N/A |
| 2 to 1 | 1 to 1 | 3 to 8 | 100 cSt HO—SO | 15-20 nm $SiO_2$ | Copper foam | Heat/UV Spincoat | 2.3 ± 0.4 (water) | Y, 10.5 ± 1.5 | N/A |
| 2 to 1 | 2 to 1 | 1 to 4 | 100 cSt HO—SO | 15-20 nm $SiO_2$ | Copper plate | Heat/UV Spincoat | 2.2 ± 0.4 (water) | Y, 1.1 ± 0.2 | N/A |
| 2 to 1 | 2 to 1 | 1 to 4 | 100 cSt HO—SO | 15-20 nm $SiO_2$ | Aluminum plate | Heat/UV Spincoat | 1.6 ± 0.3 (water) | Y, 5.9 ± 1.6 | N/A |
| 2 to 1 | 2 to 1 | 1 to 4 | 100 cSt HO—SO | 15-20 nm $SiO_2$ | Glass slide | Heat/UV Spincoat | 1.7 ± 0.4 (water) | Y, 1.8 ± 0.2 | N/A |
| 2 to 1 | 1 to 1 | 1 to 4 | 100 cSt HO—SO | 15-20 nm $SiO_2$ | Copper plate | Heat/UV Spincoat | 1.8 ± 0.4 (water) | Y, 1.4 ± 0.2 | N/A |
| 2 to 1 | 1 to 1 | 1 to 4 | 100 cSt HO—SO | 15-20 nm $SiO_2$ | Aluminum plate | Heat/UV Spincoat | 1.5 ± 0.3 (water) | Y, 0.8 ± 0.1 | N/A |
| 2 to 1 | 1 to 1 | 1 to 4 | 100 cSt HO—SO | 15-20 nm $SiO_2$ | Glass slide | Heat/UV Spincoat | 2.0 ± 0.7 (water) | Y, 1.9 ± 0.7 | N/A |
| 2 to 1 | 1 to 1 | 1 to 4 | 100 cSt HO—SO | 15-20 nm $SiO_2$ | Polycarbonate plate | Heat/UV Spincoat | 0.9 ± 0.3 (water) | Y, 2.1 ± 0.8 | N/A |
| 2 to 1 | 1 to 2 | 1 to 4 | 100 cSt HO—SO | 15-20 nm $SiO_2$ | Copper plate | Heat/UV Spincoat | 1.3 ± 0.5 (water) | Y, 1.2 ± 0.2 | N/A |
| 2 to 1 | 1 to 2 | 1 to 4 | 100 cSt HO—SO | 15-20 nm $SiO_2$ | Aluminum plate | Heat/UV Spincoat | 1.8 ± 1.0 (water) | Y, 1.5 ± 0.4 | N/A |
| 2 to 1 | 1 to 2 | 1 to 4 | 100 cSt HO—SO | 15-20 nm $SiO_2$ | Glass slide | Heat/UV Spincoat | 1.8 ± 0.7 (water) | Y, 1.6 ± 0.5 | N/A |
| 2 to 1 | 1 to 1 | 1 to 4 | 100 cSt HO—SO | 15-20 nm $SiO_2$ | Aluminum plate | UV Spincoat | 2.1 ± 0.3 (water) | Y, 1.4 ± 0.1 | N/A |
| 2 to 1 | 1 to 1 | 1 to 4 | 100 cSt HO—SO | 15-20 nm $SiO_2$ | Aluminum plate | Heat Spincoat | 1.3 ± 0.3 (water) | Y, 1.2 ± 0.5 | N/A |
| 2 to 1 | 1 to 1 | 1 to 4 | 100 cSt $(CH_3)_3$—SO | 15-20 nm $SiO_2$ | Aluminum plate | Heat/UV Spincoat | 4.0 ± 0.8 (water) | Y, 1.7 ± 0.3 | N/A |
| 2 to 1 | 1 to 1 | 1 to 4 | 100 cSt $(CH_3)_3$—SO | 15-20 nm $SiO_2$ | Aluminum plate | UV Spincoat | 4.5 ± 0.7 (water) | N | N/A |
| 2 to 1 | 1 to 1 | 1 to 4 | 100 cSt $(CH_3)_3$—SO | 15-20 nm $SiO_2$ | Aluminum plate | Heat Spincoat | 6.2 ± 2.5 (water) | N | N/A |
| 2 to 1 | 1 to 1 | 1 to 4 | HO-PFPE oil | 15-20 nm $SiO_2$ | Aluminum plate | Heat/UV Spincoat | 2.1 ± 0.8 (water) | Y, 1.0 ± 0.3 | N/A |
| 2 to 1 | 1 to 1 | 1 to 4 | HO-PFPE oil | 15-20 nm $SiO_2$ | Aluminum plate | UV Spincoat | 2.5 ± 0.7 (water) | Y, 1.5 ± 0.3 | N/A |
| 2 to 1 | 1 to 1 | 1 to 4 | HO-PFPE oil | 15-20 nm $SiO_2$ | Aluminum plate | Heat Spincoat | 1.2 ± 0.3 (water) | 2.0 ± 0.9 | N/A |
| 2 to 1 | 1 to 1 | 1 to 4 | Krytox oil 1525 | 15-20 nm $SiO_2$ | Aluminum plate | Heat/UV Spincoat | 16.5 ± 3.3 (water) | N | N/A |
| 2 to 1 | 1 to 1 | 1 to 4 | Krytox oil 1525 | 15-20 nm $SiO_2$ | Aluminum plate | UV Spincoat | 7.5 ± 1.8 (water) | N | N/A |
| 2 to 1 | 1 to 1 | 1 to 4 | Krytox oil 1525 | 15-20 nm $SiO_2$ | Aluminum plate | Heat Spincoat | 7.8 ± 1.4 (water) | N | N/A |
| 2 to 1 | 1 to 1 | 1 to 4 | Ethoxylated-PFPE oil | 15-20 nm $SiO_2$ | Aluminum plate | Heat/UV Spincoat | 3.3 ± 0.6 (water) | N | N/A |
| 2 to 1 | 1 to 1 | 1 to 4 | $NH_2$—SO | 15-20 nm $SiO_2$ | Aluminum plate | Heat/UV Spincoat | 4.8 ± 1.2 (water) | N | N/A |
| 2 to 1 | 1 to 1 | 1 to 4 | mono$NH_2$—SOSO | 15-20 nm $SiO_2$ | Aluminum plate | Heat/UV Spincoat | 5.4 ± 1.1 (water) | N | N/A |
| 2 to 1 | 1 to 1 | 1 to 4 | 25 cSt HO—SO | 15-20 nm $SiO_2$ | Aluminum plate | Heat/UV Spincoat | 0.9 ± 0.3 (water) | Y, 3.2 ± 1.0 | N/A |
| 2 to 1 | 1 to 1 | 1 to 4 | 65 cSt HO—SO | 15-20 nm $SiO_2$ | Aluminum plate | Heat/UV Spincoat | 1.9 ± 0.7 (water) | Y, 2.2 ± 0.6 | N/A |
| 2 to 1 | 1 to 1 | 1 to 4 | 750 cSt HO—SO | 15-20 nm $SiO_2$ | Aluminum plate | Heat/UV Spincoat | 1.6 ± 0.2 (water) | Y, 3.3 ± 0.5 | N/A |
| 2 to 1 | 1 to 1 | 1 to 12 | 100 cSt HO—SO | 15-20 nm $SiO_2$ | Aluminum plate | Heat/UV Spincoat | 1.1 ± 0.4 (water) | Y, 2.2 ± 0.6 | N/A |
| 2 to 1 | 1 to 1 | 1 to 24 | 100 cSt HO—SO | 15-20 nm $SiO_2$ | Aluminum plate | Heat/UV Spincoat | 0.4 ± 0.1 (water) | Y, 4.2 ± 0.8 | N/A |
| 2 to 1 | 3 to 1 | 1 to 4 | 750 cSt HO—SO | 15-20 nm $SiO_2$ | Aluminum plate | Heat/UV Spincoat | 1.3 ± 0.4 (water) | Y, 4.3 ± 0.6 | N/A |
| Only N3800 | Only N3800 | 1 to 12 | 100 cSt HO—SO | — | Aluminum plate | Heat/UV Spincoat | 33.8 ± 2.0 (water) | N | N/A |
| 2 to 1 | Only N3800 + 670BA | 1 to 12 | 100 cSt HO—SO | — | Aluminum plate | Heat/UV Spincoat | 35.1 ± 1.4 (water) | N | N/A |
| 2 to 1 | 1 to 1 | 1 to 4 | 100 cSt HO—SO | 60-70 nm $SiO_2$ | Aluminum plate | Heat/UV Spincoat | 4.3 ± 1.4 (water) | N/A | N/A |

TABLE 1-continued

Various examples of low contact angle hysteresis (CAH) and abrasion resistance tested

| Isocyanate-to-polyol ratio | Polymer-to-nano-particle ratio | Composite-to-solvent ratio | Lubricant type | Nano-particle type | Substrate | Procedure (Heat/UV) | CAH as prepared (°) | Abrasion resistance? (Y, CAH (°) after 10,000 cycles/N) | Wiping resistance? (Y, CAH (°) after 500 cycles/N) |
|---|---|---|---|---|---|---|---|---|---|
| 2 to 1 | 1 to 1 | 1 to 4 | 100 cSt HO—SO | 400 nm $SiO_2$ | Aluminum plate | Heat/UV Spincoat | 34.5 ± 3.5 (water) | N | N/A |
| 2 to 1 | 1 to 1 | 1 to 4 | 100 cSt HO—SO | 1 um $SiO_2$ | Aluminum plate | Heat/UV Spincoat | 36.7 ± 1.2 (water) | N | N/A |
| 2 to 1 | 1 to 1 | 1 to 4 | 100 cSt HO—SO | 10 nm $Al_2O_3$ | Aluminum plate | Heat/UV Spincoat | 37.6 ± 2.0 (water) | N | N/A |
| 2 to 1 | 1 to 1 | 1 to 4 | 100 cSt HO—SO | 15-30 nm $Si_2N_3$ | Aluminum plate | Heat/UV Spincoat | 13.3 ± 3.3 (water) | N | N/A |
| 2 to 1 | 1 to 1 | 1 to 4 | HO-PFPE oil | 15-20 nm $SiO_2$ | Aluminum plate | Heat/UV Spincoat | 1.0 ± 0.4 (octane) | N/A | N/A |
| 2 to 1 | 1 to 1 | 1 to 4 | HO-PFPE oil | 15-20 nm $SiO_2$ | Aluminum plate | Heat/UV Spincoat | 0.9 ± 0.2 (dodecane) | N/A | N/A |
| 2 to 1 | 1 to 1 | 1 to 4 | HO-PFPE oil | 15-20 nm $SiO_2$ | Aluminum plate | Heat/UV Spincoat | 1.5 ± 0.3 (hexadecane) | Y, 1.6 ± 0.4 | N/A |
| 2 to 1 | 1 to 1 | 1 to 4 | HO-PFPE oil | 15-20 nm $SiO_2$ | Aluminum plate | Heat/UV Spincoat | 0.9 ± 0.3 (toluene) | Y, 2.2 ± 0.8 | N/A |
| 2 to 1 | 1 to 1 | 1 to 4 | HO-PFPE oil | 15-20 nm $SiO_2$ | Aluminum plate | Heat/UV Spincoat | 2.4 ± 0.3 (ethylene glycol) | Y, 2.9 ± 0.8 | N/A |
| 2 to 1 | 1 to 1 | 1 to 4 | HO-PFPE oil | 15-20 nm $SiO_2$ | Aluminum plate | Heat/UV Spincoat | 2.1 ± 0.6 (diiodomethane) | N/A | N/A |
| 2 to 1 | 1 to 1 | 1 to 4 | HO-PFPE oil | 15-20 nm $SiO_2$ | Aluminum plate | Heat/UV Spincoat | 1.7 ± 0.8 (glycerol) | N/A | N/A |
| 2 to 1 | 1 to 1 | 1 to 4 | HO-PFPE oil | 15-20 nm $SiO_2$ | Copper foam | Heat/UV Spincoat | 8.9 ± 1.4 (octane) | N/A | N/A |
| 2 to 1 | 1 to 1 | 1 to 4 | HO-PFPE oil | 15-20 nm $SiO_2$ | Copper foam | Heat/UV Spincoat | 9.5 ± 1.2 (dodecane) | N/A | N/A |
| 2 to 1 | 1 to 1 | 1 to 4 | HO-PFPE oil | 15-20 nm $SiO_2$ | Copper foam | Heat/UV Spincoat | 5.2 ± 1.2 (hexadecane) | N/A | N/A |
| 2 to 1 | 1 to 1 | 1 to 4 | HO-PFPE oil | 15-20 nm $SiO_2$ | Copper foam | Heat/UV Spincoat | 11.4 ± 2.5 (toluene) | N/A | N/A |
| 2 to 1 | 1 to 1 | 1 to 4 | HO-PFPE oil | 15-20 nm $SiO_2$ | Copper foam | Heat/UV Spincoat | 6.5 ± 2.2 (ethylene glycol) | N/A | N/A |
| 2 to 1 | 1 to 1 | 1 to 4 | HO-PFPE oil | 15-20 nm $SiO_2$ | Copper foam | Heat/UV Spincoat | 11.9 ± 2.3 (diiodomethane) | N/A | N/A |
| 2 to 1 | 1 to 1 | 1 to 4 | HO-PFPE oil | 15-20 nm $SiO_2$ | Copper foam | Heat/UV Spincoat | 3.9 ± 0.6 (glycerol) | N/A | N/A |
| 2 to 1 | 1 to 1 | 1 to 12 | HO-PFPE oil | 15-20 nm $SiO_2$ | Aluminum plate | Heat/UV Drop cast | 2.3 ± 0.6 (water) | Y, 3.5 ± 0.4 | N/A |
| 2 to 1 | 1 to 1 | 1 to 12 | HO-PFPE oil | 15-20 nm $SiO_2$ | Aluminum plate | Heat/UV Drop cast | 5.2 ± 1.2 (hexadecane) | Y, 3.4 ± 0.7 | N/A |
| 2 to 1 | 1 to 1 | 1 to 12 | HO-PFPE oil | 15-20 nm $SiO_2$ | Aluminum plate | Heat/UV Spraycoat | 2.2 ± 0.2 (water) | Y, 2.4 ± 0.3 | N/A |
| 2 to 1 | 1 to 1 | 1 to 12 | HO-PFPE oil | 15-20 nm $SiO_2$ | Aluminum plate | Heat/UV Spraycoat | 1.6 ± 0.4 (hexadecane) | Y, 2.7 ± 0.6 | N/A |
| 2 to 1 | 2 to 1 | 3 to 4 | 100 cSt HO—SO | 15-20 nm $SiO_2$ | Carbon fiber fabric | Heat/UV Spincoat | 2.5 ± 0.7 (water) | N/A | N/A |
| 2 to 1 | 2 to 1 | 3 to 4 | 100 cSt HO—SO | 15-20 nm $SiO_2$ | Cellulose filter paper | Heat/UV Spincoat | 2.7 ± 1.5 (water) | N/A | N/A |
| 2 to 1 | 2 to 1 | 3 to 4 | 100 cSt HO—SO | 15-20 nm $SiO_2$ | PTFE filter paper | Heat/UV Spincoat | 4.6 ± 1.6 (water) | N/A | N/A |
| 2 to 1 | 2 to 1 | 3 to 4 | 100 cSt HO—SO | 15-20 nm $SiO_2$ | Steel mesh | Heat/UV Spincoat | 2.3 ± 0.9 (water) | N/A | N/A |
| 2 to 1 | 2 to 1 | 3 to 4 | 100 cSt HO—SO | 15-20 nm $SiO_2$ | PP filter paper | Heat/UV Spincoat | 1.3 ± 0.2 (water) | N/A | N/A |
| 2 to 1 | 1 to 1 | 1 to 4 | 100 cSt HO—SO | 15-20 nm $SiO_2$ | Silicon wafer | Heat/UV Spincoat | 1.6 ± 0.4 (water) | N/A | N/A |
| 2 to 1 | 1 to 1 | 1 to 6 | 100 cSt HO—SO | 15-20 nm $SiO_2$ | Glass | Heat Dropcast | 2.8 ± 0.3 (water) | N/A | N |
| 2 to 1 | 1 to 1 | 1 to 6 | 100 cSt HO—SO | 15-20 nm $SiO_2$ | 3M 300LSE tape | Heat Dropcast | 1.2 ± 0.3 (water) | N/A | Y, 13.4 ± 1.6 |

TABLE 1-continued

Various examples of low contact angle hysteresis (CAH) and abrasion resistance tested

| Isocyanate-to-polyol ratio | Polymer-to-nano-particle ratio | Composite-to-solvent ratio | Lubricant type | Nano-particle type | Substrate | Procedure (Heat/UV) | CAH as prepared (°) | Abrasion resistance? (Y, CAH (°) after 10,000 cycles/N) | Wiping resistance? (Y, CAH (°) after 500 cycles/N) |
|---|---|---|---|---|---|---|---|---|---|
| 2 to 1 | 1 to 1 | 1 to 6 | 100 cSt HO—SO | 15-20 nm $SiO_2$ | J-B Weld Cold-Weld | Heat Dropcast | 3.6 ± 1.4 (water) | Y, 6.7 ± 0.6 | Y, 14.4 ± 4.6 |
| 2 to 1 | 1 to 1 | 1 to 6 | 100 cSt HO—SO | 15-20 nm $SiO_2$ | J-B Weld Plastic Bonder | Heat Dropcast | 2.5 ± 1.2 (water) | N/A | Y, 25.4 ± 7.9 |
| 2 to 1 | 1 to 1 | 1 to 6 | 100 cSt HO—SO | 15-20 nm $SiO_2$ | J-B Weld ClearWeld | Heat Dropcast | 1.9 ± 0.8 (water) | Y, 3.9 ± 1.4 | Y, 14.9 ± 1.9 |
| 2 to 1 | 1 to 1 | 1 to 48 | 100 cSt HO—SO | 15-20 nm $SiO_2$ | J-B Weld ClearWeld | Heat Dropcast | 2.1 ± 0.6 (water) | Y, 1.9 ± 0.4 | Y, 21.3 ± 6.3 |
| 2 to 1 | 1 to 1 | 1 to 48 | 100 cSt HO—SO | 15-20 nm $SiO_2$ | Glass | Heat Dropcast | 1.9 ± 0.8 (water) | Y, 1.1 ± 0.2 | N |

TABLE 2

Various examples of tested low adhesion strength, low interfacial toughness, and icing event durability.

| Isocyanate-to-polyol ratio | Polymer-to-nano-particle (15-20 nm $SiO_2$) ratio | Composite-to-solvent ratio | Lubricant type | Substrate/ Procedure | Adhesion strength (kPa) | Critical detachment force per width (N/cm) | Interfacial toughness ($J/m^2$) | Icing event durability? (Y/N) |
|---|---|---|---|---|---|---|---|---|
| 2 to 1 | 1 to 1 | 3 to 12 | 100 cSt HO—SO | Aluminum plate/ spincoat | 32.37 ± 1.25 | 18.79 ± 0.96 | 0.035 ± 0.004 | Y |
| 2 to 1 | 2 to 1 | 3 to 12 | 100 cSt HO—SO | Aluminum plate/ spincoat | 25.60 ± 4.40 | 19.63 ± 4.64 | 0.040 ± 0.017 | N |
| 2 to 1 | 1 to 2 | 3 to 12 | 100 cSt HO—SO | Aluminum plate/ spincoat | 24.00 ± 1.26 | 20.82 ± 4.47 | 0.044 ± 0.017 | Y |
| 2 to 1 | 1 to 1 | 3 to 12 | 25 cSt HO—SO | Aluminum plate/ spincoat | 28.03 ± 4.61 | 18.32 ± 3.08 | 0.034 ± 0.011 | Y |
| 2 to 1 | 1 to 1 | 3 to 12 | 65 cSt HO—SO | Aluminum plate/ spincoat | 24.94 ± 2.63 | 17.38 ± 1.68 | 0.030 ± 0.005 | Y |
| 2 to 1 | 1 to 1 | 3 to 12 | 750 cSt HO—SO | Aluminum plate/ spincoat | 35.83 ± 1.73 | 22.11 ± 5.83 | 0.051 ± 0.026 | Y |
| 2 to 1 | 1 to 1 | 1 to 24 | 100 cSt HO—SO | Aluminum plate/ spincoat | 17.96 ± 0.87 | 15.80 ± 3.07 | 0.022 ± 0.011 | Y |
| 2 to 1 | 1 to 1 | 1 to 12 | 100 cSt HO—SO | Aluminum plate/ dropcast | 29.78 ± 2.89 | 18.67 ± 2.61 | 0.031 ± 0.013 | Y |
| 2 to 1 | 1 to 1 | 1 to 6 | 100 cSt HO—SO | Tape/ dropcast | 36.15 ± 4.77 | 23.82 ± 1.98 | 0.056 ± 0.009 | N |
| 2 to 1 | 2 to 1 | 3 to 12 | 65 cSt HO—SO | Aluminum plate/ spincoat | N/A | N/A | N/A | Y |
| 2 to 1 | 2 to 1 | 3 to 12 | 750 cSt HO—SO | Aluminum plate/ spincoat | N/A | N/A | N/A | Y |
| 2 to 1 | 2 to 1 | 3 to 12 | 100 cSt HO—SO | PP filter paper/ spincoat | 110.36 ± 20.30 | 52.60 ± 9.13 | 0.279 ± 0.100 | N |
| 2 to 1 | 1 to 1 | 3 to 12 | 100 cSt HO—SO | PP filter paper/ spincoat | 48.98 ± 12.66 | 37.30 ± 9.38 | 0.145 ± 0.063 | Y |
| 2 to 1 | 2 to 1 | 3 to 4 | 100 cSt HO—SO | Copper foam/ spincoat | 24.09 ± 2.92 | 12.71 ± 2.11 | 0.016 ± 0.005 | N |

The liquid and solid repellant anti-fouling nanocomposite coatings provided by the present disclosure may be used in a variety of industrial and medical applications, including those in harsh working environments, such as underwater vehicles, airfoils, wind turbines, and cartilage implants, as well as anti-fouling wearable devices, biomedical implants, biomedical testing chips, controlled liquid-and-solid adhesion for soft robotics, non-stick coatings, engineering surfaces with enhanced resistance to organic solvents, fingerprint resistant surfaces for flat panel displays, mobile devices, cell phones, sunglasses/safety glasses, oil pipelines, maritime vessels and equipment, limiting heat exchangers, and solar panels, by way of non-limiting example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A durable solid and liquid repellant nanocomposite material comprising:

a polymeric matrix comprising polyurethane or fluoropolyurethane and having a plurality of lubricating domains distributed therein formed by a partial cross-linking reaction between a reactive oil comprising a first reactive group selected from the group consisting of: hydroxyl, amine, carboxylic acid, and combinations and a second reactive functional group selected from the group consisting of: isocyanate, hydroxyl, and combinations thereof on a polymeric precursor of the polymeric matrix; and a plurality of nanoparticles distributed in the polymeric matrix, wherein at least a portion of the plurality of nanoparticles are bonded to the polymeric matrix.

2. The durable solid and liquid repellant nanocomposite material of claim 1, wherein the plurality of nanoparticles comprises silicon dioxide ($SiO_2$).

3. The durable solid and liquid repellant nanocomposite material of claim 1, wherein the first reactive group comprises hydroxyl and the second reactive functional group comprises isocyanate.

4. The durable solid and liquid repellant nanocomposite material of claim 1, wherein the reactive oil is selected from the group consisting of: hydroxyl-terminated polydimethylsiloxane, hydroxyl-terminated per-fluorinated polydimethylsiloxane, hydroxyl-terminated perfluoropolyether (PFPE), and combinations thereof.

5. The durable solid and liquid repellant nanocomposite material of claim 1 defining a plurality of pores and further comprising a free reactive oil distributed in at least a portion of the plurality of pores.

6. The durable solid and liquid repellant nanocomposite material of claim 5, wherein the free reactive oil is selected from the group consisting of: hydroxyl-terminated polydimethylsiloxane, hydroxyl-terminated per-fluorinated polydimethylsiloxane, hydroxyl-terminated perfluoropolyether (PFPE), and combinations thereof.

7. The durable solid and liquid repellant nanocomposite material of claim 1, wherein a weight ratio of the combined polymeric matrix and plurality of nanoparticles to the reactive oil in a solvent is greater than or equal to about 1:4.

8. The durable solid and liquid repellant nanocomposite material of claim 1, wherein a viscosity of the reactive oil is greater than or equal to about 25 cSt to less than or equal to about 750 cSt at about 20° C.

9. The durable solid and liquid repellant nanocomposite material of claim 1, wherein the polymeric precursor is formed from a polyol having a molecular weight of greater than or equal to about 100 Da to less than or equal to about 10,000 Da.

10. The durable solid and liquid repellant nanocomposite material of claim 1, wherein a weight ratio of the polymeric matrix to the plurality of nanoparticles is less than or equal to about 2:1.

11. The durable solid and liquid repellant nanocomposite material of claim 10, wherein the weight ratio of the polymeric matrix to the plurality of nanoparticles is about 1:1.

12. The durable solid and liquid repellant nanocomposite material of claim 1, wherein the plurality of nanoparticles has an average diameter of less than or equal to about 60 nm.

13. The durable solid and liquid repellant nanocomposite material of claim 1, wherein an exposed surface of the durable solid and liquid repellant nanocomposite material exhibits an initial ice adhesion strength of less than or equal to about 50 kPa prior to exposure to icing conditions and an ice adhesion strength after 10 cycles of icing and deicing conditions that is less than or equal to about 50% above the initial ice adhesion strength.

14. The durable solid and liquid repellant material of claim 1, wherein after at least 1,000 abrasion cycles, the durable solid and liquid repellant material has a contact angle hysteresis of less than or equal to about 5° for water and for a predetermined oil.

15. The durable solid and liquid repellant material of claim 1, wherein after at least 10,000 abrasion cycles, the durable solid and liquid repellant material has a contact angle hysteresis of less than or equal to about 5° for water and for a predetermined oil.

16. The durable solid and liquid repellant material of claim 1, wherein the polymeric precursor is formed from a component comprising three isocyanate functional groups.

17. The durable solid and liquid repellant material of claim 16, wherein the polymeric precursor comprises a triisocyanate aromatic polyurethane.

18. The durable solid and liquid repellant material of claim 1, wherein the durable solid and liquid repellant material has a transmissivity to wavelengths in the visible range of greater than or equal to about 90%.

19. A method of making a durable solid and liquid repellant material, the method comprising:

mixing (i) a polymeric precursor having a first reactive functional group selected from the group consisting of: isocyanate, alkene, amine, carboxylic acid, hydroxyl, and combinations thereof, (ii) a polyol having a second reactive functional group selected from the group consisting of: hydroxyl group, amine, carboxylic acid, and combinations thereof, (iii) a plurality of nanoparticles comprising silicon dioxide ($SiO_2$) and (iv) a catalyst to form an admixture;

applying the admixture to a surface of a substrate comprising reactive groups capable of reacting with the first reactive functional group;

heating the admixture on the substrate;

adding a reactive oil to the admixture on the substrate; and curing the admixture to promote a partial crosslinking reaction between the first reactive functional group and the second reactive functional group to form a polymeric matrix disposed over the substrate and reacting the first reactive functional group with at least a portion of the plurality of nanoparticles and the reactive oil, so that the polymeric matrix has a plurality of lubricating domains provided by the reactive oil distributed therein.

20. The method of claim 19, wherein the polymeric matrix comprises polyurethane or fluoropolyurethane and the reactive oil is selected from the group consisting of: hydroxyl-terminated polydimethylsiloxane, hydroxyl-terminated perfluorinated polydimethylsiloxane, hydroxyl-terminated perfluoropolyether (PFPE), and combinations thereof.

* * * * *